(12) United States Patent
Hayakawa et al.

(10) Patent No.: US 7,294,365 B2
(45) Date of Patent: *Nov. 13, 2007

(54) METHOD FOR PHOTOCATALYTICALLY RENDERING A SURFACE OF A SUBSTRATE SUPERHYDROPHILIC, A SUBSTRATE WITH SUPERHYDROPHILIC PHOTOCATALYTIC SURFACE, AND METHOD OF MAKING THEREOF

(75) Inventors: Makoto Hayakawa, Kita-kyushu (JP);
Eiichi Kojima, Kita-kyushu (JP);
Keiichiro Norimoto, Kita-kyushu (JP);
Mitsuyoshi Machida, Kita-kyushu (JP);
Atsushi Kitamura, Kita-kyushu (JP);
Toshiya Watanabe, Kita-kyushu (JP);
Makoto Chikuni, Kita-kyushu (JP);
Akira Fujishima, Kawasaki (JP);
Kazuhito Hashimoto, Yokohama (JP)

(73) Assignee: Toto Ltd., Fukuoka (JP)

( * ) Notice: Subject to any disclaimer, the term of this patent is extended or adjusted under 35 U.S.C. 154(b) by 443 days.

This patent is subject to a terminal disclaimer.

(21) Appl. No.: 10/924,158

(22) Filed: Aug. 23, 2004

(65) Prior Publication Data
US 2005/0019700 A1    Jan. 27, 2005

Related U.S. Application Data

(63) Continuation of application No. 09/374,344, filed on Aug. 13, 1999, now Pat. No. 6,830,785, which is a continuation of application No. 08/933,886, filed on Sep. 19, 1997, now Pat. No. 6,013,372, which is a continuation-in-part of application No. PCT/JP96/00733, filed on Mar. 21, 1996.

(30) Foreign Application Priority Data

| Mar. 20, 1995 | (JP) | 7/99425 |
| Apr. 6, 1995 | (JP) | 7/117600 |
| Jun. 14, 1995 | (JP) | 7/182019 |
| Jun. 14, 1995 | (JP) | 7/182020 |
| Jul. 8, 1995 | (JP) | 7/205019 |
| Nov. 9, 1995 | (JP) | 7/326167 |
| Dec. 22, 1995 | (JP) | 7/354649 |
| Mar. 21, 1996 | (WO) | PCT/JP96/00733 |

(51) Int. Cl.
*B05D 5/04* (2006.01)
*B05D 3/06* (2006.01)
*B08B 3/10* (2006.01)

(52) U.S. Cl. ......................... 427/553; 427/165; 134/1

(58) Field of Classification Search ................... None
See application file for complete search history.

(56) References Cited

U.S. PATENT DOCUMENTS 3,640,712 A  *  2/1972  Field et al. .................. 430/302

(Continued)

FOREIGN PATENT DOCUMENTS

| EP | 0590477 | * | 4/1994 |
| JP | 04-225301 | | 8/1992 |
| JP | 07-100378 | | 4/1995 |

OTHER PUBLICATIONS

Tamihiko Kato, et al; Photo-Sinking of Titanium (IV) Oxide Powders, The Chemical Society of Japan, 1986 (1) pp. 8-11, no month.

*Primary Examiner*—Marianne Padgett
(74) *Attorney, Agent, or Firm*—Jones Day

(57) ABSTRACT

A method of preventing or reducing fogging of a surface of a composite when subjected to humid conditions includes providing a composite with a surface. The composite includes a substrate and a photocatalytic surface layer. The photocatalytic surface layer includes a photocatalyst. The method further includes subjecting the photocatalyst to photoexcitation to render the surface of the composite hydrophilic, wherein, after the photoexcitation, the surface of the composite has a water wettability of less than 10° in terms of the contact angle with water. The method further includes subjecting the composite to humidity that is sufficient to induce fogging of the substrate if the photocatalytic surface layer were absent.

23 Claims, 22 Drawing Sheets

U.S. PATENT DOCUMENTS

| | | |
|---|---|---|
| 5,006,248 A | 4/1991 | Anderson et al. |
| 5,035,784 A | 7/1991 | Anderson et al. |
| 5,616,532 A * | 4/1997 | Heller et al. ................ 502/242 |
| 6,013,372 A * | 1/2000 | Hayakawa et al. ...... 428/411.1 |
| 6,090,489 A * | 7/2000 | Hayakawa et al. ......... 428/409 |
| 6,165,256 A * | 12/2000 | Hayakawa et al. ........... 106/13 |
| 6,830,785 B1 * | 12/2004 | Hayakawa et al. ......... 427/553 |

* cited by examiner (313 nm)

(365 nm)

(405 nm)

METHOD FOR PHOTOCATALYTICALLY RENDERING A SURFACE OF A SUBSTRATE SUPERHYDROPHILIC, A SUBSTRATE WITH SUPERHYDROPHILIC PHOTOCATALYTIC SURFACE, AND METHOD OF MAKING THEREOF

This application is a continuation of U.S. application Ser. No. 09/374,344, filed Aug. 13, 1999 now U.S. Pat. No. 6,830,785, incorporated herein by reference, which is a continuation of U.S. application Ser. No. 08/933,886 filed Sep. 19, 1997, now U.S. Pat. No. 6,013,372, which is a continuation-in-part of International Application No. PCT/JP96/00733, filed Mar. 21, 1996, which designated the U.S. and is now abandoned.

BACKGROUND OF THE INVENTION

1. Field of the Invention

The present invention relates broadly to the art of rendering and maintaining a surface of a substrate highly hydrophilic. More particularly, the present invention relates to the antifogging art wherein the surface of a transparent substrate such as a mirror, lens and sheet glass is made highly hydrophilic to thereby prevent fogging of the substrate or formation of water droplets. This invention is also concerned with the art wherein the surface of a building, windowpane, machinery or article is rendered highly hydrophilic in order to prevent fouling of, to permit self-cleaning of or to facilitate cleaning of the surface. This invention also relates to a hydrophilifiable member having a surface layer which is capable of having an extremely small contact angle with water, a method for rendering the member hydrophilic, a method for forming a hydrophilifiable surface layer, and a coating composition for forming a hydrophilifiable surface layer.

2. Description of the Prior Art

It is often experienced that, in the cold seasons, windshields and window-glasses of automobile and other vehicles, windowpanes of buildings, lenses of eyeglasses, and cover glasses of various instruments are fogged by moisture condensate. Similarly, in a bathroom or lavatory, it is often encountered that mirrors and eyeglass lenses are fogged by steam.

Fogging of the surface of an article results from the fact that, when the surface is held at a temperature lower than the dew point of the ambient atmosphere, condensation of moisture in the ambient air takes place to form moisture condensate at the surface.

If the condensate particles are sufficiently fine and small so that the diameter thereof is on the order of one half of the wavelength of the visible light, the particles cause scattering of light whereby window-glasses and mirrors become apparently opaque thereby giving rise to a loss of visibility.

When condensation of moisture further proceeds so that fine condensate particles are merged together to grow into discrete larger droplets, the refraction of light taking place at the interface between the droplets and the surface and between the droplets and the ambient air causes the surface to be blurred, dimmed, mottled, or clouded. As a result, an image viewed through a transparent article such as sheet glass may become distorted, or the reflected image in a mirror may be disturbed.

Similarly, when windshields and window-glasses of vehicles, windowpanes of buildings, rearview mirrors of vehicles, lenses of eyeglasses, or shields of masks or helmets are subjected to rain or water splash so that discrete water droplets are adhered to the surface, their surface is blurred, dimmed, mottled, or clouded, resulting in the loss of visibility.

The term "antifogging" as used herein and in the appended claims is intended to mean broadly the art of preventing or minimizing occurrence of optical trouble resulting from fogging, growth of condensate droplets or adherent water droplets mentioned above.

The antifogging art can significantly affect safety and efficiency in a variety of setting. For example, the safety of vehicles and traffic can be undermined if the windshields, window-glasses or rearview mirrors of vehicles are fogged or blurred. Fogging of endoscopic lenses and dental mouth mirrors may hinder proper and accurate diagnosis, operation and treatment. If cover glasses of measuring instruments are fogged, a reading of data will become difficult.

The windshields of automobiles and other vehicles are normally provided with windshield wipers, defrosting devices and heaters so as to avoid visibility problems, which arise particularly in the cold seasons and under rainy conditions. However, it is not commercially feasible to install this equipment on the side windows of a vehicle, or on the rearview mirrors arranged outside of the vehicle. Similarly, it is difficult, if possible at all, to mount such antifogging equipment on windowpanes of buildings, lenses of eyeglasses and endoscopes, dental mouth mirrors, shields of masks and helmets, or cover glasses of measuring instruments.

As is well-known, a simple and convenient antifogging method conventionally used in the art is to apply onto a surface an antifogging composition containing either a hydrophilic compound such as polyethylene glycol or a hydrophobic or water-repellent compound such as silicone. However, the disadvantage of this method is that the antifogging coating thus formed is only temporary in nature and is readily removed when rubbed or washed with water so that its effectiveness is prematurely lost.

Japanese Utility Model Kokai Publication No. 3-129357 (Mitsubishi Rayon) discloses an antifogging method for a mirror wherein the surface of a substrate is provided with a polymer layer and the layer is subjected to irradiation by ultraviolet light, followed by treatment with an aqueous alkaline solution to thereby form acid radicals at a high density whereby the surface of the polymer layer is rendered hydrophilic. Again, however, it is believed that, according to this method, the hydrophilic property of the surface is degraded as time elapses because of adherent contaminants so that the antifogging function is lost over time.

Japanese Utility Model Kokai Publication No. 5-68006 (Stanley Electric) discloses an antifogging film made of a graftcopolymer of an acrylic monomer having hydrophilic groups and a monomer having hydrophobic groups. The graftcopolymer is described as having a contact angle with water of about 50°. It is therefore believed that this antifogging film does not exhibit a sufficient antifogging capability.

Isao Kaetsu "Antifogging Coating Techniques for Glass", Modern Coating Techniques, pages 237-249, published by Sogo Gijutsu Center (1986), describes various antifogging techniques used in the prior art. The author Mr. Kaetsu nevertheless reports that the prior art antifogging techniques, which consist of rendering a surface hydrophilic, suffer from significant problems which must be overcome in reducing them to practice, and, further reports that the conventional antifogging coating techniques seemingly come up against a barrier.

Accordingly, an object of the invention is to provide an antifogging method which is capable of realizing a high degree of visibility in a transparent substrate such as a mirror, lens or glass.

Another object of the invention is to provide an antifogging method wherein the surface of a transparent substrate such as a mirror, lens or glass is maintained highly hydrophilic for an extended period of time.

Still another object of the invention is to provide an antifogging method wherein the surface of a transparent substrate such as a mirror, lens and glass is almost permanently maintained highly hydrophilic.

A further object of the invention is to provide an antifogging coating which has an improved durability and abrasion resistance.

Another object of the invention is to provide an antifogging coating which can be readily applied onto a surface requiring antifogging treatment.

Yet another object of the invention is to provide an antifogging transparent substrate such as a mirror, lens or glass, as well as a method of making such an antifogging transparent substrate, wherein the substrate surface is maintained highly hydrophilic for an extended period of time to thereby provide a high degree of antifogging property for an extended period.

In the fields of architecture and painting, it has been pointed out that growing environmental pollution tends to inadvertently accelerate fouling, contamination or soiling of exterior building materials, including outdoor buildings themselves and the coatings thereon.

In this regard, air-borne grime and dust particles are allowed under fair weather conditions to fall and deposit on roofs and outer walls of buildings. When it rains, the deposits are washed away by rainwater and are caused to flow along the outer walls of the buildings. Furthermore, air-borne grime is captured by rain and is carried onto surfaces (such as outer walls) of outdoor structures and buildings, where the grime may flow along or down the surface. For these reasons, contaminant substances are caused to adhere onto the surface along the paths of rainwater. As the surface is dried, a striped pattern of dirt, stain or smudge will appear on the surface.

The dirt or stain thus formed on the exterior building materials and exterior coatings consists of contaminant substances which include combustion products such as carbon black, city grime, and inorganic substances such as clay particles. The diversity of the fouling substances is considered to make the antifouling countermeasures complicated (Yoshinori KITSUTAKA, "Accelerated Test Method For Soiling on Finishing Materials of External Walls", Bulletin of Japan Architecture Society, vol. 404 (October 1989), pages 15-24).

Hitherto, it has been commonly considered in the art that water-repellent paints such as those containing polytetrafluoroethylene (PTFE) are desirable to prevent fouling or soiling of exterior building materials and the like. Recently, however, it is pointed out that, in order to cope with city grime containing a large amount of oleophilic components, it is rather desirable to render the surface of coatings as hydrophilic as possible ("Highpolymer", vol. 44, May 1995, page 307).

Accordingly, it has been proposed in the art to coat a building with a hydrophilic graftcopolymer (Newspaper "Daily Chemical Industry", Jan. 30, 1995). Reportedly, the coating film presents a hydrophilicity of 30-40° in terms of the contact angle with water.

However, in view of the fact that inorganic dusts, which may typically be represented by clay minerals, have a contact angle with water ranging from 20° to 50° (so that they have affinity for graftcopolymer having a contact angle with water of 30-40°), it is considered that such inorganic dusts are apt to adhere to the surface of the graftcopolymer coating and, hence, the coating is not able to prevent fouling or contamination by inorganic dusts.

Also available in the market are various hydrophilic paints which comprise acrylic resin, acryl-silicone resin, aqueous silicone, block copolymers of silicone resin and acrylic resin, acryl-styrene resin, ethylene oxides of sorbitan fatty acid, esters of sorbitan fatty acid, acetates of urethane, cross-linked urethane of polycarbonatediol and/or polyisocyanate, or cross-linked polymers of alkylester polyacrylate. However, since the contact angle with water of these hydrophilic paints is as large as 50-70°, they are not suitable to effectively prevent fouling by city grimes which contain large amount of oleophilic components.

Accordingly, a further object of the invention is to provide a method for rendering a surface of a substrate highly hydrophilic and antifouling.

Another object of the invention is to provide a method wherein the surface of buildings, window glasses, machinery or articles is rendered highly hydrophilic to thereby prevent fouling of or to permit self-cleaning of or to facilitate cleaning of the surface.

Yet another object of the invention is to provide a highly hydrophilic antifouling substrate, as well as a method of making thereof, which is adapted to prevent fouling of or to permit self-cleaning of or to facilitate cleaning of the surface.

In certain apparatus, formation of moisture condensate on a surface thereof often hampers operation of the apparatus when condensate has grown into droplets. In heat exchangers, for example, the heat exchanging efficiency would be lowered if condensate particles adhering to radiator fins have grown into large droplets.

Accordingly, another object of the invention is to provide a method for preventing adherent moisture condensate from growing into larger water droplets wherein a surface is made highly hydrophilic to thereby permit adherent moisture condensate to spread into a water film.

DISCLOSURE OF THE INVENTION

The present inventors have found that, upon photoexcitation, a surface of a photocatalyst is rendered highly hydrophilic. Surprisingly, it has been discovered that, upon photoexcitation of photocatalytic titania with ultraviolet light, the surface thereof is rendered highly hydrophilic to the degree that the contact angle with water becomes less than 10°, more particularly less than 5°, and even reached about 0°.

Based on the foregoing findings, the present invention provides, broadly, a method for rendering a surface of a substrate highly hydrophilic, a substrate having a highly hydrophilic surface and a method of making such a substrate. According to the invention, the surface of the substrate is coated with an abrasion-resistant photocatalytic coating comprised of a photocatalytic semiconductor material.

Upon irradiation for a sufficient time with a sufficient intensity of a light having a wavelength which has an energy higher than the bandgap energy of the photocatalytic semiconductor, the surface of the photocatalytic coating is rendered highly hydrophilic to exhibit a super-hydrophilicity.

The term "super-hydrophilicity" or "super-hydrophilic" as used herein refers to a highly hydrophilic property (i.e., water wettability) of less than about 10° in terms of the contact angle with water. Similarly, the term "superhydrophilification" or "superhydrophilify" refers to rendering a surface highly hydrophilic to the degree that the contact angle with water becomes less than about 10°. It is preferred that a super-hydrophilic surface have a water wettability of less than about 5°.

The process of superhydrophilification of a surface resulting from photoexcitation of a photocatalyst cannot be explained presently with any certainty. Seemingly, photocatalytic superhydrophilification is not necessarily identical with photodecomposition of a substance arising from photocatalytic redox process known hitherto in the field of photocatalyst. In this regard, the conventional theory admitted in the art regarding the photocatalytic redox process was that electron-hole pairs are generated upon photoexcitation of the photocatalyst, the electrons thus generated acting to reduce the surface oxygen to produce superoxide ions ($O_2^-$), the holes acting to oxidize the surface hydroxyl groups to produce hydroxyl radicals (.OH), these highly active oxygen species ($O_2^-$ and .OH) then acting to decompose a substance through redox process.

However, it seems that the superhydrophilification phenomenon provoked by a photocatalyst is not consistent, in at least two aspects, with the conventional understanding and observation regarding the photocatalytic decomposition process of substances. First, according to a theory widely accepted hitherto, it has been believed that, in a certain photocatalyst such as rutile and tin oxide, the energy level of the conduction band is not high enough to promote the reduction process so that the electrons photoexcited up to the conduction band remain unused and become excessive whereby the electron-hole pairs once generated by photoexcitation undergo recombination without contributing in the redox process. In contrast, the present inventors have observed that the superhydrophilification process by a photocatalyst takes place even with rutile and tin oxide, as described later.

Secondly, the conventional wisdom was that the decomposition of substances due to photocatalytic redox process is not developed unless the thickness of a photocatalytic layer is greater than at least 100 nm. Conversely, the present inventors have found that photocatalytic superhydrophilification occurs even with a photocatalytic coating having a thickness on the order of several nanometers.

Accordingly, it is believed (though it cannot be confirmed with certainty) that the superhydrophilification process caused by a photocatalyst is a phenomenon somewhat different from photodecomposition of substances resulting from the photocatalytic redox process. As described later, it has been observed that superhydrophilification of a surface does not occur unless a light having an energy higher than the band gap energy of the photocatalyst is irradiated. It is considered that, presumably, the surface of a photocatalytic coating is rendered superhydrophilic as a result of water being chemisorbed thereon in the form of hydroxyl groups ($OH^-$) under the photocatalytic action of the photocatalyst.

Once the surface of the photocatalytic coating has been made highly hydrophilic upon photoexcitation of the photocatalyst, the hydrophilicity of the surface will be sustained for a certain period of time even if the substrate is placed in the dark. As time elapses, the superhydrophilicity of the surface will be gradually lost because of contaminants adsorbed on the surface hydroxyl groups. However, the superhydrophilicity will be restored when the surface is again subjected to photoexcitation.

To initially superhydrophilify the photocatalytic coating, any suitable source of light may be used which has a wavelength of an energy higher than the band gap energy of the photocatalyst. In the case of those photocatalysts such as titania for which the photoexciting wavelength is in the ultraviolet range of the spectrum, the ultraviolet light contained in the sunlight may advantageously be used as the photoexciting light source if the sunlight impinges upon the substrate coated by the photocatalytic coating. When the photocatalyst is to be photoexcited indoors or at night, an artificial light source may be used. In the case where the photocatalytic coating is made of silica blended titania as described later, the surface thereof can readily be rendered hydrophilic even by a weak ultraviolet radiation contained in the light emitted from a fluorescent lamp.

After the surface of the photocatalytic coating has once been superhydrophilified, the superhydrophilicity may be maintained or renewed by a relatively weak light. In the case of titania, for example, maintenance and restoration of the superhydrophilicity may be accomplished to a satisfactory degree even by a weak ultraviolet light contained in the light of indoor illumination lamps such as fluorescent lamps.

The photocatalytic coating of the present invention exhibits super-hydrophilicity even if the thickness thereof is made extremely small. It presents a sufficient hardness when made, in particular, from a photocatalytic semiconductor material comprising a metal oxide. Therefore, the present photocatalytic coating may have an adequate durability and abrasion resistivity.

Superhydrophilification of a surface may be utilized for various applications. In one aspect of the invention, this invention provides an antifogging method for a transparent member, or provides an antifogging transparent member, or provides a method of making an antifogging member. According to the invention, a transparent member is prepared, and the surface of the transparent member is coated with a photocatalytic coating.

The transparent member may include a mirror such as a rearview mirror for a vehicle, a bathroom or lavatory mirror, a dental mouth mirror, or a road mirror; a lens such as an eyeglass lens, optical lens, photographic lens, endoscopic lens, or light projecting lens; a prism; a windowpane for a building or control tower; a windowpane for a vehicle such as an automobile, railway vehicle, aircraft, watercraft, submarine, snowmobile, ropeway gondola, pleasure garden gondola and spacecraft; a windshield for a vehicle such as an automobile, railway vehicle, aircraft, watercraft, submarine, snowmobile, motorcycle, ropeway gondola, pleasure garden gondola and spacecraft; a shield for protective or sporting goggles or mask including diving mask; a shield for a helmet; a show window glass for chilled foods; or a cover glass for a measuring instrument.

Upon subjecting the transparent member provided with the photocatalytic coating to irradiation by a light to thereby photoexcite the photocatalyst, the surface of the photocatalytic coating will be superhydrophilified. Thereafter, in the event that moisture in the air or steam undergoes condensation, the condensate will be transformed into a relatively uniform film of water without forming discrete water droplets. As a result, the surface will be free from the formation of a light diffusing fog.

Similarly, in the event that a windowpane, a rearview mirror of a vehicle, a windshield of a vehicle, eyeglass lenses, a helmet shield, or other substrate is subjected to a rainfall or a splash of water, the water droplets adhering onto the surface will be quickly spread over into a uniform water film thereby preventing formation of discrete water droplets which would otherwise hinder visibility through, or reflection from, the substrate.

Accordingly, a high degree of view and visibility is secured so the safety of vehicle and traffic is secured and the efficiency of various activities improved.

In another aspect, this invention provides a method for self-cleaning a surface of a substrate wherein the surface is superhydrophilified and is self-cleaned by rainfall. This invention also provides a self-cleaning substrate and a method of making thereof.

The substrate may be any of a variety of articles, including an exterior member, window sash, structural member, or windowpane of a building; an exterior member or coating of a vehicle such as automobile, railway vehicle, aircraft, and watercraft; an exterior member, dust cover or coating of a machine, apparatus or article; and an exterior member or coating of a traffic sign, various display devices, and advertisement towers, that are made, for example, of metal, ceramics, glass, plastics, wood, stone, cement, concrete, a combination thereof, a laminate thereof, or other materials. The surface of the substrate is coated with the photocatalytic coating.

Since the building, or machine or article disposed outdoors, is exposed to the sunlight during the daytime, the surface of the photocatalytic coating will be rendered highly hydrophilic. Furthermore, the surface will occasionally be subjected to rainfall. Each time the superhydrophilified surface receives a rainfall, dust and grime and contaminants deposited on the surface of the substrate will be washed away by rain whereby the surface is self-cleaned.

As the surface of the photocatalytic coating is rendered highly hydrophilic to the degree that the contact angle with water becomes less than about 10°, preferably less than about 5°, particularly equal to about 0°, not only city grime containing large amounts of oleophilic constituents but also inorganic dusts such as clay minerals will be readily washed away from the surface. In this manner, the surface of the substrate will be self-cleaned and kept clean to a high degree under the action of nature. This will permit, for instance, to eliminate or largely reduce cleaning of windowpanes of towering buildings.

In still another aspect, this invention provides an antifouling method for a building, window glass, machine, apparatus, or article wherein the surface thereof is provided with a photocatalytic coating and is rendered highly hydrophilic to prevent fouling.

The surface thus superhydrophilified will prevent contaminants from adhering to the surface when rainwater which is laden with contaminants originating from air-borne dust and grime flows down along the surface. Therefore, in combination with the above-mentioned self-cleaning function performed by rainfall, the surface of the building and the like may be maintained in a high degree of cleanliness for an extremely long period of time.

In a further aspect of the invention, a photocatalytic coating is provided on a surface of an apparatus or article, such as an exterior or interior member of a building, or a windowpane, household, toilet bowl, bath tub, wash basin, lighting fixture, kitchenware, tableware, sink, cooking range, kitchen hood, or ventilation fan, said apparatus or article being made from metal, ceramics, glass, plastics, wood, stone, cement, concrete, a combination thereof, a laminate thereof, or other materials, and the surface is photoexcited as required.

When these articles which are fouled by oil or fat are soaked in, wetted with or rinsed by water, fatty dirt and contaminants will be released from the superhydrophilified surface of the photocatalytic coating and will be readily removed therefrom. Accordingly, for example, a tableware fouled by oil or fat may be cleansed without resort to a detergent.

In another aspect, this invention provides a method for preventing growth of condensate droplets adhering to a substrate or for causing adherent water droplets to spread into a uniform water film. To this end, the surface of the substrate is coated with a photocatalytic coating.

Once the surface of the substrate has been superhydrophilified upon photoexcitation of the photocatalytic coating, moisture condensate or water droplets that have come to adhere to the surface will be spread over the surface to form a uniform aqueous film. By applying this method, for example, to radiator fins of a heat exchanger, it is possible to prevent fluid passages for a heat exchange medium from being clogged by condensate; thus the present invention may be used to enhance the heat exchange efficiency. Also, when this method is applied to a mirror, lens, windowpane, windshield, pavement, or other such surface, it is possible to promote drying of the surface after wetting with water.

The present inventors have further discovered that hydrophilification of a surface layer made of a photocatalyst results from water molecules being physisorbed onto the surface under the photocatalytic action of the photocatalyst.

Based on this discovery, the present invention further provides a method and a composite wherein a substrate is coated with a surface layer comprised of a photocatalyst and wherein upon photoexcitation of the photocatalyst the molecules of water are physisorbed by hydrogen bonding onto the surface layer to thereby form a layer of physisorbed water of a high density.

As a layer of physisorbed water is formed on the surface of the photocatalytic layer, the surface is readily hydrophilified to a high degree. Due to the presence of the layer of physisorbed water, the hydrophilicity of the surface is maintained for a long period of time even after photoexcitation is discontinued, thereby minimizing the loss of hydrophilicity over time. Moreover, when the photocatalyst is photoexcited again, the hydrophilicity of the surface is readily recovered within a short period of time of irradiation or with a weak irradiation intensity.

These features and advantages of the invention as well as other features and advantages thereof will become apparent from the following description.

DESCRIPTION OF THE PREFERRED EMBODIMENTS

A substrate having a surface requiring superhydrophilification is prepared and is coated with a photocatalytic coating. In the case where the substrate is made from a heat resistive material such as metal, ceramics and glass, the photocatalytic coating may be fixed on the surface of the substrate by sintering particles of a photocatalyst as described later. Alternatively, a thin film of the amorphous form of a precursor of the photocatalyst may be first formed on the surface of the substrate and the amorphous photocatalyst precursor may then be transformed into photoactive photocatalyst by heating and crystallization.

In the case where the substrate is formed of a non heat-resistive material such as plastic or is coated with a paint, the photocatalytic coating may be formed by applying onto the surface a photooxidation-resistant coating composition containing the photocatalyst and by curing the coating composition, as described later.

When an antifogging mirror is to be manufactured, a reflective coating may be first formed on the substrate and the photocatalytic coating may then be formed on the front surface of the mirror. Alternatively, the reflective coating may be formed on the substrate subsequent to or during the course of the step of coating of the photocatalyst.

Photocatalyst

The most preferred example of the photocatalyst usable in the photocatalytic coating according to the invention is titania ($TiO_2$). Titania is harmless, chemically stable and available at a low cost. Furthermore, titania has a high band gap energy and, hence, requires ultraviolet (UV) light for photoexcitation. This means that absorption of the visible light does not occur during the course of photoexcitation so that the coating is free from the problem of coloring which would otherwise occur due to a complementary color component. Accordingly, titania is particularly suitable to coat on a transparent member such as glass, lens and mirror.

Both the anatase and rutile forms of titania may be used. The advantage of the anatase form of titania is that a sol in which extremely fine particles of anatase are dispersed is readily available on the market so that it is easy to make an extremely thin film. On the other hand, the advantage of the rutile form of titania is that it can be sintered at a high temperature so that a coating that has excellent strength and abrasion resistance can be obtained. Although the rutile form of titania is lower in the conduction band level than the anatase form as shown in FIG. 1, it may be used as well for the purpose of photocatalytic superhydrophilification.

Figure 2A:
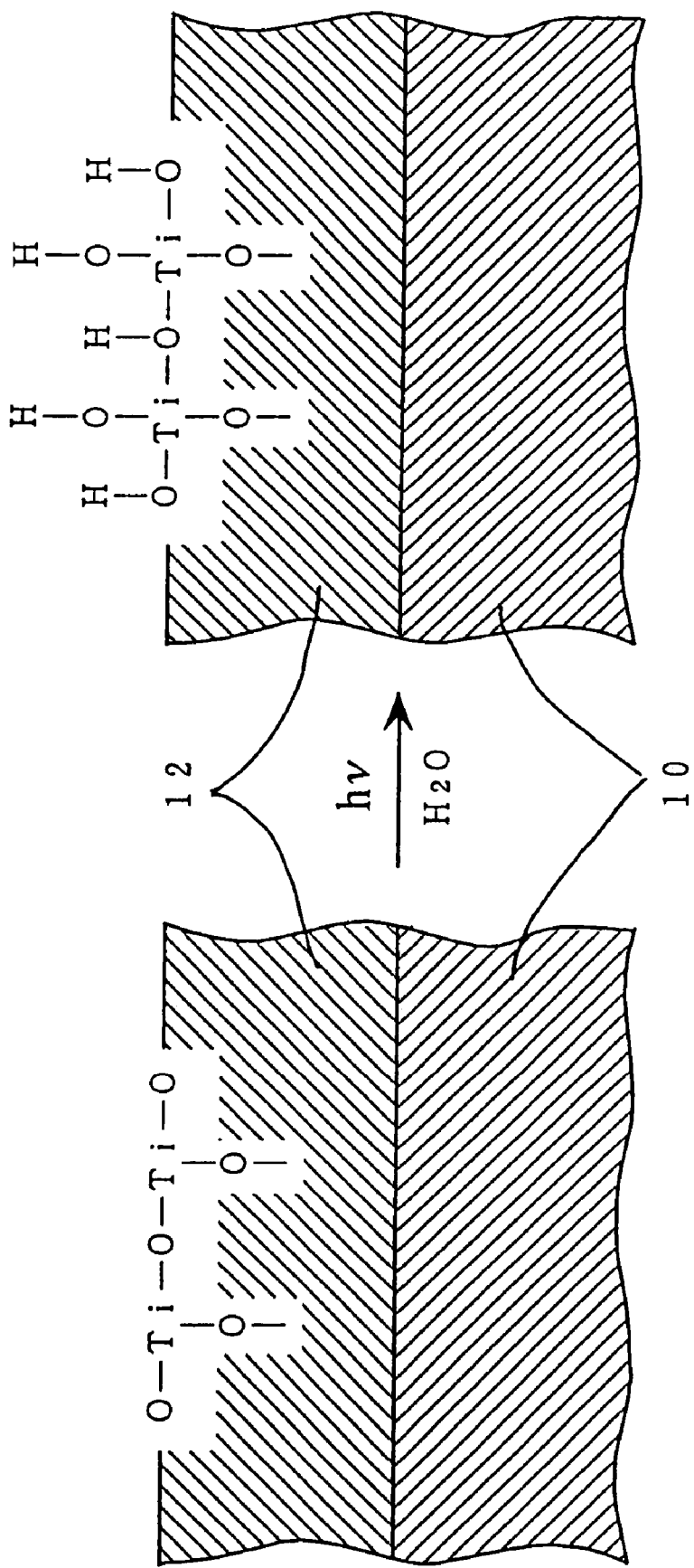
FIGS. 2A and 2B are schematic cross-sectional views in a microscopically enlarged scale of the photocatalytic coating formed on the surface of a substrate and showing the hydroxyl groups being chemisorbed on the surface upon photoexcitation of the photocatalyst.

It is believed that, when a substrate 10 is coated with a photocatalytic coating 12 of titania and the coating is subjected to photoexcitation by UV light, water is chemisorbed on the surface in the form of hydroxyl groups ($OH^-$) as a result of the photocatalytic action, as shown in FIG. 2A. As a result, the surface becomes superhydrophilic.

Figure 1:
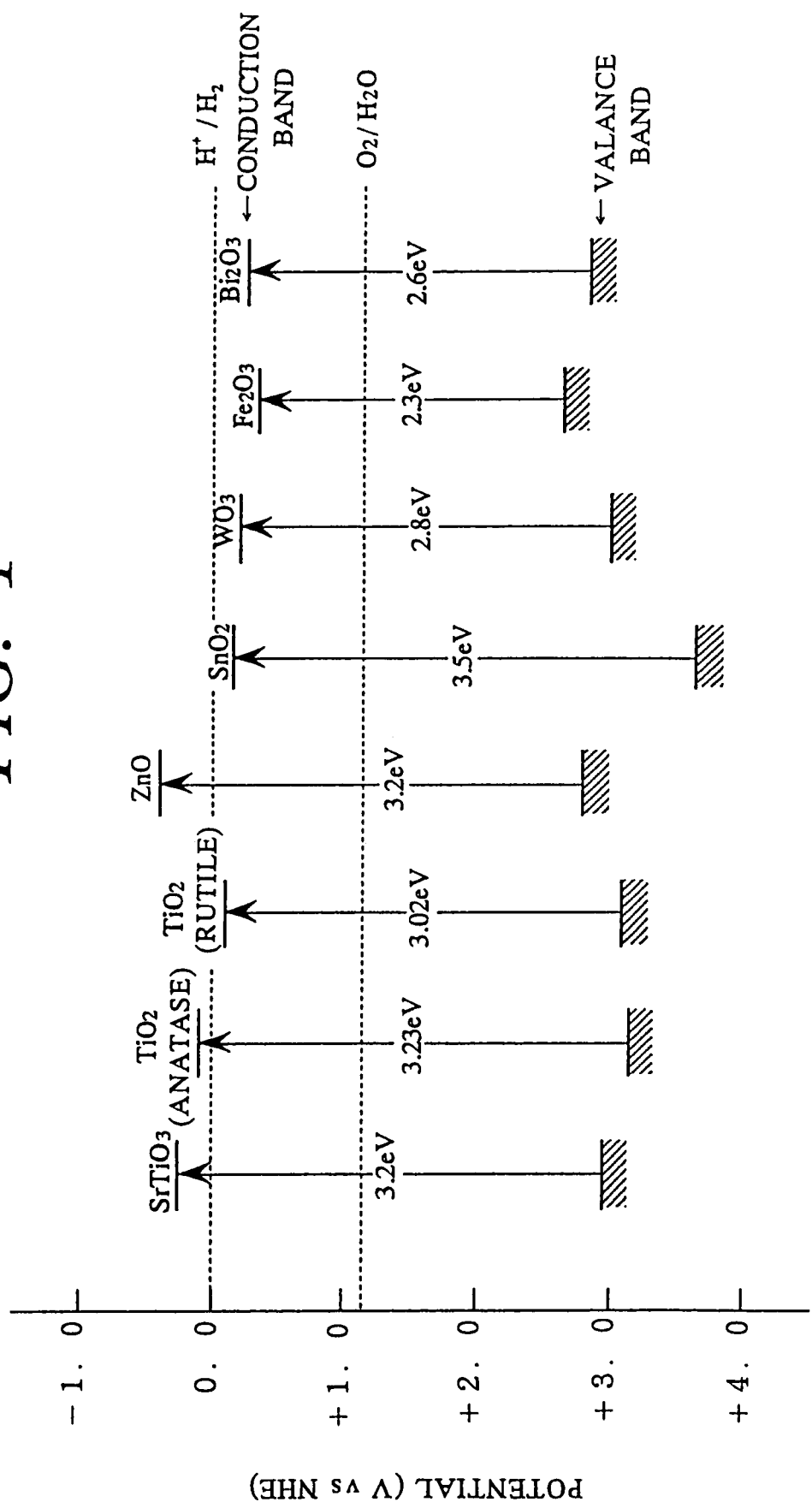
FIG. 1 shows the energy level of the valance band and the conduction band of various semiconductor photocatalysts usable in the present invention.

Other photocatalysts which can be used in the photocatalytic coating according to the invention may include a metal oxide such as $ZnO$, $SnO_2$, $SrTiO_3$, $WO_3$, $Bi_2O_3$, or $Fe_2O_3$, as shown in FIG. 1. It is believed that, similar to titania, these metal oxides are apt to adsorb the surface hydroxyl groups ($OH^-$) because the metallic element and oxygen are present at the surface.

Figure 2B:
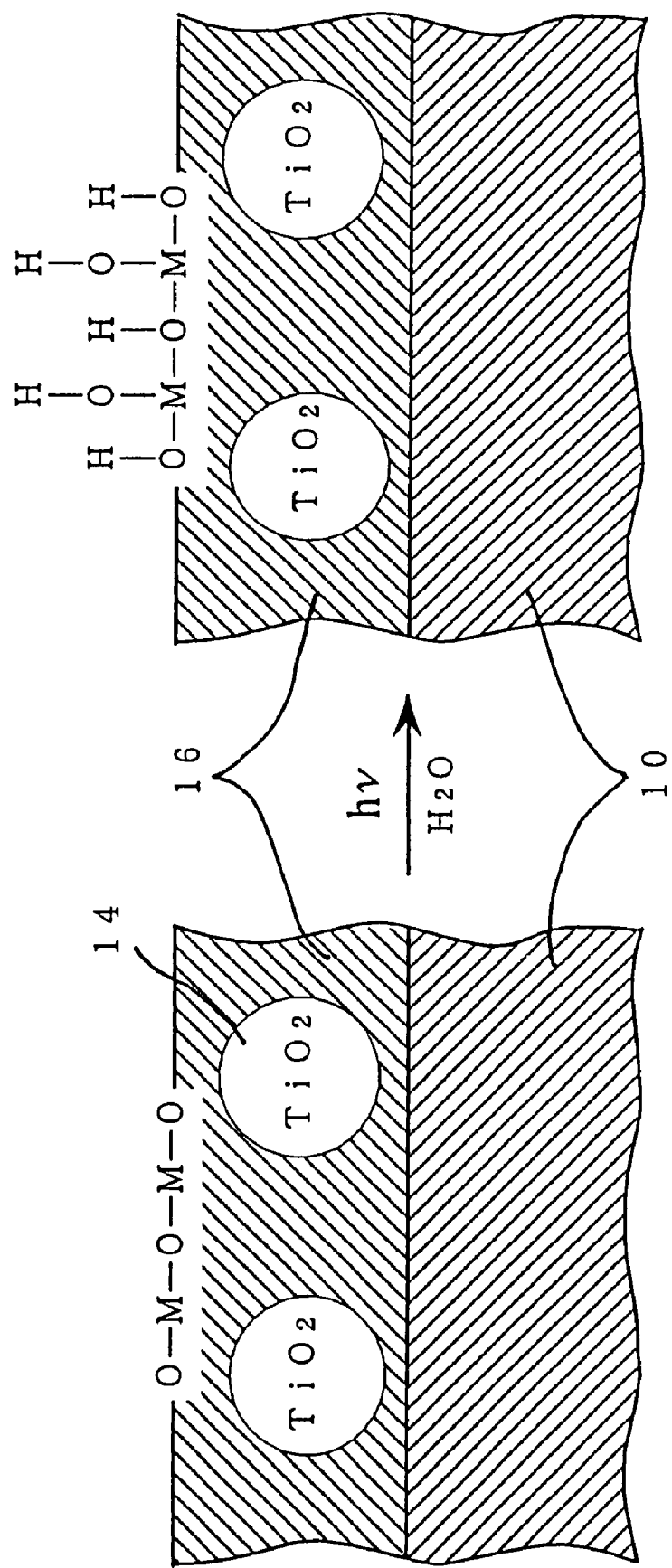

As shown in FIG. 2B, the photocatalytic coating may be formed by blending particles 14 of photocatalyst in a layer 16 of metal oxide. In particular, the surface can be hydrophilified to a high degree when silica or tin oxide is blended in the photocatalyst as described later.

Thickness of Photocatalytic Coating

In the case that the substrate is made of a transparent material as in the case of glass, a lens and a mirror, it is preferable that the thickness of the photocatalytic coating is not greater than 0.2 μm. With such a thickness, coloring of the photocatalytic coating due to the interference of light can be avoided. Moreover, the thinner the photocatalytic coating is, the more transparent the substrate can be. In addition, the abrasion resistance of the photocatalytic coating is increased with decreasing thickness.

The surface of the photocatalytic coating may be covered further by an abrasion-resistant or corrosion-resistant protective layer or other functional film which is susceptible to hydrophilification.

Formation of Photocatalytic Layer by Calcination of Amorphous Titania

When the substrate is made of a heat resistive material such as metal, ceramics and glass, one of the preferred methods for forming an abrasion resistant photocatalytic coating which exhibits the superhydrophilicity of such a degree that the contact angle with water becomes as small as 0° is to first form a coating of the amorphous form of titania on the surface of the substrate and to then calcine the substrate to thereby transform by phase transition amorphous titania into crystalline titania (i.e., anatase or rutile). Formation of amorphous titania may be carried out by one of the following methods.

(1) Hydrolysis and Dehydration Polymerization of Organic Titanium Compound

To an alkoxide of titanium, such as tetraethoxytitanium, tetraisopropoxytitanium, tetra-n-propoxytitanium, tetrabuthoxytitanium, or tetramethoxytitanium, is added a hydrolysis inhibitor such as hydrochloric acid and ethylamine, the mixture being diluted by alcohol such as ethanol or propanol. While subjected to partial or complete hydrolysis, the mixture is applied to the surface of the substrate by spray coating, flow coating, spin coating, dip coating, roll coating or any other suitable coating method, followed by drying at a temperature ranging from the ambient temperature to 200° C. Upon drying, hydrolysis of titanium alkoxide will be completed to result in the formation of titanium hydroxide which then undergoes dehydration polymerization whereby a layer of amorphous titania is formed on the surface of the substrate.

In lieu of titanium alkoxide, other organic compounds of titanium such as chelate of titanium or acetate of titanium may be employed.

(2) Formation of Amorphous Titania from Inorganic Titanium Compound

An acidic aqueous solution of an inorganic compound of titanium such as $TiCl_4$ or $Ti(SO_4)_2$ is applied to the surface of a substrate by spray coating, flow coating, spin coating, dip coating, or roll coating. The substrate is then dried at a temperature of 100-200° C. to subject the inorganic compound of titanium to hydrolysis and dehydration polymerization to form a layer of amorphous titania on the surface of the substrate. Alternatively, amorphous titania may be formed on the surface of the substrate by chemical vapor deposition of $TiCl_4$.

(3) Formation of Amorphous Titania by Sputtering

Amorphous titania may be deposited on the surface of the substrate by bombarding a target of metallic titanium with an electron beam in an oxidizing atmosphere.

(4) Calcination Temperature

Calcination of amorphous titania may be carried out at a temperature at least higher than the crystallization temperature of anatase. Upon calcination at a temperature of 400-500° C. or more, amorphous titania may be transformed into the anatase form of titania. Upon calcination at a temperature of 600-700° C. or more, amorphous titania may be transformed into the rutile form of titania.

(5) Formation of Diffusion Prevention Layer

When the substrate is made of materials such as glass or glazed tile which contains alkaline network-modifier ions (e.g., sodium), it is preferable that an intermediate layer of silica and the like is formed between the substrate and the layer of amorphous titania prior to calcination. This arrangement prevents alkaline network-modifier ions from being diffused from the substrate into the photocatalytic coating during calcination of amorphous titania. As a result, superhydrophilification may be accomplished to the degree that the contact angle with water becomes as small as 0°.

Photocatalytic Layer of Silica-Blended Titania

Another preferred method of forming an abrasion resistant photocatalytic coating which exhibits the superhydrophilicity of such a degree that the contact angle with water approaches or is equal to 0° is to form on the surface of the substrate a photocatalytic coating comprised of a mixture of titania and silica. The ratio of silica to the sum of titania and silica (by mole percent) may be 5-90%, preferably 10-70%, more preferably 10-50%. The formation of a photocatalytic coating comprised of silica-blended titania may be carried out by any of the following methods.

(1) A suspension containing particles of the anatase form or rutile form of titania and particles of silica is applied to the surface of a substrate, followed by sintering at a temperature less than the softening point of the substrate.

(2) A mixture of a precursor of amorphous silica (e.g., tetraalkoxysilane such as tetraethoxysilane, tetraisopropoxysilane, tetra-n-propoxysilane, tetrabuthoxysilane, and tetramethoxysilane; silanol formed by hydrolysis of tetraalkoxysilane; or polysiloxane having a mean molecular weight of less than 3000) and a crystalline titania sol is applied to the surface of a substrate and is subjected to hydrolysis where desired to form silanol, followed by heating at a temperature higher than about 100° C. to subject the silanol to dehydration polymerization to thereby form a photocatalytic coating wherein titania particles are bound by amorphous silica. In this regard, if dehydration polymerization of silanol is carried out at a temperature higher than about 200° C., polymerization of silanol is accomplished to a high degree so that the alkali resistance of the photocatalytic coating is enhanced.

(3) A suspension comprised of particles of silica dispersed in a solution of a precursor of amorphous titania (e.g., an organic compound of titanium such as alkoxide, chelate or acetate of titanium; or an inorganic compound of titanium such as $TiCl_4$ and $Ti(SO_4)_2$) is applied to the surface of a substrate and then the precursor is subjected to hydrolysis and dehydration polymerization at a temperature ranging from the ambient temperature to 200° C. to thereby form a thin film of amorphous titania wherein particles of silica are dispersed. Then, the thin film is heated at a temperature higher than the crystallization temperature of titania but lower than the softening point of the substrate to thereby transform amorphous titania into crystalline titania by phase transition.

(4) Added to a solution of a precursor of amorphous titania (e.g., an organic compound of titanium such as an alkoxide, chelate or acetate of titanium; or an inorganic compound of titanium such as $TiCl_4$ or $Ti(SO_4)_2$) is a precursor of amorphous silica (e.g., a tetraalkoxysilane such as tetraethoxysilane, tetraisopropoxysilane, tetra-n-propoxysilane, tetrabuthoxysilane, or tetramethoxysilane; a hydrolyzate thereof, i.e., silanol; or a polysiloxane having a mean molecular weight of less than 3000) and the mixture is applied to the surface of a substrate. Then, these precursors are subjected to hydrolysis and dehydration polymerization to form a thin film made of a mixture of amorphous titania and amorphous silica. Thereafter, the thin film is heated at a temperature higher than the crystallization temperature of titania but lower than the softening point of the substrate to thereby transform amorphous titania into crystalline titania by phase transition.

Photocatalytic Layer of Tin Oxide-Blended Titania

Still another preferred method of forming an abrasion resistant photocatalytic coating which exhibits the superhydrophilicity of such a degree that the contact angle with water is equal to 0 is to form on the surface of a substrate a photocatalytic coating comprised of a mixture of titania and tin oxide. The ratio of tin oxide to the sum of titania and tin oxide may be 1-95% by weight, preferably 1-50% by weight. Formation of a photocatalytic coating comprised of tin oxide-blended titania may be carried out by any of the following methods.

(1) A suspension containing particles of the anatase form or rutile form of titania and particles of tin oxide is applied to the surface of a substrate, followed by sintering at a temperature less than the softening point of the substrate.

(2) A suspension comprised of particles of tin oxide dispersed in a solution of a precursor of amorphous titania (e.g., an organic compound of titanium such as alkoxide, chelate or acetate of titanium; or an inorganic compound of titanium such as $TiCl_4$ or $Ti(SO_4)_2$) is applied to the surface of a substrate and then the precursor is subjected to hydrolysis and dehydration polymerization at a temperature ranging from the ambient temperature to 200° C. to thereby form a thin film of amorphous titania wherein particles of tin oxide are dispersed. Then, the thin film is heated at a temperature higher than the crystallization temperature of titania but lower than the softening point of the substrate to thereby transform amorphous titania into crystalline titania by phase transition.

Silicone Paint Containing Photocatalyst

A further preferred method of forming a photocatalytic coating which exhibits the superhydrophilicity of such a degree that the contact angle with water is equal to 0° is to use a coating composition wherein particles of a photocatalyst are dispersed in a film forming element of uncured or partially cured silicone (organopolysiloxane) or a precursor thereof.

The coating composition is applied on the surface of a substrate and the film forming element is then subjected to curing. Upon photoexcitation of the photocatalyst, the organic groups bonded to the silicon atoms of the silicone molecules are substituted with hydroxyl groups under the photocatalytic action of the photocatalyst, as described later with reference to Examples 13 and 14, whereby the surface of the photocatalytic coating is superhydrophilified.

This method provides several advantages. Since the photocatalyst-containing silicone paint can be cured at ambient temperature or at a relatively low temperature, this method may be applied to a substrate formed of a non-heat-resistant material such as plastics. The coating composition containing the photocatalyst may be applied whenever desired by way of brush painting, spray coating, roll coating and the like on any existing substrate requiring superhydrophilification of the surface. Superhydrophilification by photoexcitation of the photocatalyst may be readily carried out even by the sunlight as a light source.

Furthermore, in the event that the coating film is formed on a plastically deformable substrate such as a steel sheet, it is possible to readily subject the steel sheet to plastic working as desired after curing of the coating film and prior to photoexcitation. Prior to photoexcitation, the organic groups are bonded to the silicon atoms of the silicone molecules so that the coating film has an adequate flexibility. Accordingly, the steel sheet may be readily deformed without damaging the coating film. After plastic deformation, the photocatalyst may be subjected to photoexcitation whereupon the organic groups bonded to the silicon atoms of the silicone molecules will be substituted with hydroxyl groups under the action of photocatalyst to thereby render the surface of the coating film superhydrophilic.

It is believed that the photocatalyst-containing silicone paint has a sufficient resistance to photooxidation action of the photocatalyst because it is composed of the siloxane bond.

Another advantage of the photocatalytic coating made of photocatalyst-containing silicone paint is that, once the surface has been rendered superhydrophilic, the superhydrophilicity is maintained for a long period of time even if the coating is kept in the dark and a further advantage is that the superhydrophilicity can be restored even by the light of an indoor illumination lamp such as fluorescent lamp.

Examples of the film forming element usable in the invention include methyltrichlorosilane, methyltribromosilane, methyltrimethoxysilane, methyltriethoxysilane, methyltriisopropoxysilane, methyltri-t-buthoxysilane; ethyltrichlorosilane, ethyltribromosilane, ethyltrimethoxysilane, ethyltriethoxysilane, ethyltriisopropoxysilane, ethyltri-t-buthoxysilane; n-propyltrichlorosilane, n-propyltribromosilane, n-propyltrimethoxysilane, n-propyltriethoxysilane, n-propyltriisopropoxysilane, n-propyltri-t-buthoxysilane; n-hexyltrichlorosilane, n-hexyltribromosilane, n-hexyltrimethoxysilane, n-hexyltriethoxysilane, n-hexyltriisopropoxysilane, n-hexyltri-t-buthoxysilane; n-decyltrichlorosilane, n-decyltribromosilane, n-decyltrimethoxysilane, n-decyltriethoxysilane, n-decyltriisopropoxysilane, n-decyltri-t-buthoxysilane; n-octadecyltrichlorosilane, n-octadecyltribromosilane, n-octadecyltrimethoxysilane, n-octadecyltriethoxysilane, n-octadecyltriisopropoxysilane, n-octadecyltri-t-buthoxysilane; phenyltrichlorosilane, phenyltribromosilane, phenyltrimethoxysilane, phenyltriethoxysilane, phenyltriisopropoxysilane, phenyltri-t-buthoxysilane; tetrachlorosilane, tetrabromosilane, tetramethoxysilane, tetraethoxysilane, tetrabuthoxysilane, dimethoxydiethoxysilane; dimethyldichlorosilane, dimethyldibromosilane, dimethyldimethoxysilane, dimethyldiethoxysilane; diphenyldichlorosilane, diphenyldibromosilane, diphenyldimethoxysilane, diphenyldiethoxysilane; phenylmethyldichlorosilane, phenylmethyldibromosilane, phenylmethyldimethoxysilane, phenylmethyldiethoxysilane; trichlorohydrosilane, tribromohydrosilane, trimethoxyhydrosilane, triethoxyhydrosilane, triisopropoxyhydrosilane, tri-t-buthbxyhydrosilane; vinyltrichlorosilane, vinyltribromosilane, vinyltrimethoxysilane, vinyltriethoxysilane, vinyltriisopropoxysilane, vinyltri-t-buthoxysilane; trifluoropropyltrichlorosilane, trifluoropropyltribromosilane, trifluoropropyltrimethoxysilane, trifluoropropyltriethoxysilane, trifluoropropyltriisopropoxysilane, trifluoropropyltri-t-buthoxysilane; gamma-glycidoxypropylmethyldimethoxysilane, gamma-glycidoxypropylmethyldiethoxysilane, gamma-glycidoxypropyltrimethoxysilane, gamma-glycidoxypropyltriethoxysilane, gamma-glycidoxypropyltriisopropoxysilane, gamma-glycidoxypropyltri-t-buthoxysilane; gamma-methacryloxypropylmethyl dimethoxysilane, gamma-methacryloxypropylmethyldiethoxysilane, gamma-methacryloxypropyltrimethoxysilane, gamma-methacryloxypropyltriethoxysilane, gamma-methacryloxypropyltriisopropoxysilane, gamma-methacryloxypropyltri-t-buthoxysilane; gamma-aminopropylmethyldimethoxysilane, gamma-aminopropylmethyldiethoxysilane, gamma-aminopropyltrimethoxysilane, gamma-aminopropyltriethoxysilane, gamma-aminopropyltriisopropoxysilane, gamma-aminopropyltri-t-buthoxysilane; gamma-mercaptopropylmethyldimethoxysilane, gamma-mercaptopropylmethyldiethoxysilane, gamma-mercaptopropyltrimethoxysilane, gamma-mercaptopropyltriethoxysilane, gamma-mercaptopropyltriisopropoxysilane, gamma-mercaptopropyltri-t-buthoxysilane; β-(3,4-epoxycyclohexyl)ethyltrimethoxysilane, β-(3,4-epoxycyclohexyl)ethyltriethoxysilane; partial hydrolizates of any of the foregoing; and mixtures of any of the foregoing.

To ensure that the silicone coating exhibits a satisfactory hardness and smoothness, it is preferable that the coating contains (by mole percent) more than 10% of a three-dimensionally cross-linking siloxane. In addition, to provide an adequate flexibility of the coating film yet assuring a satisfactory hardness and smoothness, it is preferred that the coating contains less than 60% (by mole percent) of a two-dimensionally cross-linking siloxane. Furthermore, to enhance the speed that the organic groups bonded to the silicon atoms of the silicone molecules are substituted with hydroxyl groups upon photoexcitation, it is desirable to use a silicone wherein the organic groups bonded to the silicon atoms of the silicone molecules are n-propyl or phenyl groups. In place of silicone having siloxane bonds, an organopolysilazane having silazane bonds may be used.

Addition of Antibacterial Enhancer

The photocatalytic coating may be doped with a metal such as Ag, Cu and Zn.

Doping of the photocatalyst with a metal such as Ag, Cu or Zn may be carried out by adding a soluble salt of such metal to a suspension containing particles of the photocatalyst, the resultant solution being used to form the photocatalytic coating. Alternatively, after forming the photocatalytic coating, a soluble salt of such metal may be applied thereon and may be subjected to irradiation of light to deposit the metal by photoreduction.

The photocatalytic coating doped with a metal such as Ag, Cu or Zn is capable of killing bacteria adhered to the surface. Moreover, such photocatalytic coating inhibits growth of microorganisms such as mold, algae and moss. As a result, the surface of a building, machine, apparatus, household, article and the like can be maintained clean for a long period.

Addition of Photoactivity Enhancer

The photocatalytic coating may additionally be doped with a metal of the platinum group such as Pt, Pd, Rh, Ru, Os or Ir. These metals may be similarly doped into the photocatalyst by photoreduction deposition or by addition of a soluble salt.

A photocatalyst doped with a metal of the platinum group develops an enhanced photocatalytic redox activity so that decomposition of contaminants adhering on the surface will be promoted.

Photoexcitation and UV Irradiation

For antifogging purposes (e.g., with respect to a transparent member such as glass, a lens or a mirror), it is preferable that the photocatalytic coating be formed from a photocatalyst such as titania that has a high band gap energy and can be photoexcited only by UV light. In such event, the photocatalytic coating does not absorb visible light so that glass, a lens or a mirror, or other such transparent member, would not be colored by a complementary color component. The anatase form of titania may be photoexcited by a UV light having a wavelength less than 387 nm, with the rutile form of titania by a UV light having a wavelength less than 413 nm, with tin oxide by a UV light having a wavelength less than 344 nm, with zinc oxide by a UV light having a wavelength less than 387 nm.

As a source of UV light, a fluorescent lamp, incandescent lamp, metal halide lamp, mercury lamp or other type of indoor illumination lamp may be used. As the antifogging glass, lens or mirror, or other transparent member, is exposed to UV light, the surface thereof will be superhydrophilified by photoexcitation of the photocatalyst. In a situation where the photocatalytic coating is exposed to sunlight as in the case of a rearview mirror of a vehicle, the photocatalyst will advantageously be photoexcited spontaneously by the UV light contained in the sunlight.

Photoexcitation may be carried out, or caused to be carried out, until the contact angle, with water, of the surface becomes less than about 10°, preferably less than about 5°, particularly equal to about 0°. Generally, by photoexciting at a UV intensity of 0.001 mW/cm$^2$, the photocatalytic coating will be superhydrophilified within several days to the degree that the contact angle with water becomes about 0°. Since the intensity of the UV light contained in the sunlight impinging upon the earth's surface is about 0.1-1 mW/cm$^2$, the surface will be superhydrophilified in a shorter time when exposed to the sunlight.

In the case that the surface of the substrate is to be self-cleaned by rainfall or to be prevented from adhesion of contaminants, the photocatalytic coating may be formed of a photocatalyst which can be photoexcited by UV light or visible light. If the articles covered by the photocatalytic coating are disposed outdoors, they will ordinarily be subjected to irradiation of the sunlight and to rainfall.

When the photocatalytic coating is made of titania-containing silicone, it is preferable to photoexcite the photocatalyst at such an intensity to ensure that a sufficient amount of the surface organic groups bonded to the silicon atoms of the silicone molecules are substituted with hydroxyl groups. The most convenient method therefor is to use the sunlight.

Once the surface has been made highly hydrophilic, the hydrophilicity is sustained even during the night. Upon exposure again to the sunlight, the hydrophilicity will be restored and maintained.

It is preferable that the photocatalytic coating is superhydrophilified in advance before the substrate coated by the photocatalytic coating according to the invention is offered for use to the user.

EXAMPLES

The following Examples illustrate the industrial applicability of the invention from various aspects.

Example 1

Antifogging Mirror—Antifogging Photocatalytic Coating with Interleaved Silica Layer 6 parts by weight of tetraethoxysilane Si(OC$_2$H$_5$)$_4$ (Wako JunYaku, Osaka), 6 parts by weight of pure water, and 2 parts by weight of 36% hydrochloric acid as a hydrolysis inhibitor were added to 86 parts by weight of ethanol as a solvent and the mixture was stirred to obtain a silica coating solution. The solution was allowed to cool for about 1 hour since the solution evolved heat upon mixing. The solution was then applied on the surface of a soda-lime glass plate of 10 cm square in size by the flow coating method and was dried at a temperature of 80° C. As drying proceeds, tetraethoxysilane was hydrolyzed to first form silanol Si(OH)$_4$ which then underwent dehydration polymerization to form a thin film of amorphous silica on the surface of the glass plate.

Then a titania coating solution was prepared by adding 0.1 parts by weight of 36% hydrochloric acid as a hydrolysis inhibitor to a mixture of 1 part by weight of tetraethoxytitanium (Ti(OC$_2$H$_5$)$_4$) (Merck) and 9 parts by weight of ethanol, and the solution was applied to the surface of the above-mentioned glass plate by the flow coating method in dry air. The amount of coating was 45 µg/cm$^2$ in terms of titania. As the speed of hydrolysis of tetraethoxytitanium was so high, hydrolysis of tetraethoxytitanium partially commenced during the course of coating so that formation of titanium hydroxide Ti(OH)$_4$ started.

Then the glass plate was held at a temperature of about 150° C. for 1-10 minutes to permit completion of the hydrolysis of tetraethoxy-titanium and to subject the resultant titanium hydroxide to dehydration polymerization whereby amorphous titania was formed. In this manner, a glass plate was obtained having a coating of amorphous titania overlying the coating of amorphous silica.

This specimen was then fired or calcined at a temperature of 500° C. in order to transform amorphous titania into the anatase form of titania. It is considered that, due to the presence of the coating of amorphous silica underlying the coating of amorphous titania, alkaline network-modifier ions (such as sodium ions present in the glass plate) were prevented from diffusing from the glass substrate into the titania coating during calcination.

Then a reflective coating of aluminum was formed by vacuum evaporation deposition on the back of the glass plate to prepare a mirror to thereby obtain #1 specimen.

After the #1 specimen was kept in the dark for several days, a UV light was irradiated on the surface of the specimen for about one hour at a UV intensity of 0.5 mW/cm$^2$ (the intensity of UV light having an energy higher than the band gap energy of the anatase form of titania, i.e., the intensity of UV light having a wavelength shorter than 387 nm) by using a 20 W blue-light-black (BLB) fluorescent lamp (Sankyo Electric, FL20BLB) to obtain #2 specimen.

For the purposes of comparison, a reflective coating of aluminum was formed by vacuum evaporation deposition on the back of a glass plate provided neither with silica nor titania coating, the product being placed in the dark for several days to obtain #3 specimen.

The contact angle, with water, of the #2 and #3 specimens was measured by a contact angle meter (Kyowa Kaimen Kagaku K.K. of Asaka, Saitama, Model CA-X150). The resolving power at the small angle side of this contact angle meter was 1°. The contact angle was measured 30 seconds after a water droplet was dripped from a micro-syringe onto the surface of the respective specimens. In the #2 specimen, the reading of the contact angle meter was 0° so that the surface exhibited superhydrophilicity. In contrast, the contact angle with water of the #3 specimen was 30-40°.

Then the #2 and #3 specimens were tested for antifogging capability, as well as to see how adherent water droplets would spread over the surface. Assessment of the antifogging capability was done by filling a 500 ml beaker with 300 ml of hot water at about 80° C., and thereafter placing each specimen on the beaker for about 10 seconds with the front surface of the mirror directed downwards, and then inspecting immediately thereafter the presence or absence of a fog on the surface of the specimen and inspecting how the face of the tester reflected.

With the #3 specimen, the surface of the mirror was fogged by steam so that the image of the observer's face was not reflected well. However, with the #2 specimen, no fogging was observed at all and the face of the tester was clearly reflected.

Assessment of the spreading of adherent water droplets was carried out by dripping several water droplets from a pipette onto the mirror surface of each specimen inclined at an angle of 45°, rotating the mirror into a vertical position, and thereafter inspecting how the droplets adhered and how the face of the observer reflected.

With the #3 specimen, dispersed discrete water droplets which were obstructive to the eye adhered on the mirror surface. As a result, the reflected image was disturbed by the refraction of light due to adherent droplets so that it was difficult to observe the reflected image with clarity. In contrast, with the #2 specimen, water droplets adhered onto the mirror surface were allowed to spread over the surface to form a relatively uniform water film without forming discrete water droplets. Although a slight distortion of the reflected image due to the presence of the water film was observed, it was possible to recognize the reflected image of the tester's face with a sufficient clarity.

Example 2

Antifogging Mirror—Photocatalytic Coating Comprising Silica-Blended Titania

A thin film of amorphous silica was formed on the surface of a mirror (made by Nihon Flat Glass, MFL3) in a manner similar to Example 1.

Then a coating solution was prepared by admixing 0.69 g of tetraethoxysilane (Wako JunYaku), 1.07 g of a sol of the anatase form of titania (Nissan Chemical Ind., TA-15, mean particle size of 0.01 μm), 29.88 g of ethanol, and 0.36 g of pure water. The coating solution was applied on the surface of the mirror by spray coating process. The mirror was held at a temperature of about 150° C. for about 20 minutes to subject tetraethoxysilane to hydrolysis and dehydration polymerization to thereby form on the mirror surface a coating wherein particles of the anatase form of titania were bound by a binder of amorphous silica. The ratio by weight of titania to silica was 1.

After the mirror was kept in the dark for several days, a UV light was irradiated by the BLB fluorescent lamp for about one hour, at a UV intensity of 0.5 mW/cm$^2$ to obtain #1 specimen. The contact angle with water at the surface of the mirror was measured by the same contact angle meter as used in Example 1 and the reading of the contact angle meter was 0°.

Then, in the manner similar to Example 1, the antifogging capability and the spreading of adherent water droplets were assessed with respect to the coated #1 specimen, as well as to an "MFL3" mirror specimen not provided with a photo-catalytic coating. In the test for antifogging property, with the coated #1 specimen, no fog was observed at all and the tester's face was clearly reflected, in contrast to the uncoated "MFL3" mirror wherein a fog was observed on the surface of the mirror so that the image of the tester's face was not clearly reflected. In the inspection for spreading of adherent water droplets, with the uncoated "MFL3" mirror, water droplets remained as droplets on the surface, causing refraction of light and thereby disturbing the reflected image, so that it was difficult to clearly observe the reflected image. With the coated #1 specimen, in contrast, water droplets on the mirror were spread over the surface to form a relatively uniform water film and, although a slight distortion was observed in the reflected image due to the presence of the water film, it was possible to recognize the reflected image of the tester's face with sufficient clarity.

Example 3

Antifogging Eyeglass Lens

First, a thin film of amorphous silica was formed in a manner similar to Example 1 on both sides of an eyeglass lens commercially available on the market.

Then, the coating solution similar to that of Example 2 was spray coated on both sides of the lens and the lens was held at a temperature of about 150° C. for about 20 minutes to subject tetraethoxysilane to hydrolysis and dehydration polymerization to thereby form on each side of the lens a coating wherein particles of the anatase form of titania were bound by a binder of amorphous silica.

After the lens was kept in the dark for several days, it was irradiated with UV light from a BLB fluorescent lamp for about one hour at a UV intensity of 0.5 mW/cm². When the contact angle with water at the surface of the lens was measured by the same contact angle meter as used in Example 1, the reading of the contact angle meter was 0°. This lens was mounted to the right-hand side of a pair of eyeglasses, with an ordinary lens being mounted for the purposes of comparison to the left-hand side.

When, several hours later, the tester wore the glasses and took a bath for about 5 minutes, the ordinary lens on the left was fogged with steam so that the eyesight was lost. However, formation of fog was not observed at all on the right-hand lens coated with the photocatalytic coating that had been subjected to UV irradiation.

As the tester then intentionally directed a shower on the glasses, obstructive water droplets adhered on the left-hand ordinary lens so that a view was interrupted. However, water droplets on the right-hand lens promptly spread into a water film so that a sufficient view, with adequate clarity, was secured.

Example 4

Antifogging Glass—7 nm Thick Titania Coating

A solution containing a chelate of titanium was applied to the surface of a soda-lime glass plate (10 cm square in size) and the titanium chelate was subjected to hydrolysis and dehydration polymerization to form amorphous titania on the surface of the glass plate. The plate was then calcined at a temperature of 500° C. to form a surface layer of crystals of the anatase form of titania. The thickness of the surface layer was 7 nm.

The surface of the thus obtained specimen was first subjected to irradiation with UV light for about one hour, at a UV intensity of 0.5 mW/cm², by using a BLB fluorescent lamp. The contact angle with water of the surface of this specimen was measured by a contact angle meter (made by ERMA, Model G-I-1000, the resolving power at the small angle side being 3°), and the reading of the contact angle meter was less than 3°.

Figure 3:
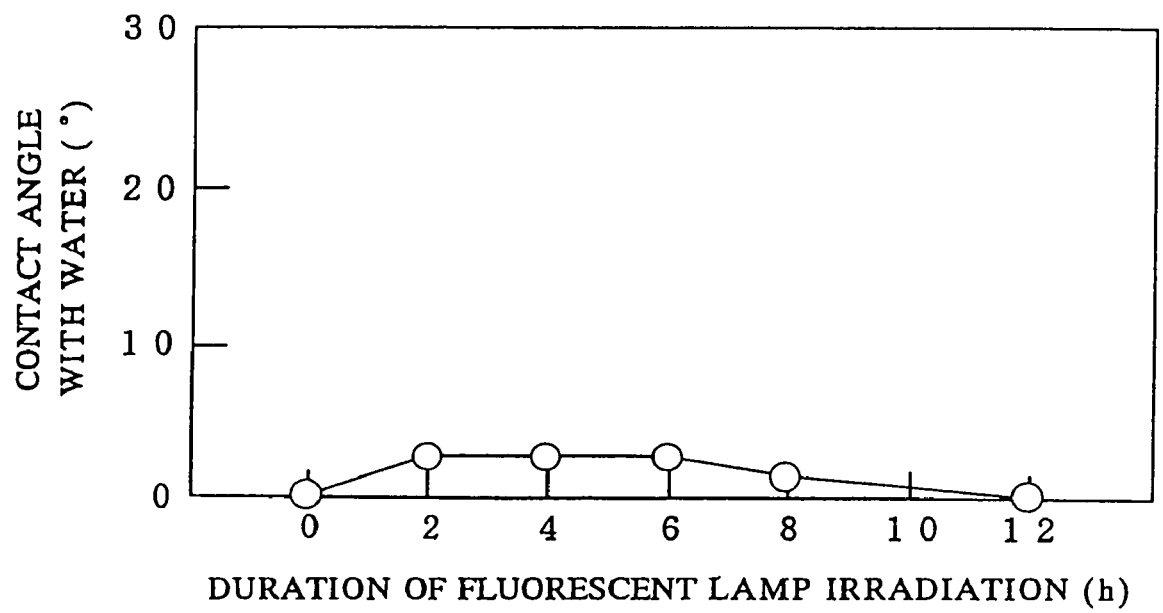
FIGS. 3-5, 7 and 9 are graphs respectively showing the variation, in response to time, of the contact angle with water of various specimens in the Examples as the specimens are subjected to irradiation of ultraviolet light.

Then, while irradiating with UV light at a UV intensity of 0.01 mW/cm² by using a 20 W white fluorescent lamp (Toshiba, FL20SW), the variation, in response to time, of the contact angle was measured. The results are plotted in the graph of FIG. 3. It will be noted from the graph that the surface of the specimen was maintained highly hydrophilic even by a weak UV light emitted from the white fluorescent lamp.

This Example illustrates that the surface of the photocatalytic titania coating can be maintained highly hydrophilic even though the thickness thereof is made as extremely small as 7 nm. This is very important in preserving the transparency of a substrate such as a windowpane.

Example 5

Antifogging Glass—20 nm Thick Titania Coating

A surface layer of anatase-form titania crystals was formed on the surface of a soda-lime glass plate in a manner similar to Example 4. The thickness of the surface layer was 20 nm.

Figure 4:
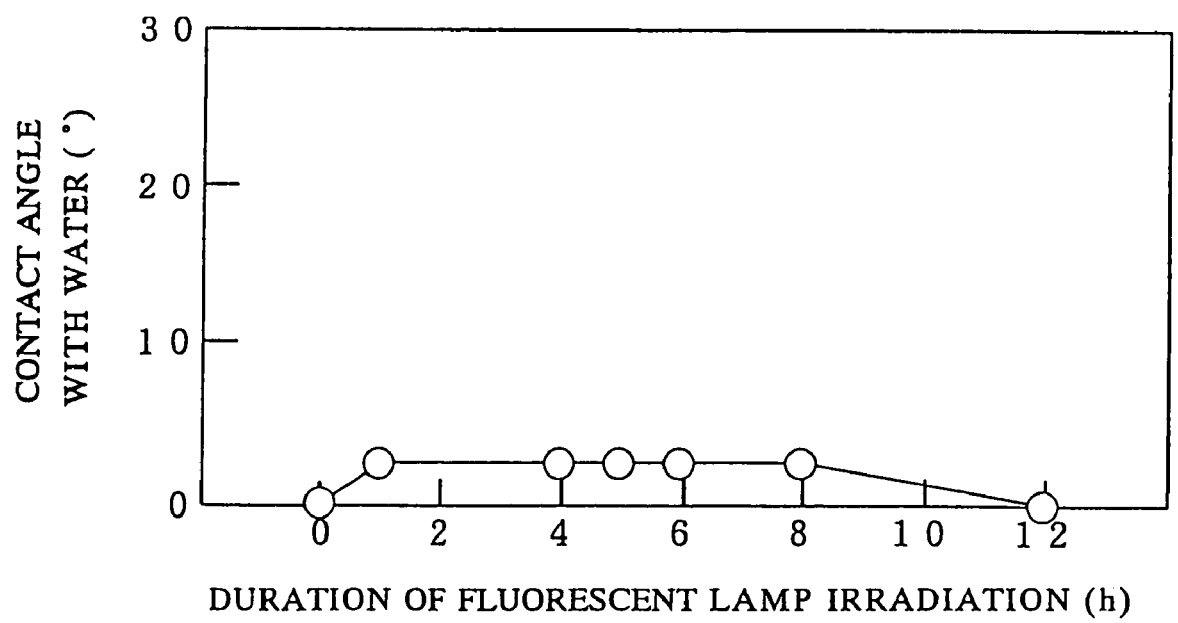

Similar to Example 4, the surface of the thus obtained specimen was first subjected to irradiation with UV light for about one hour, at a UV intensity of 0.5 mW/cm², by using a BLB fluorescent lamp. Then, the variation in response to time of the contact angle was measured while subjecting the specimen to irradiation with UV light at a UV intensity of 0.01 mW/cm², by using a white fluorescent lamp. The results are shown in the graph of FIG. 4. In this Example, too, the surface of the specimen was maintained highly hydrophilic by a weak UV light emitted from a white fluorescent lamp.

Example 6

Antifogging Glass—Effect of Calcination Temperature of Amorphous Titania

In a manner similar to Example 1, a thin film of amorphous silica was first formed on the surface of soda-lime glass plates (each 10 cm square in size) and then a thin film of amorphous titania was coated thereon to obtain a plurality of specimens.

These glass plates were then calcined at temperatures of 450° C., 475° C., 500° C., and 525° C., respectively. Upon inspection by the powder X-ray diffraction method, the presence of crystalline titania of the anatase form was detected in the specimens calcined at 475° C., 500° C., and 525° C. so that transformation of amorphous titania into the anatase form crystalline titania was confirmed in these specimens. However, in the specimen calcined at 450° C., the anatase form of titania was not detected.

The surface of the thus obtained specimens was first subjected to irradiation with UV light for about three hours, at a UV intensity of 0.5 mW/cm², by using a BLB fluorescent lamp. Then, the variation in response to time of the contact angle was measured by the contact angle meter (CA-X150) while subjecting the specimen to irradiation with UV light, at a UV intensity of 0.02 mW/cm², by using a white fluorescent lamp. The results are shown in Table 1.

TABLE 1

| Calcination Temp (° C.) | Contact Angle (°) | | | |
| --- | --- | --- | --- | --- |
| | immed. aft BLB irradn | 3 days later | 9 days later | 14 days later |
| 450 | 10 | 13 | 15 | 23 |
| 475 | 0 | 0 | 0 | 0 |
| 500 | 0 | 0 | 0 | 0 |
| 525 | 0 | 0 | 0 | 0 |

As will be apparent from Table 1, it was found that, in the specimens which were calcined at temperatures of 475° C., 500° C., and 525° C., respectively, and in which the formation of anatase crystals were confirmed, the contact angle was maintained at 0° and the surface of the glass plate was maintained superhydrophilic as long as irradiation with UV light by a white fluorescent lamp was continued. In contrast, it was observed that the coating of amorphous titania of the specimen calcined at 450° C. did not exhibit photocatalytic activity so that the contact angle increased as time elapsed.

When a blow of breath was blown upon the specimens calcined at temperatures of 475° C., 500° C., and 525° C., respectively, no formation of fog was observed on the specimen surfaces.

Example 7

Antifogging Glass—Effect of Alkaline Network Modifier Ion Diffusion

A titania coating solution similar to Example 1 was prepared and was applied by the flow coating method on the surface of a soda-lime glass plate (10 cm square in size). Similar to Example 1, the amount of coating was 45 μg/cm$^2$ in terms of titania.

The glass plate was similarly held at a temperature of about 150° C. for 1-10 minutes to form amorphous titania on the surface of the glass plate. The specimen was then calcined at a temperature of 500° C. to transform amorphous titania into the anatase form of titania.

After keeping the specimen in the dark for several days, UV light was irradiated on the surface of the specimen for about one hour, at a UV intensity of 0.5 mW/cm$^2$, by using a BLB fluorescent lamp. Thereafter, the contact angle with water was measured by the contact angle meter (CA-X150), which indicated a contact angle of 3°.

It is considered that the reason why the contact angle for this specimen was not reduced to 0 is that because, contrary to Example 1, the specimen of this Example was not provided with a silica layer interleaved between the glass substrate and the titania layer. Thus, the alkaline network-modifier ions (such as sodium ions) were allowed to diffuse from the glass substrate into the titania coating during calcination at 500° C., whereby the photocatalytic activity of titania was hindered.

It is therefore believed that, in order to realize the superhydrophilicity of such a degree that the contact angle with water is equal to 0°, it is preferable to provide an intermediate layer of silica as in Example 1.

Example 8

Antifogging Glass—Formation of Amorphous Titania BY Sputtering

A film of metallic titanium was deposited by sputtering on the surface of a soda-lime glass plate (10 cm square in size). The glass plate was then calcined at a temperature of 500° C. Upon inspection by the powder X-ray diffraction method, formation of the anatase form of titania was observed on the surface of the glass plate. Metallic titanium was apparently oxidized into the anatase form by calcination.

Figure 5:
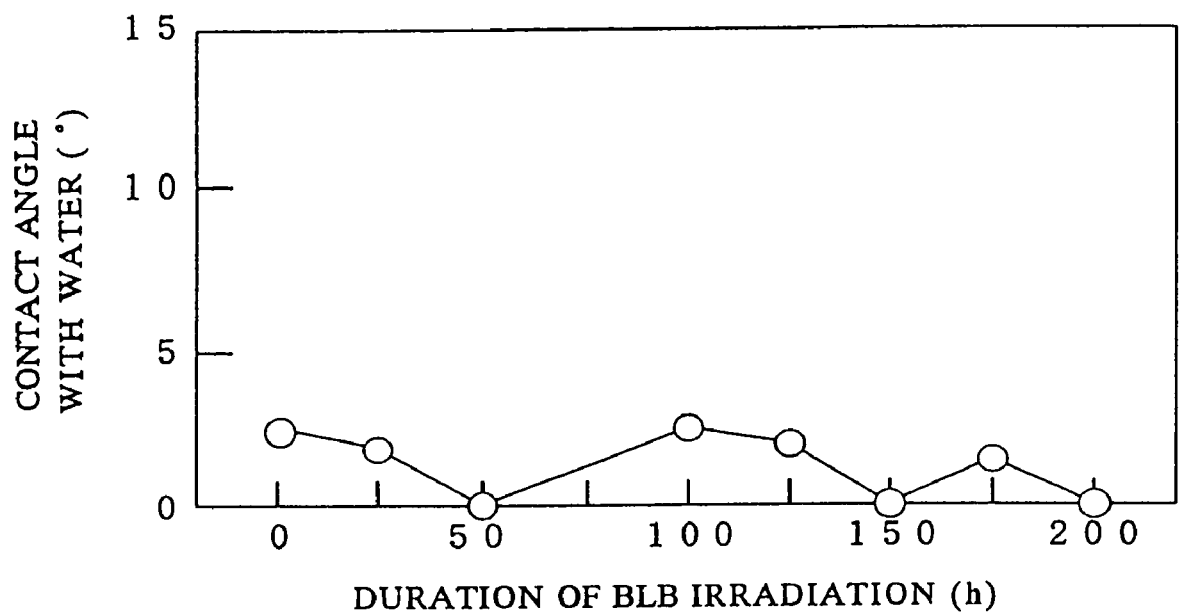

Soon after calcination, the surface of the specimen was subjected to irradiation with UV light, at a UV intensity of 0.5 mW/cm$^2$, by using a BLB fluorescent lamp. The contact angle with water was then measured by the contact angle meter (CA-X150) to monitor the variation in response to time of the contact angle, while irradiation continued. The results are shown in the graph of FIG. 5. As will be apparent from the graph, the contact angle with water was kept less than 3°. This experiment illustrates that, even in the case where the photocatalytic coating is formed by sputtering, the surface of a glass plate is maintained highly hydrophilic upon UV irradiation.

Example 9

Antifogging Glass—UV Intensity of 800 Lux

A thin film of amorphous silica was formed on the surface of a 10 cm-square soda-lime glass plate in a manner similar to Example 1.

Then the coating solution of Example 2 was applied by spray coating on the surface of the glass plate. The glass plate was then held at a temperature of about 150° C. for about 20 minutes whereby a coating in which particles of the anatase form of titania were bound by a binder of amorphous silica was formed on the surface of the glass plate. The ratio by weight of titania to silica was 1.

After being kept in the dark for several days, the glass plate was subjected to irradiation with UV light for about one hour, at a UV intensity of 0.5 mW/cm$^2$, by a BLB fluorescent lamp. After UV irradiation, the contact angle with water of the surface of the glass plate was measured by the contact angle meter (CA-X150) and it was found that the contact angle was 0°.

Thereafter, the specimen was subjected to irradiation with UV light for 4 days, at a UV intensity of 0.004 mW/cm$^2$ (800 lux), by using a white fluorescent lamp. While the specimen was under UV irradiation, the contact angle at the surface thereof was maintained less than 2°. When 4 days later a blow of breath was blown upon the specimen, formation of fog was not observed.

In this way, it was confirmed that, even with a weak UV light such as is available for indoor illumination achieved, for example, by a white fluorescent lamp, the surface of the glass plate was maintained highly hydrophilic and fogging of the glass plate was prevented.

Example 10

Antifogging Glass—Effect of Silica-to-Titania Blending Ratio

Next, tetraethoxysilane (Wako JunYaku), a sol of the anatase form of titania (Nissan Chemical Ind., TA-15), ethanol, and pure water were admixed in varying rate to prepare four kinds of coating solutions having different tetraethoxysilane-to-titania sol blending ratios. The ratios of tetraethoxysilane to titania sol were selected so that, after tetraethoxysilane was converted into amorphous silica, the ratio of silica to the sum of silica plus titania was equal, by mole percent, to 10%, 30%, 50%, and 70%, respectively.

Each of the coating solutions was applied by spray coating on the surface of a 10 cm-square soda-lime glass plate which was then held at a temperature of about 150° C. for about 20 minutes to subject tetraethoxysilane to hydrolysis and dehydration polymerization. Thus, a coating in which particles of the anatase form of titania were bound by a binder of amorphous silica was formed on the surface of the glass plate.

After being kept in the dark for a week, the specimens were subjected to irradiation with UV light for about one hour, at a UV intensity of 0.3 mW/cm$^2$, by a BLB fluorescent lamp. After UV irradiation, the contact angle with water was measured for the surface of the respective specimens using the contact angle meter (CA-X150). The contact angle was 0° throughout all the specimens.

Thereafter, two specimens with coatings having 30% by mol and 50% by mol of silica, respectively, were subjected to irradiation with UV light for 3 days, at a UV intensity of 0.004 mW/cm$^2$, by using a white fluorescent lamp. While the specimens were under irradiation, the contact angle at the surface thereof was maintained less than 3°.

Example 11

Antifogging Glass—Rutile Form Photocatalytic Coating

A titania coating solution was prepared by adding 0.1 part by weight of 36% hydrochloric acid as a hydrolysis inhibitor to a mixture of 1 part by weight of tetraethoxytitanium $(Ti(OC_2H_5)_4)$ (Merck) and 9 parts by weight of ethanol. The solution was then applied to the surface of a plurality of quartz glass plates (10 cm square in size) by the flow coating method in dry air. The amount of coating was 45 µg/cm² in terms of titania.

The glass plates were then held at a temperature of about 150° C. for 1-10 minutes to subject tetraethoxytitanium to hydrolysis and dehydration polymerization whereby a coating of amorphous titania was formed on the surface of each glass plate.

These specimens were then calcined at temperatures of 650° C. and 800° C., respectively, to subject amorphous titania to crystallization. Upon inspection by the powder X-ray diffraction method, it was found that the crystal form of the specimen calcined at 650° C. was of the anatase form while the crystal form of the specimen calcined at 800° C. was of the rutile form.

After keeping the thus obtained specimens in the dark for a week, they were subjected to irradiation with UV light for 2 days, at a UV intensity of 0.3 mW/cm², by a BLB fluorescent lamp. After UV irradiation, the contact angle was measured. The contact angle with water of the surface was 0° throughout all the specimens.

It will be understood from the foregoing that a surface can be maintained highly hydrophilic not only in the case that the photocatalyst is the anatase form of titania but also in the case that the photocatalyst is the rutile form.

For this reason, it seems that the phenomenon of photocatalytic superhydrophilification is not altogether the same as the photocatalytic redox reaction.

Example 12

Antifogging Glass—Transmittance Test

In a manner similar to Example 1, a thin film of amorphous silica was first formed on the surface of a soda-lime glass plate (10 cm square in size) and then a thin film of amorphous titania was coated thereon. The glass plate was then calcined at a temperature of 500° C. to transform amorphous titania into the anatase form of titania. The specimen thus obtained was kept in the dark for several days. Then the specimen was placed in a desiccator (24° C. in temperature and 45-50% in humidity) housing a BLB fluorescent lamp and was subjected to irradiation with UV light for one day, at a UV intensity of 0.5 mW/cm², to obtain #1 specimen. The contact angle with water of the #1 specimen as measured was 0°.

Then the #1 specimen was taken out of the desiccator and was promptly positioned above a warm bath held at 60° C. and transmittance was measured 15 seconds later. The transmittance as measured was divided by the initial transmittance to calculate a change in transmittance caused by any fog formed through condensation of steam.

In a manner similar to Example 7, the surface of a glass plate was coated by the anatase form of titania to obtain #2 specimen. The #2 specimen was placed in the desiccator and was subjected to irradiation with UV light, at a UV intensity of 0.5 mW/cm², until the contact angle with water became equal to 3°.

The #2 specimen was then placed in a dark place. The #2 specimen was taken out of the dark place at different time points and each time the contact angle with water was measured. In addition, at each point, the #2 specimen was placed in the desiccator (24° C. in temperature and 45-50% in humidity) until the temperature was equalized whereupon, in a manner similar to the #1 specimen, the #2 specimen was promptly placed above a warm bath held at 60° C. and the transmittance was measured 15 seconds later to derive a change in transmittance caused by a fog formed by condensation of steam.

For purposes of comparison, the contact angle with water was also measured with respect to commercially marketed flat glass, acrylic resin plate, polyvinylchloride (PCV) plate and polycarbonate (PC) plate, respectively. Thereafter, each of these materials was placed in a desiccator, held under the same condition, to equalize the temperature and was then promptly placed above a warm bath held at 60° C., the transmittance being similarly measured 15 seconds later whereby a change in transmittance caused by a fog formed by condensation of steam was calculated.

The results are shown in Table 2.

TABLE 2

| Specimen | Contact Angle with Water (°) | Change in Transmittance (%) |
|---|---|---|
| #1 | 0 | 100 |
| #2 (3 hrs later) | 5.0 | 100 |
| #2 (6 hrs later) | 7.7 | 100 |
| #2 (8 hrs later) | 8.2 | 100 |
| #2 (24 hrs later) | 17.8 | 89.8 |
| #2 (48 hrs later) | 21.0 | 88.5 |
| #2 (72 hrs later) | 27.9 | 87.0 |
| Flat Glass | 40.6 | 45.5 |
| Acrylic Resin Plate | 64.5 | 60.6 |
| PVC Plate | 75.3 | 44.7 |
| PC Plate | 86.0 | 49.0 |

As will be apparent from Table above, it was confirmed that an extremely high antifogging capability could be achieved if the contact angle with water was not greater than 10°.

Example 13

Photocatalyst-Containing Silicone Coating

This Example is related to the discovery that a coating of a certain high molecular weight compound and containing a photocatalyst is rendered highly hydrophilic when subjected to irradiation with UV light.

As substrates, aluminum plates (10 cm square in size) were used. Each of the substrates was first coated with a silicone layer to smooth the surface. To this end, a first component "A" (silica sol) and a second component "B" (trimethoxymethylsilane) of the coating composition "Glaska" marketed by Japan Synthetic Rubber Co. (Tokyo) were mixed with each other in such a manner that the ratio by weight of silica to trimethoxymethylsilane was equal to 3. The resultant coating mixture was applied on each of the aluminum substrates and was subjected to curing at a temperature of 150° C. to obtain a plurality of aluminum substrates (#1 specimens) each coated with a base coating of silicone of 3 µm in thickness. Then, the #1 specimens were coated with a high-molecular-weight coating composition containing a photocatalyst. In order to prevent a film forming element of the coating composition from being degraded by photooxidation action of the photocatalyst, silicone was selected as the film forming element.

More specifically, a sol of the anatase form of titania (Nissan Chemical Ind., TA-15) and the first component "A" (silica sol) of the above-mentioned "Glaska" were admixed. After dilution by ethanol, the above-mentioned second component "B" of "Glaska" was further added thereto to prepare a titania containing coating composition. The coating composition was comprised of 3 parts by weight of silica, 1 part by weight of trimethoxymethylsilane, and 4 parts by weight of titania.

The coating composition was applied onto the surface of the #1 specimens and was cured at a temperature of 150° C. to obtain #2 specimens coated with a top coating wherein particles of the anatase form of titania were dispersed throughout a coating film of silicone.

Then the #2 specimens were subjected to irradiation with UV light for 5 days, at a UV intensity of 0.5 mW/cm$^2$, by using a BLB fluorescent lamp to obtain #3 specimens. When the contact angle with water of the surface of these specimens was measured by the contact angle meter (made by ERMA), surprisingly the reading of the contact angle meter was less than 3°.

The contact angle of the #2 specimens measured prior to UV irradiation was 70°. The contact angle of the #1 specimens as measured was 90°. Then, the #1 specimens were subjected further to irradiation with UV light for 5 days under the same condition as the #2 specimens and the contact angle thereof was measured, the contact angle as measured being 85°.

From the foregoing, it has been discovered that, notwithstanding the fact that silicone inherently is substantially hydrophobic, silicone is rendered highly hydrophilic when it contains a photocatalyst and provided that the photocatalyst is photoexcited by irradiation with UV light.

Example 14

Raman Spectroscopic Analysis

Figure 6:
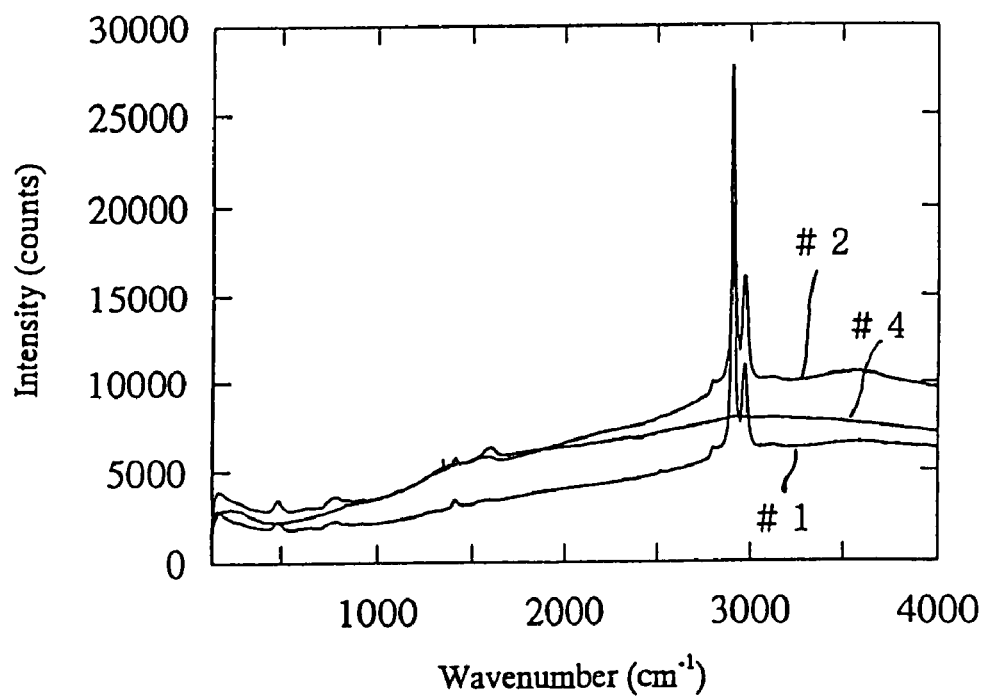
FIG. 6 shows Raman spectra of a surface of photocatalytic coating made of silicone.

By using a mercury lamp, the #2 specimen of Example 13 was subjected to irradiation with UV light for 2 hours, at a UV intensity of 22.8 mW/cm$^2$, to obtain #4 specimen. The #2 specimen prior to UV irradiation and the #4 specimen subsequent to UV irradiation were subjected to Raman spectroscopic analysis. For the purposes of comparison, a UV light was irradiated upon the #1 specimen under the same conditions and the specimen was subjected to Raman spectroscopic analysis prior to and subsequent to UV irradiation. Raman spectra are shown in the graph of FIG. 6. In the graph of FIG. 6, the Raman spectra of the #1 specimen prior to and subsequent to UV irradiation are shown by the single curve #1 because they are identical.

Referring to the graph of FIG. 6, in the Raman spectrum of the #2 specimen, a dominant peak is noted at the wavenumber 2910 cm$^{-1}$ corresponding to the symmetrical stretching of the C—H bond of the sp$^3$ hybrid orbital and a salient peak is observed at the wavenumber 2970 cm$^{-1}$ indicating the inverted symmetrical stretching of the C—H bond of the sp$^3$ hybrid orbital. It can therefore be concluded that the C—H bonds are present in the #2 specimen.

In the Raman spectrum of the #4 specimen, no peak is found at the wavenumbers 2910 cm$^{-1}$ and 2970 cm$^{-1}$. Instead, a broad absorption band peaking at the wavenumber 3200 cm$^{-1}$ and corresponding to the symmetrical stretching of the O—H bond is observed. It is therefore concluded that, in the #4 specimen, there is no C—H bond but, instead, the O—H bonds are present.

In contrast, in the Raman spectrum of the #1 specimen, a dominant peak at the wavenumber 2910 cm$^{-1}$ corresponding to the symmetrical stretching of the C—H bond of the sp$^3$ hybrid orbital as well as a salient peak at the wavenumber 2970 cm$^{-1}$ corresponding to the inverted symmetrical stretching of the C—H bond of the sp$^3$ hybrid orbital are noted throughout the points of time prior to and subsequent to UV irradiation. Accordingly, it is confirmed that the C—H bonds are present in the #1 specimen.

From the foregoing, it is considered that, when silicone which contains a photocatalyst is subjected to irradiation with UV light, the organic groups bonded to the silicon atoms of the silicone molecules as represented by the general formula (1) below are substituted with the hydroxyl groups under the action of the photocatalyst so that a derivative of silicone is formed at the surface as shown by the formula (2).

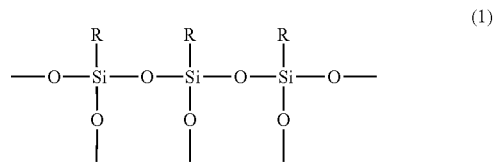

where R represents alkyl or aryl group.

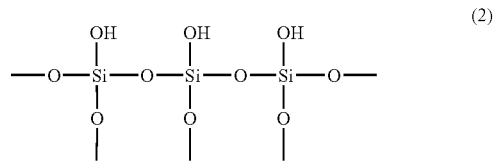

Example 15

Antifogging Plastic Plate—Antifogging Coating of Photocatalyst-Containing Silicone The surface of a plastic substrate was first coated with a silicone layer to prevent the substrate from being degraded by the photocatalyst.

To this end, a coating solution was prepared in a manner similar to Example 13 by admixing the first and second components "A" and "B" of the above-mentioned "Glaska" of Japan Synthetic Rubber Co. such that the ratio by weight of silica to trimethoxymethylsilanewas equal to 3. The coating solution was applied on the surface of 10 cm-square acrylic resin plates, and each plate was then cured at a temperature of 100° C. to obtain a plurality of acrylic resin plates (#1 specimens) each coated with a base coating of silicone of 5 μm in thickness.

Next, a sol of the anatase form of titania (Nissan Chemical Ind., TA-15) and the first component "A" of the above-mentioned "Glaska" were admixed and, after diluted by ethanol, the second component "B" of "Glaska" was added thereto to prepare four kinds of coating solutions having different compositions. The compositions of these coating solutions were such that the ratio by weight of titania to the sum of titania plus silica plus trimethoxymethylsilanewas equal to 5%, 10%, 50%, and 80%, respectively.

These coating solutions were applied, respectively, onto the surface of the acrylic resin plates coated with the silicone layer and were cured at a temperature of 100° C. to obtain #2-#5 specimens each coated with a top coating wherein particles of the anatase form of titania were dispersed throughout a coating film of silicone.

Then the #1-#5 specimens were subjected to irradiation with UV light by a BLB fluorescent lamp for maximum 200 hours, at a UV intensity of 0.5 mW/cm$^2$, and the contact angle with water of the surface of these specimens was measured by the contact angle meter (made by ERMA) at different time points to see the variation in response to time of the contact angle. The results are shown in the graph of FIG. 7.

Figure 7:
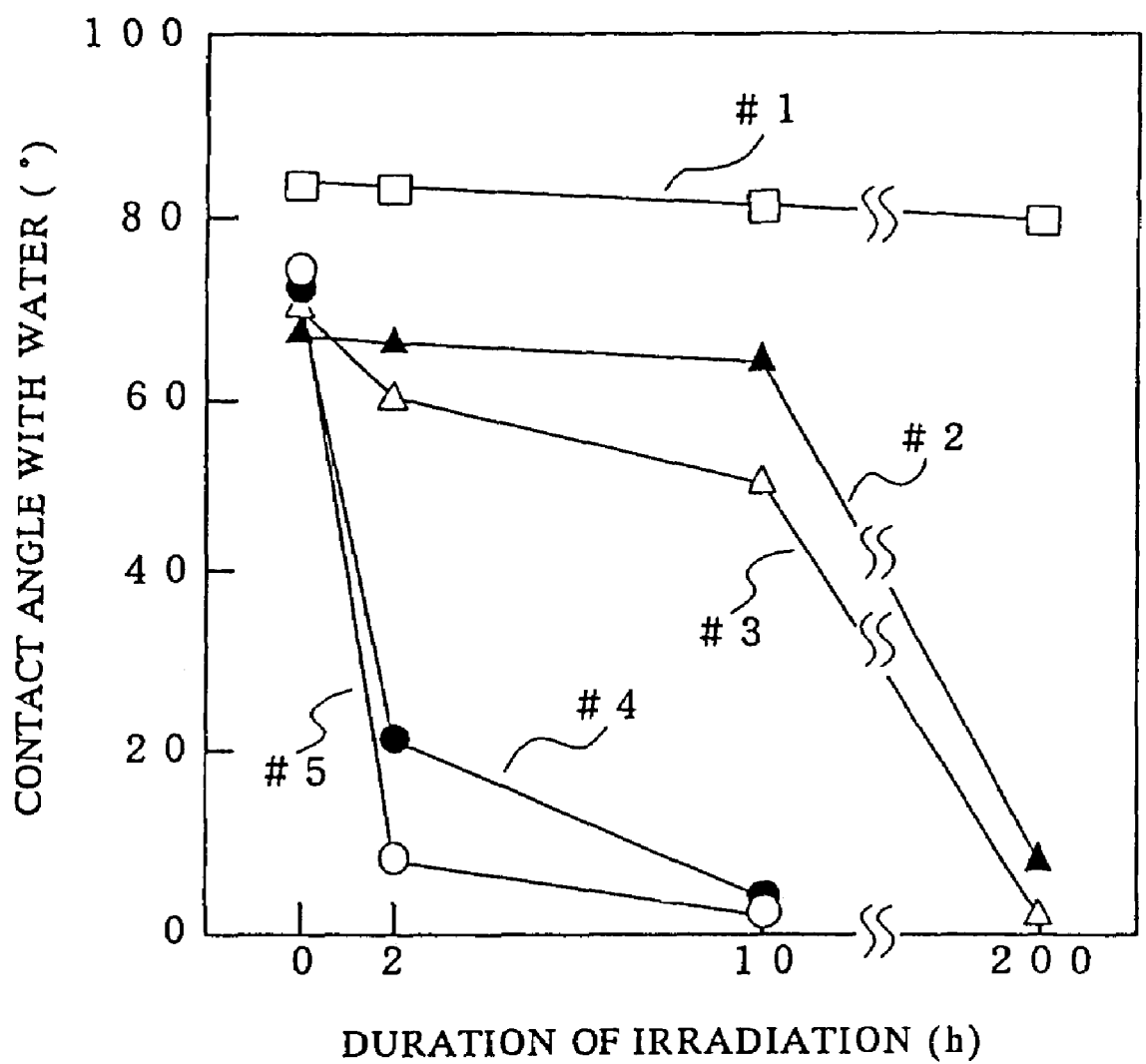

As will be understood from the graph of FIG. 7, in the #1 specimen, which was not provided with A titania-containing coating, no appreciable change in the contact angle with water resulted from UV irradiation.

In contrast, in each of the #2-#5 specimens (each of which had a titania-containing top coating), it will be noted that upon UV irradiation the surface was rendered hydrophilic to the degree that the contact angle with water became less than 10.

In particular, it will be understood that, in the #3-#5 specimens wherein the titania content was greater than 10% by weight, the contact angle with water became less than 3°.

Furthermore, it will be noted that in the #4 and #5 specimens having a titania contents of 50% by weight and 80% by weight, respectively, the contact angle with water became less than 3° within a relatively short time of beginning UV irradiation.

When a blow of breath was blown upon the #4 specimen, no formation of fog was observed. After keeping the #4 specimen in the dark for 2 weeks, the contact angle with water was measured by the contact angle meter (CA-X150) and was found to be less than 3°.

Example 16

Pencil Scratch Test

A pencil scratch test was conducted to ascertain the abrasion resistance of the titania-containing top coating.

In a manner similar to Example 15, a plurality of 10 cm-square acrylic resin plates were first coated with a base coating of silicone of 5 μm in thickness and were then coated with a top coating having varying titania content. In these plates, the titania content of the top coating was 50% by weight, 60% by weight, and 90% by weight, respectively.

Figure 8:
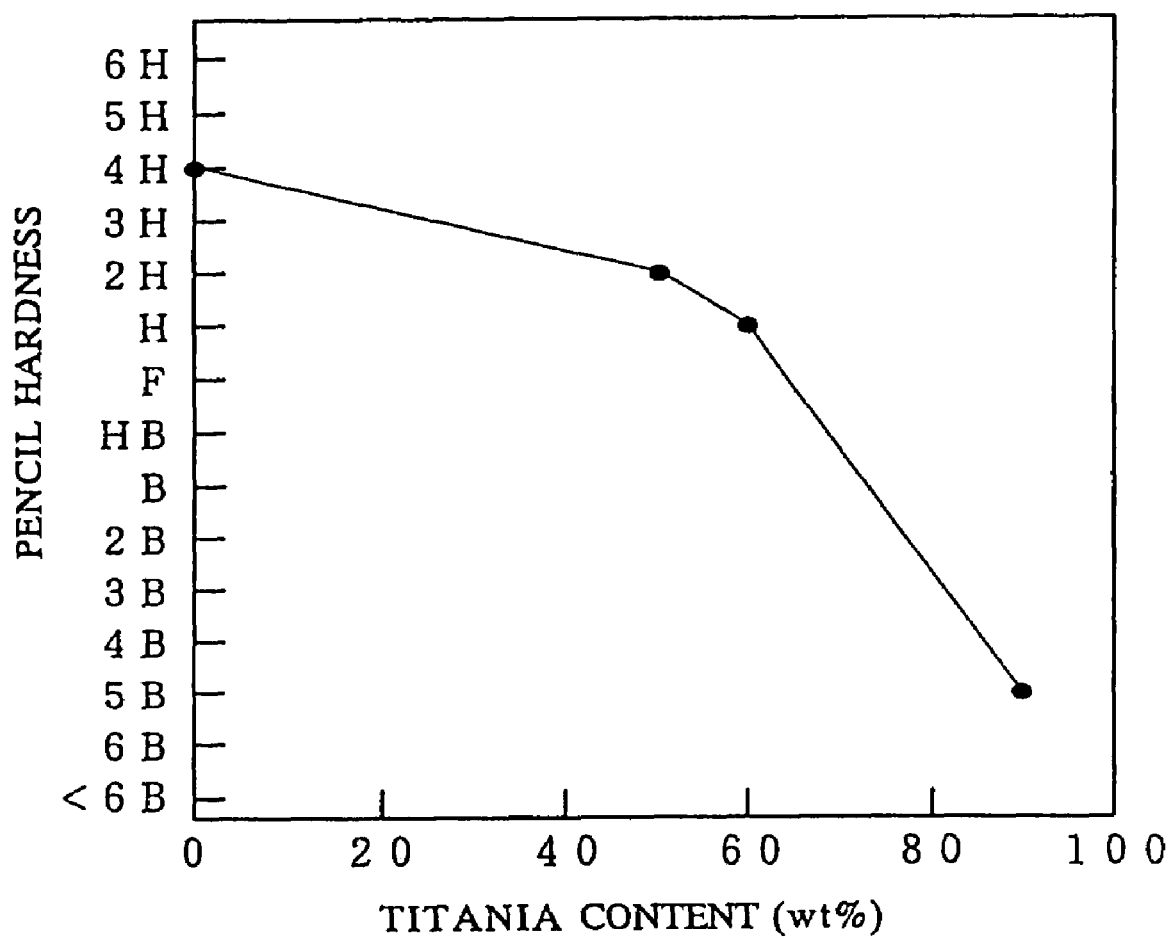
FIGS. 8 and 16 are graphs showing the result of pencil hardness tests.

According to the method H8602 of the Japanese Industrial Standard (JIS), the surface of the specimens was scratched by various pencil leads to find the hardest pencil lead by which the top coating was peeled off. A similar test was also conducted for a specimen which was coated only with the base coating. The results are shown in the graph of FIG. 8.

The top coating having a titania content of 90% by weight was peeled off by a pencil lead of hardness 5B, but the top coating having a titania content of 60% by weight was able to withstand a pencil lead of hardness H and showed an adequate abrasion resistance. The abrasion resistance of the top coating apparently increases with decreasing titania content.

Example 17

Effect of Coating Thickness

In a manner similar to Example 13, a plurality of 10 cm-square aluminum plates were first coated with a base coating of silicone of 5 μm in thickness and were then coated with an anatase-containing top coating of varying thickness to obtain a plurality of specimens. The thickness of the top coating of the #1 specimen was 0.003 μm, the thickness of the top coating of the #2 specimen being 0.1 μm, the thickness of the top coating of the #3 specimen being 0.2 μm, the thickness of the top coating of the #4 specimen being 0.6 μm, and the thickness of the top coating of the #5 specimen being 2.5 μm.

While subjecting the respective specimens to irradiation with UV light, at a UV intensity of 0.5 mW/cm$^2$ by using a BLB fluorescent lamp, the variation in response to time of the contact angle with water of the surface of the specimens was measured by the contact angle meter (made by ERMA). The results are shown in the graph of FIG. 9.

Figure 9:
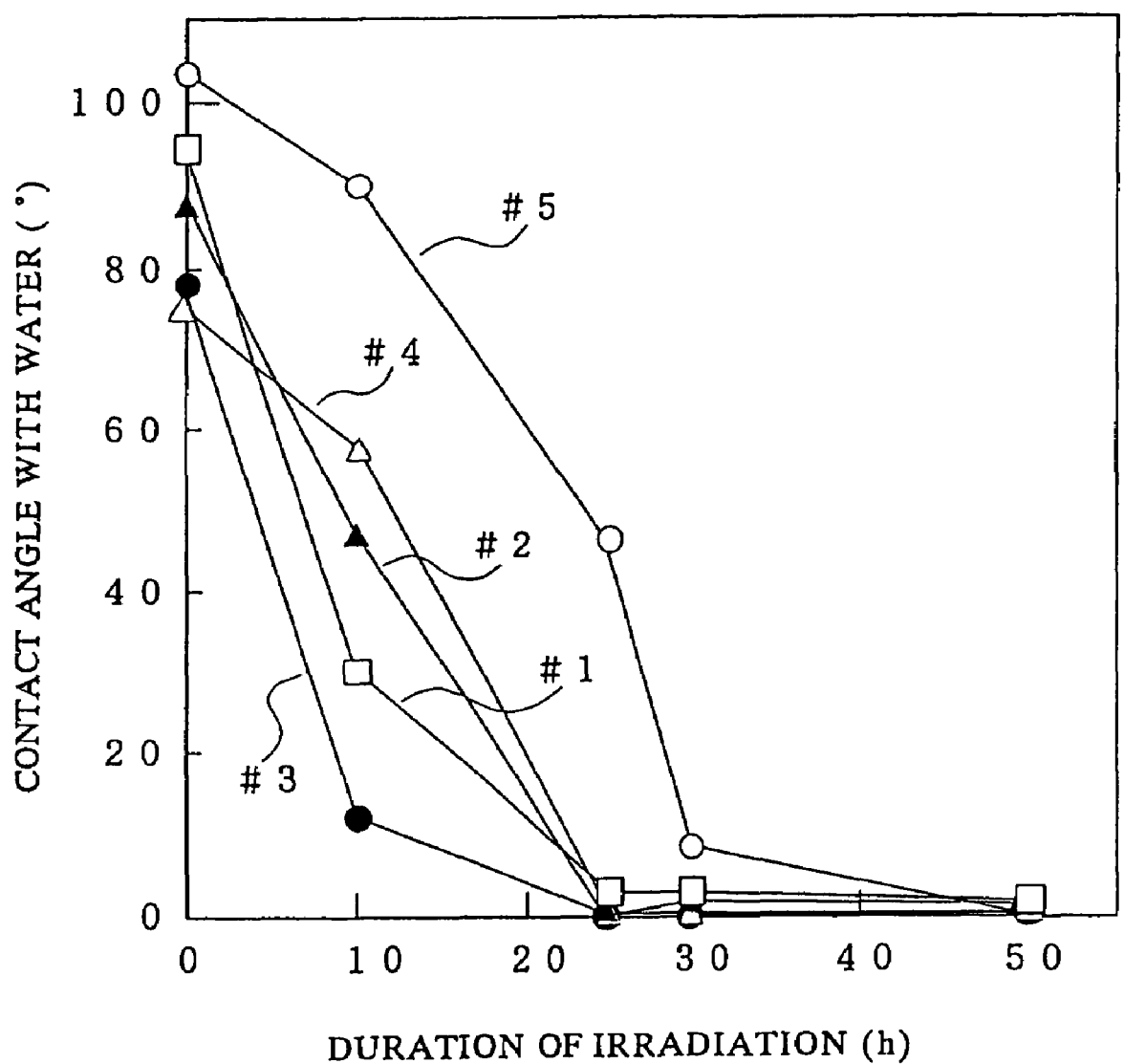

As will be apparent from the graph of FIG. 9, regardless of the thickness of the coating, the surface of the respective specimens was rendered highly hydrophilic within 50 hours of UV irradiation to the degree that the contact angle with water became less than 3°. It will be noted in particular that, even with the titania-containing top coating of the thickness of less than 0.2 μm, a sufficient photocatalytic activity was achieved to the degree that the top coating surface was rendered highly hydrophilic. In this regard, it is known that a transparent layer is colored due to interference of light when the thickness of the layer exceeds 0.2 μm. This Example illustrates that, by limiting the thickness of the top coating to 0.2 μm or less, the surface of the top coating can be made highly hydrophilic while preventing coloring thereof due to interference of light.

Next, the #1-#5 specimens were tested for the capability thereof to photodecompose methyl mercaptan. Each specimen was placed, separately, in a desiccator of 11 liters in volume made of UV permeable quartz glass, and nitrogen gas containing methyl mercaptan was introduced therein in such a manner that the methyl mercaptan concentration equaled 3 ppm. A 4 W BLB fluorescent lamp was placed within the desiccator at a distance of 8 cm from the specimen to irradiate the specimen, at a UV intensity of 0.3 mW/cm$^2$. By sampling gas in the desiccator 30 minutes later, the methyl mercaptan concentration was measured by gas chromatography and the removal rate of methyl mercaptan was calculated. The results are shown in the graph of FIG. 10.

Figure 10:
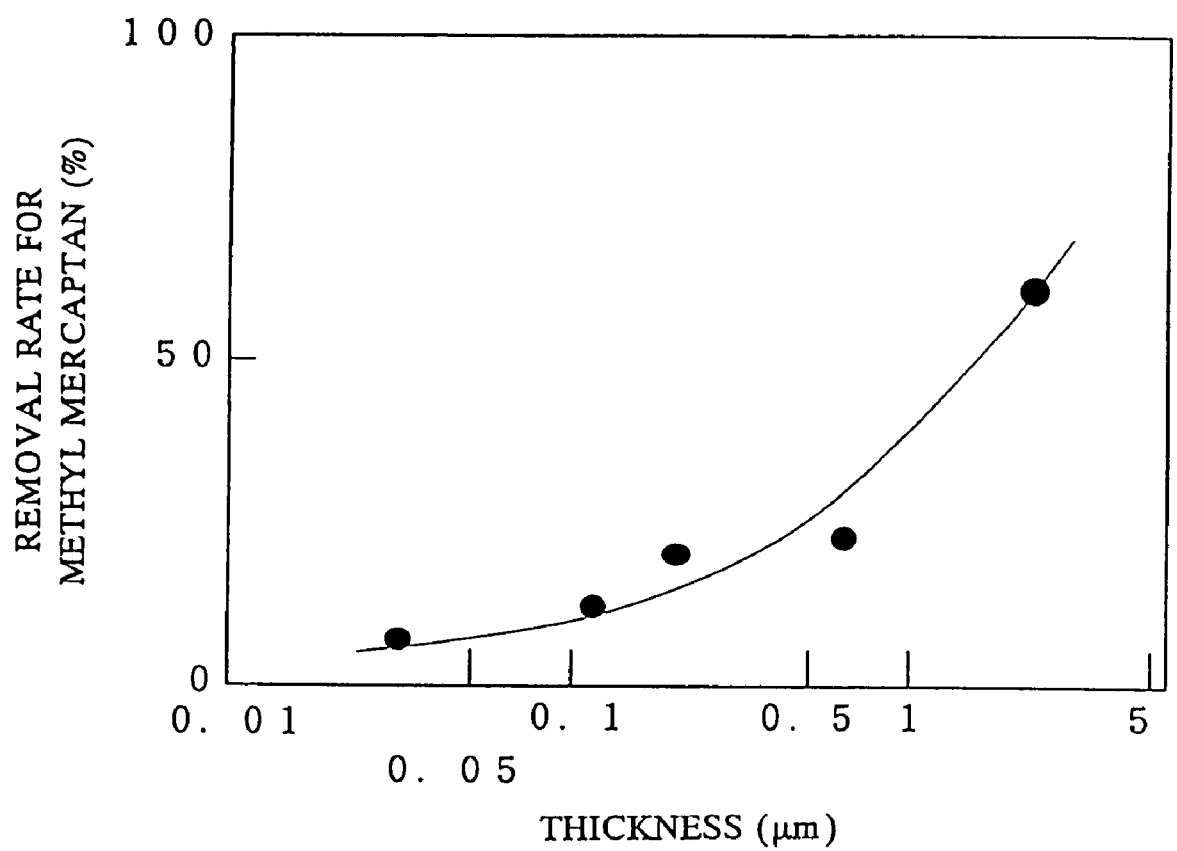
FIG. 10 is a graph showing the relationship between the thickness of the photocatalytic coating and the capability of the coating to decompose methyl mercaptan.

The graph of FIG. 10 indicates that the photodecomposition capability of the photocatalytic coating vis-a-vis methyl mercaptan increases with increasing coating thickness. It is found that the photocatalytic photodecomposition capability was clearly affected by the thickness of the photocatalytic layer. In view of the results shown in FIG. 9, it seems that the photocatalytic superhydrophilification process is not necessarily identical with the photocatalytic redox process known hitherto in the field of photocatalyst.

Example 18

Highly Hydrophilic Photocatalytic Coating of Titania-Containing Silicone

In a manner similar to Example 13, a 10 cm-square aluminum plate was first coated with a base coating of silicone of 5 μm in thickness.

Then, a sol of the anatase form of titania (Nissan Chemical Ind., TA-15) and the second component "B" (trimethoxymethylsilane) of the above-mentioned "Glaska" were admixed with each other and the mixture was diluted by ethanol to prepare a coating composition containing titania. The ratio by weight of trimethoxymethylsilane to titania was equal to 1.

The coating composition was applied onto the surface of the aluminum plate and was cured at a temperature of 150° C. to form a top coating wherein particles of the anatase form of titania were dispersed throughout a coating film of silicone. The thickness of the coating was 0.1 μm.

Then the specimen was subjected to irradiation with UV light for a day, at a UV intensity of 0.5 mW/cm$^2$, by using a BLB fluorescent lamp. When the contact angle with water of the surface of this specimen was measured by the contact angle meter (CA-X150), the reading of contact angle was 0.

The specimen was kept in the dark for 3 weeks and the contact angle with water was measured each week. The measured contact angle is shown in Table 3.

TABLE 3

| immed. after irradiation | 1 week later | 2 weeks later | 3 weeks later |
|---|---|---|---|
| 0° | 2° | 1° | 3° |

As will be understood from Table 3, once the surface has been superhydrophilified, superhydrophilicity will be sustained for a substantially long time period even in the absence of photoexcitation.

Example 19

Antibacterial Enhancer—Ag-Added Photocatalyst

In a manner similar to Example 1, a thin film of amorphous silica and a thin film of amorphous titania were formed in sequence on the surface of a 10 cm-square soda-lime glass plate and the glass plate was then calcined at a temperature of 500° C. to transform amorphous titania into the anatase form of titania, whereby #1 specimen was obtained.

Then an aqueous solution containing 1% by weight of silver lactate was applied onto the surface of the #1 specimen, and the specimen was subjected to irradiation with UV light for one minute by operating a 20 W BLB fluorescent lamp positioned at a distance of 20 cm from the specimen whereby #2 specimen was obtained. Upon UV irradiation, silver lactate underwent photoreduction to form silver deposit and the surface of the specimen was rendered hydrophilic under the photocatalytic action of titania. The #1 specimen was also subjected to UV irradiation under the same conditions.

When the contact angle with water of the #1 and #2 specimens was measured by the contact angle meter (made by ERMA), the contact angle in both specimens was less than 3°. When a blow of breath was blown upon these specimens, no formation of fog was observed. For the purposes of comparison a substrate of soda-lime glass, without coating, was tested, and it was found that the contact angle with water was 50° and a fog was readily formed upon blowing of breath.

Then, the #1 and #2 specimens as well as the uncoated soda-lime glass plate were tested for antibacterial capability. A liquid culture prepared by shake cultivating colibacillus (*Escherichia coli* W3110 stock) for a night was subjected to centrifugal washing and was diluted with sterilized distilled water by 10,000 times to prepare a bacteria containing liquid. 0.15 ml of the bacteria containing liquid (equivalent to 10000-50000 CFU) was dripped on three glass slides which were then brought into intimate contact with the #1 and #2 specimens and the uncoated soda-lime glass plate, respectively, all of which had previously been sterilized by 70% ethanol. The specimens and the uncoated plate were then subjected to irradiation from a white fluorescent lamp placed in front of the glass slides for 30 minutes, at an intensity of 3500 lux. Thereafter, the bacteria containing liquid of respective specimens was wiped by a sterilized gauze and was recovered in 10 ml of physiological saline and the liquid thus recovered was applied for inoculation on a nutrient agar plate for culture at 37° C. for a day. Thereafter, the colonies of colibacillus formed on the culture was counted to calculate the survival rate of colibacillus. The result was that in the #1 specimen and the soda-lime glass plate the survival rate of colibacillus was greater than 70%, but the survival rate was less than 10% in the #2 specimen.

This experiment demonstrates that, when the photocatalyst is doped with Ag, the surface of the substrate is not only rendered highly hydrophilic but also becomes antibacterial.

Example 20

Antibacterial Enhancer—Cu-Added Photocatalyst

In a manner similar to Example 1, a thin film of amorphous silica was formed on the surface of each of a plurality of 10 cm-square soda-lime glass plates to obtain a plurality of #1 specimens.

Then, similar to Example 1, a thin film of amorphous titania was formed on the surface of one #1 specimen which was then calcined at a temperature of 500° C. to transform amorphous titania into the anatase form titania. Then an ethanol solution containing 1 weight percent of copper acetate was applied by spray coating onto the surface of one specimen and, after drying, the specimen was subjected to irradiation with UV light for one minute by a 20 W BLB fluorescent lamp positioned at a distance of 20 cm from the specimen, to thereby subject copper acetate to photoreduction deposition and, thus, to obtain a #2 specimen wherein crystals of titania were doped with copper. As inspected by the eye, the #2 specimen presented an adequate light transmittance.

A soda-lime glass plate as well as the #2 specimen and the #1 specimen (without titania coating) immediately after fabrication were tested for antifogging capability and the contact angle with water measured. The antifogging test was done by blowing a blow of breath upon the specimen to produce a fog on the specimen surface and by inspecting for the presence or absence of particles of moisture condensate, using a microscope. The contact angle was measured by the contact angle meter (made by ERMA). The results are shown in Table 4.

TABLE 4

Immediately After Preparation of Specimen

|  | Contact Angle with Water (°) | Antifogging Property |
|---|---|---|
| #2 Specimen | 10 | no fog |
| #1 Specimen | 9 | no fog |
| Soda-Lime Glass | 50 | fogged |

Further, after being subjected to irradiation with UV light for a month, at a UV intensity of 0.5 mW/cm$^2$, by a BLB fluorescent lamp, the #2 and #1 specimens and the soda-lime glass plate were tested in a similar manner for antifogging capability and contact angle. The results are shown in Table 5.

TABLE 5

After 1 Month of UV Irradiation

|  | Contact Angle with Water (°) | Antifogging Property |
|---|---|---|
| #2 Specimen | 3 | no fog |
| #1 Specimen | 49 | fogged |
| Soda-Lime Glass | 53 | fogged |

Then, the #2 and #1 specimens immediately after preparation and the soda-lime glass plate were tested for antibacterial capability in a manner similar to that described in Example 19. The result was that in the soda-lime glass plate and the #1 specimen the survival rate of colibacillus was greater than 70%, but the survival rate was less than 10% in the #2 specimen.

Next, the #2 and #1 specimens immediately after preparation, and the uncoated soda-lime glass plate, were tested for deodorizing performance. Each specimen was placed in a desiccator of 11 liters in volume made of UV permeable quartz glass and nitrogen gas containing methyl mercaptan was introduced therein in such a manner that the methyl mercaptan concentration equaled 3 ppm. In each case, a 4 W BLB fluorescent lamp was placed within the desiccator at a distance of 8 cm from the specimen to irradiate the specimen, at a UV intensity of 0.3 mW/cm$^2$. By sampling gas in the desiccator 30 minutes later, the methyl mercaptan concentration was measured by gas chromatography and the removal rate of methyl mercaptan was calculated. With the #1 specimen and the soda-lime glass plate, the removal rate of methyl mercaptan was less than 10%. In contrast, the removal rate of the #2 specimen was more than 90%, so that a good deodorizing performance was achieved.

Example 21

Antibacterial Enhancer—Cu-Added Photocatalyst

The first and second components "A" (silica sol) and "B" (trimethoxymethylsilane) of "Glaska" of Japan Synthetic Rubber Co. were admixed such that the ratio by weight of silica to trimethoxymethylsilane was equal to 3, and the mixture was applied on the surface of a 10 cm-square acrylic resin plate, followed by curing at a temperature of 100° C. to obtain an acrylic resin plate coated with a base coating of silicone of 3 µm in thickness.

Then, a sol of the anatase form of titania (TA-15) and an aqueous solution containing 3 weight percent of copper acetate were mixed and, after adding further the first component "A" (silica sol) of "Glaska" thereto, the mixture was diluted by propanol. Then the second component "B" of "Glaska" was further added to prepare a titania-containing coating composition. The coating composition was comprised of 3 parts by weight of silica, 1 part by weight of trimethoxymethylsilane, 4 parts by weight of titania, and 0.08 parts by weight of copper acetate in terms of metallic copper.

The coating composition was applied onto the surface of the acrylic resin plate and was cured at a temperature of 100° C. to form a top coating. Then the specimen was subjected to irradiation with UV light for 5 days, at a UV intensity of 0.5 mW/cm$^2$ by using a BLB fluorescent lamp to obtain #1 specimen.

The #1 specimen and the acrylic resin plate were investigated for antifogging capability, contact angle with water, antibacterial performance and deodorizing function, in a manner similar to Example 20. In the acrylic resin plate, the contact angle with water was 70° and a fog was formed as a blow of breath was blown upon. In the #1 specimen, however, the contact angle with water was 3-9° and formation of fog did not occur. With regard to antibacterial property, in the acrylic resin plate the survival rate of colibacillus was greater than 70%, whereas the survival rate was less than 10% in the #1 specimen. Regarding the deodorizing property, while the removal rate of methyl mercaptan by the acrylic resin plate was less than 10%, the removal rate by the #1 specimen was more than 90%.

Example 22

Photo-Redox Activity Enhancer—Pt-Added Photocatalyst

In a manner similar to Example 1, a thin film of amorphous silica and then a thin film of amorphous titania were formed on the surface of a 10 cm-square soda-lime glass plate and the glass plate was then calcined at a temperature of 500° C. to transform amorphous titania into the anatase form titania.

Then, 1 ml of aqueous solution of chloroplatinic acid 6-hydrate $H_2PtCl_6.6H_2O$ containing 0.1 weight percent of platinum was applied onto the specimen which was then subjected to irradiation with UV light for one minute, at a UV intensity of 0.5 mW/cm$^2$ by a BLB fluorescent lamp to thereby form deposit of platinum by photoreduction of chloroplatinic acid hexahydrate to obtain a specimen wherein crystals of titania were doped with platinum.

The specimen thus obtained was left as such for a day and was thereafter subjected to irradiation with UV light for a day, at a UV intensity of 0.5 mW/cm$^2$ by using a BLB fluorescent lamp. The contact angle measured after UV irradiation was 0°. Furthermore, the removal rate of methyl mercaptan as measured and calculated in a manner similar to Example 20 was 98%.

Example 23

Self-Cleaning and Antifouling Capability

The #2 specimen of Example 13 was subjected to irradiation with UV light for 10 hours, at a UV intensity of 0.5 mW/cm$^2$ by using a BLB fluorescent lamp to obtain #3 specimen. When the contact angle with water of the surface of this specimen was measured by the contact angle meter (made by ERMA), the reading of the contact angle meter was less than 3°.

Figure 11A:
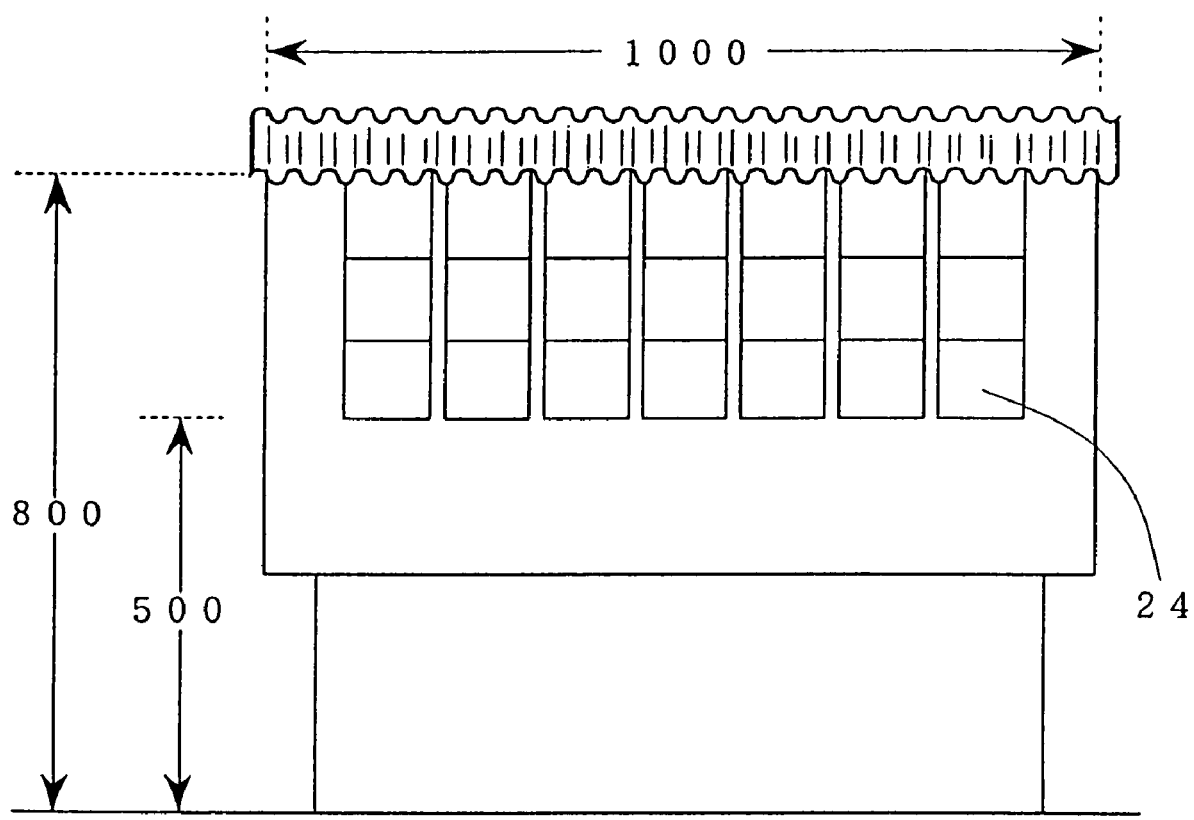
FIGS. 11A and 11B are front and side elevational views, respectively, of outdoor accelerated fouling testing equipment.
Figure 11B:
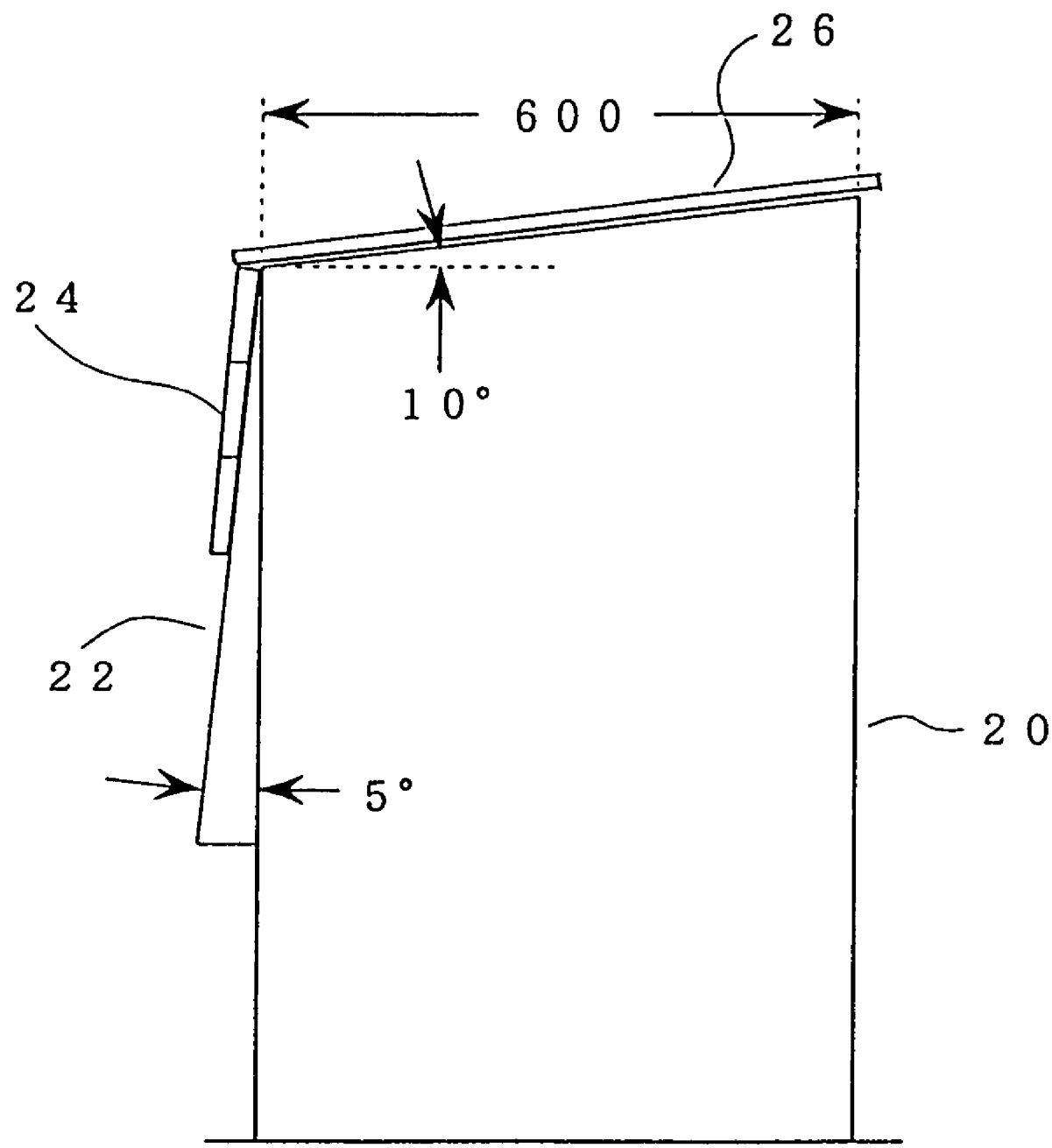

An outdoor accelerated fouling test apparatus as shown in FIGS. 11A and 11B was installed atop of a building located in Chigasaki City. Referring to FIGS. 11A and 11B, this apparatus includes an inclined specimen mounting surface 22 supported by a frame 20 and adapted to affix specimens 24 thereto. A forwardly slanted roof 26 is fixed at the top of the frame. The roof is made of corrugated plastic sheet and is designed to permit collected rain water to flow down in a striped pattern along the surface of the specimens 24 affixed on the specimen mounting surface 22.

The #3 specimens, the #1 specimens of Example 13, and the #2 specimens of Example 13 were mounted to the specimen mounting surface 22 of the apparatus and were exposed to the weather conditions for 9 days starting from Jun. 12, 1995. The weather and the amount of rain fall during this period were as shown in Table 6.

TABLE 6

| Date | Weather | Rainfall (mm) | Shining Hours |
|---|---|---|---|
| June 12 | cloudy | 0.0 | 0 |
| June 13 | heavy rain | 53.0 | 0 |
| June 14 | cloudy/rain | 20.5 | 0 |
| June 15 | cloudy/fair | 0.0 | 3.9 |
| June 16 | cloudy | 0.0 | 0.2 |
| June 17 | fair/cloudy | 0.0 | 9.6 |
| June 18 | fair to cloudy | 0.0 | 7.0 |
| June 19 | rain to cloudy | 1.0 | 0.2 |
| June 20 | cly/heavy rain | 56.0 | 2.4 |

When inspected on June 14, dirt or smudge of a striped pattern was observed on the surface of the #1 specimen. Presumably, this is because during heavy rainfall on the preceding day the airborne hydrophobic contaminants such as combustion products like carbon black and city grime were carried by rain and were allowed to deposit on the specimen surface as rain water flowed down along the surface. In contrast, no dirt or smudge was observed in the #3 specimen. Believably, this is because, since the specimen surface was rendered highly hydrophilic, the hydrophobic contaminants were unable to adhere onto the surface as rain water containing contaminants flowed down and further because the contaminants were washed away by rainfall.

In the #2 specimen, dirt or smudge of a mottled pattern was observed. This is probably because, after the #2 specimen which had not been subjected to UV irradiation was mounted to the testing apparatus, the photocatalytic coating thereof was not yet exposed to UV light in the sunlight to a satisfactory degree so that the surface was unevenly hydrophilified.

When inspected on June 20, a smudge of a vertically striped pattern was remarkably noticed on the surface of the #1 specimen which was not provided with the photocatalytic coating. Conversely, no smudge was observed on the #3 and #2 specimens provided with the photocatalytic coating.

The contact angle with water as measured was 70° for the #1 specimen and was less than 3° for the #2 and #3 specimens. The fact that the contact angle of the #2 specimen became less than 3° demonstrates that, upon irradiation by UV light contained in the sunlight, the organic groups bonded to the silicon atoms of the silicone molecules of the top coating were substituted with hydroxyl groups under the photocatalytic action so that the top coating was rendered highly hydrophilic. It was also noted that in the #3 specimen a high degree of hydrophilicity was sustained by irradiation of the sunlight.

Example 24

Color Difference Test

Prior to and 1 month after mounting to the outdoor accelerated fouling test apparatus, the #1 and #2 specimens of Example 23 were tested by a color difference meter (Tokyo Denshoku) to measure a color difference. In compliance with the Japanese Industrial Standard (JIS) H0201, the color difference was indicated by the $\Delta E^*$ index. The variation in the color difference after mounting to the accelerated fouling test apparatus is shown in Table 7.

TABLE 7

| | Striped Area | Background |
|---|---|---|
| #1 Specimen | 4.1 | 1.1 |
| #2 Specimen | 0.8 | 0.5 |

As will be noted from Table 7, in the #1 specimen void of the photocatalytic coating, a large amount of smudge was caused to adhere to the vertical striped area corresponding to the flow path of rainwater, as compared with the #2 specimen provided with the photocatalytic coating. It will also be recognized that, between the #2 and #1 specimens, there was a substantial difference in the degree of fouling of the background area.

Example 25

Cleansing Capability for Oil Stains

A quantity of oleic acid was applied on the surface of the #1 and #3 specimens of Example 23, respectively, and the specimens were then immersed in water in a cistern with the specimen surface held in a horizontal position. In the #1 specimen, oleic acid remained adhered to the specimen surface. In contrast, in the #3 specimen, oleic acid became rounded to form oil droplets which were then released from the surface of the specimen to rise to the top of the water.

In this manner, it was confirmed that, in the case that the surface of a substrate was coated with a photocatalytic top coating, the surface was maintained hydrophilic so that, when soaked in water, oily stains were readily released away from the surface whereby the surface was cleansed.

This Example illustrates that a tableware, for instance, fouled by oil or fat can be readily cleansed only by soaking it in water without recourse to a detergent, provided that the surface thereof is provided with a photocatalytic coating and if the photocatalyst is photoexcited by UV irradiation.

Example 26

Drying of Water Wet Surface

The surface of the #1 and #3 specimens of Example 23 were wetted with water and the specimens were left outdoors on a fair day to subject them to natural drying. The ambient temperature was about 25° C. As the #1 specimen was inspected 30 minutes later, water droplets still remained on the surface. In contrast, it was found that the surface of the #3 specimen was completely dried.

It is considered that in the #3 specimen provided with the photocatalytic coating, the adherent water droplets were caused to spread into a uniform film of water and for this reason drying was accelerated.

This Example illustrates the possibility that an eyeglass lens or automotive windshield wetted with water may be promptly dried.

Example 27

Tile with Highly Hydrophilic Surface—Coating of Sintered Titania and Silica

A sol of the anatase form of titania (Ishihara Industries of Osaka, STS-11) and a sol of colloidal silica (Nissan Chemical Ind., "Snowtex O") were admixed at a ratio by mol of 88:12 in terms of solid matter and the mixture was applied by spray coating on the surface of a glazed tile (Toto Ltd., AB02E01) of 15 cm square in size, followed by sintering for 1 hour at a temperature of 800° C. to obtain a specimen covered by a coating comprised of titania and silica. The thickness of the coating was 0.3 µm. The contact angle with water immediately after sintering was 5°.

The specimen was kept in the dark for a week but the contact angle measured thereafter was still 5°.

As the specimen surface was subjected to irradiation with UV light for 1 day, at a UV intensity of 0.03 mW/cm$^2$ by using a BLB fluorescent lamp, the contact angle with water became 0°.

Example 28

Coating of Sintered Titania and Silica—Hydrophilification Under Room Light

A sol of the anatase form of titania (STS-11) and a sol of colloidal silica (Nissan Chemical Ind., "Snowtex 20") were admixed at a ratio by mol of 80:20 in terms of solid matter and the mixture was applied by spray coating on the surface of a 15 cm-square glazed tile (AB02E01), followed by sintering for 1 hour at a temperature of 800° C. to obtain a specimen covered by a coating comprised of titania and silica. The thickness of the coating was 0.3 µm. The contact angle with water immediately after sintering was 5°.

The contact angle with water as measured after keeping the specimen in the dark for 2 weeks was 14°.

As the specimen surface was subjected to irradiation with UV light for 1 day, at a UV intensity of 0.004 mW/cm$^2$ by a white fluorescent lamp, the contact angle with water became 4°.

Accordingly, it was found that the photocatalytic coating was rendered hydrophilic to a satisfactory degree even under indoor illumination.

Example 29

Coating of Sintered Titania and Silica—Silica Content

A sol of the anatase form of titania (STS-11) and a sol of colloidal silica (Nissan Chemical Ind., "Snowtex 20") were admixed at a varying ratio to obtain a plurality of suspensions having a ratio by mol of silica to the solid matter of the suspension of 0%, 5%, 10%, 15%, 20%, 25% and 30%, respectively. 0.08 g of each suspension was uniformly applied by spray coating on the surface of a 15 cm-square glazed tile (AB02E01) and each tile was fired for 1 hour at a temperature of 800° C. to obtain a plurality of specimens each covered by a coating comprised of titania and silica.

Figure 12:
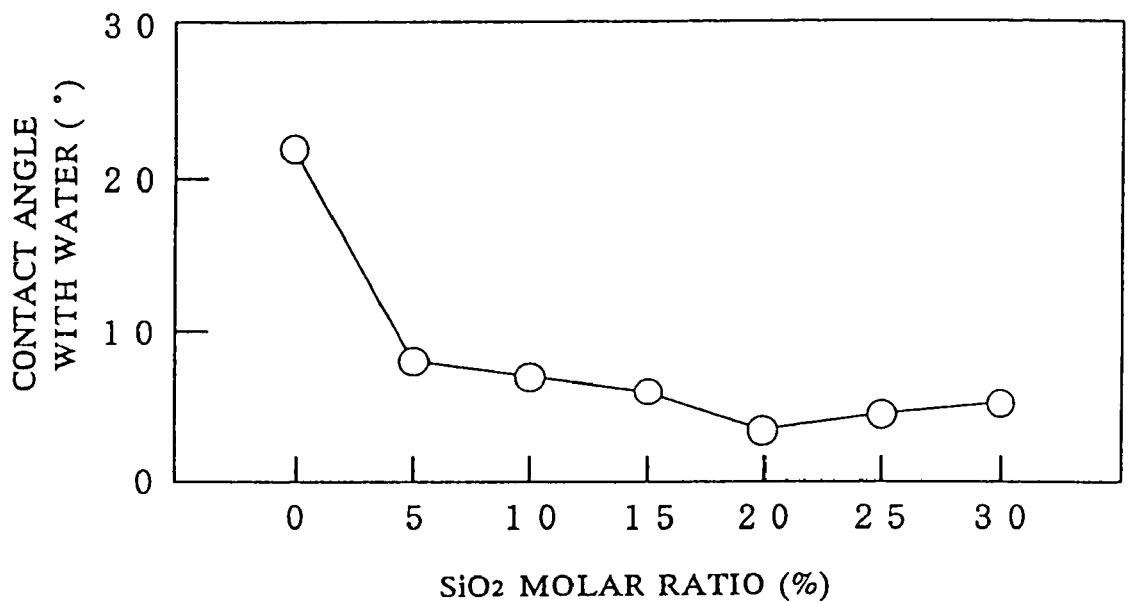
FIGS. 12-15 are graphs showing the contact angle with water versus the molar ratio of silica in silica-blended titania.

The contact angle with water immediately after sintering of the respective specimens was as shown in the graph of FIG. 12. As will be apparent from the graph of FIG. 12, the initial contact angle was lowered by addition of silica.

Figure 13:
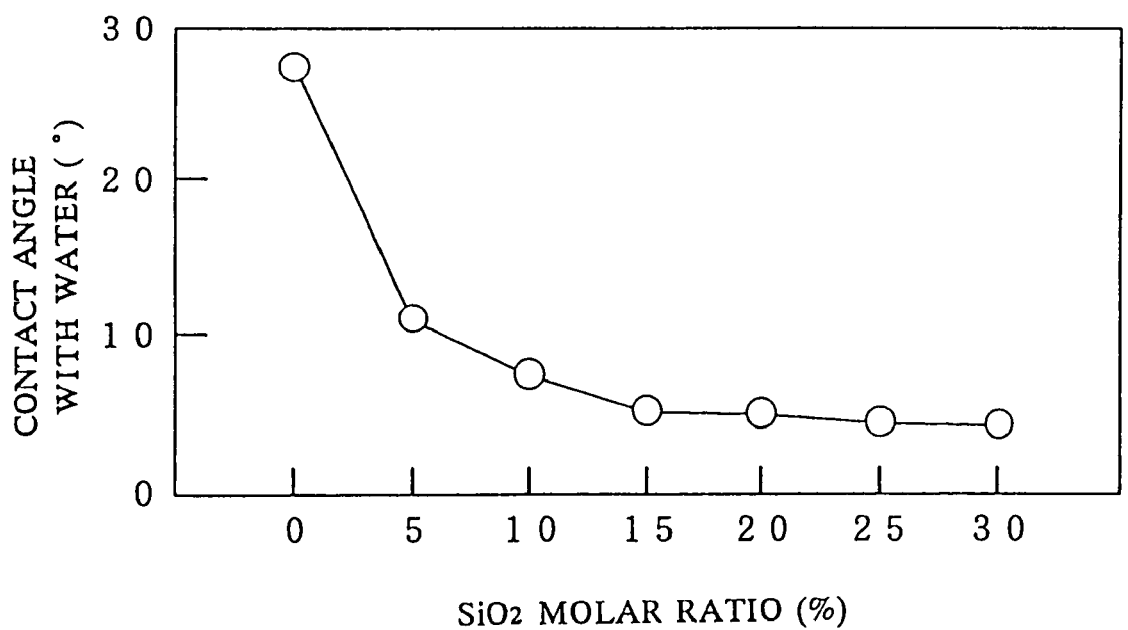

The contact angle with water as measured after keeping the specimen in the dark for 8 days was plotted in the graph of FIG. 13. As will be noted by comparing the graph of FIG. 12 with the graph of FIG. 13, the loss of hydrophilicity resulting from keeping the specimens in the dark is small in the specimens containing more than 10%, in the ratio by mol, of silica.

Figure 14:
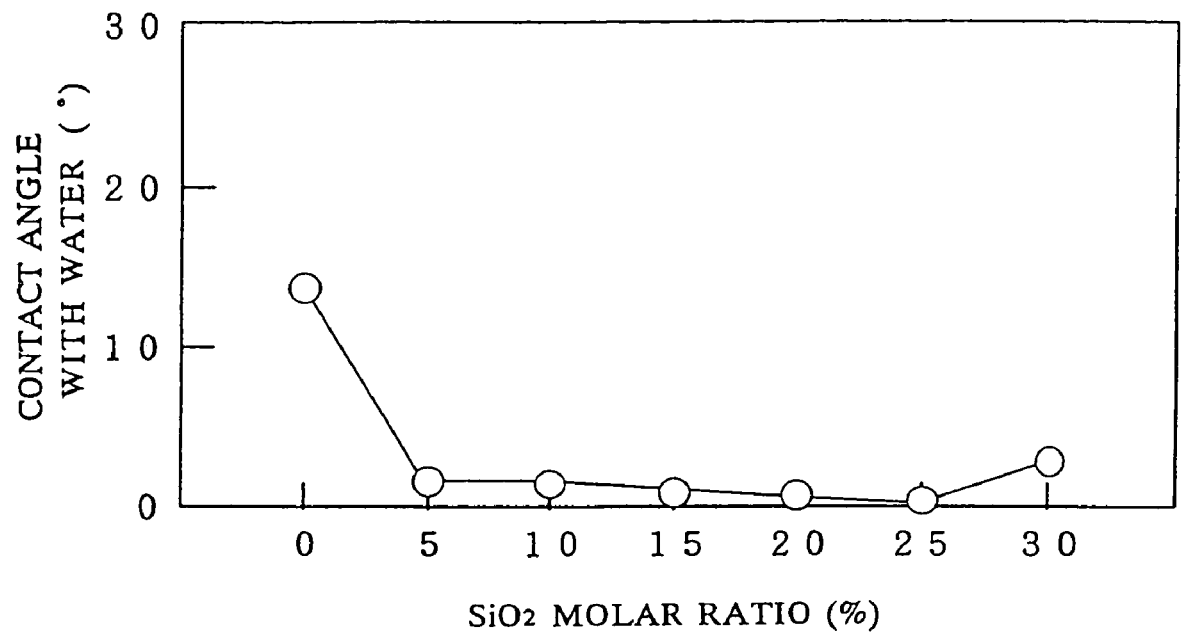

Thereafter, the specimens were subjected to irradiation with UV light for 2 days, at a UV intensity of 0.03 mW/cm$^2$ by using a BLB fluorescent lamp. The contact angle with water after irradiation is shown in the graph of FIG. 14. It will be noted from the graph that upon UV irradiation hydrophilicity is readily recovered in the case where silica is added to titania.

Figure 15:
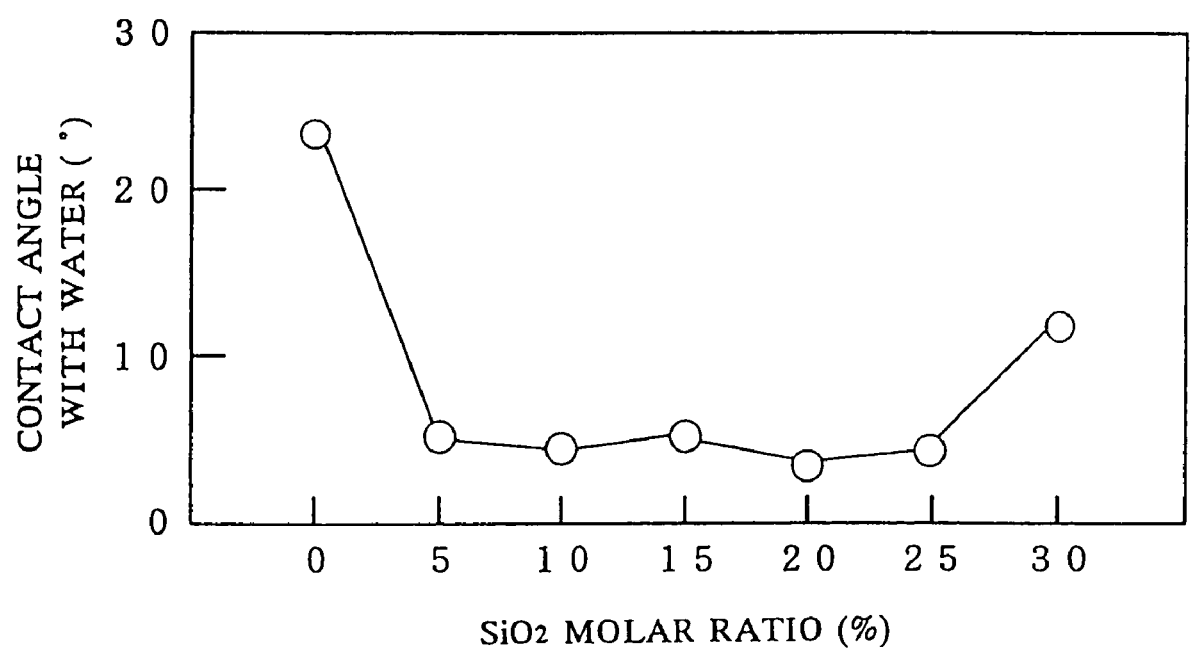

Then the specimens were kept in the dark for further 8 days and the contact angle with water was measured. The results are shown in FIG. 15. It will be noted from the graph that the loss of hydrophilicity resulting from keeping the specimens in the dark after UV irradiation is small in the case where silica is added to titania.

Figure 16:
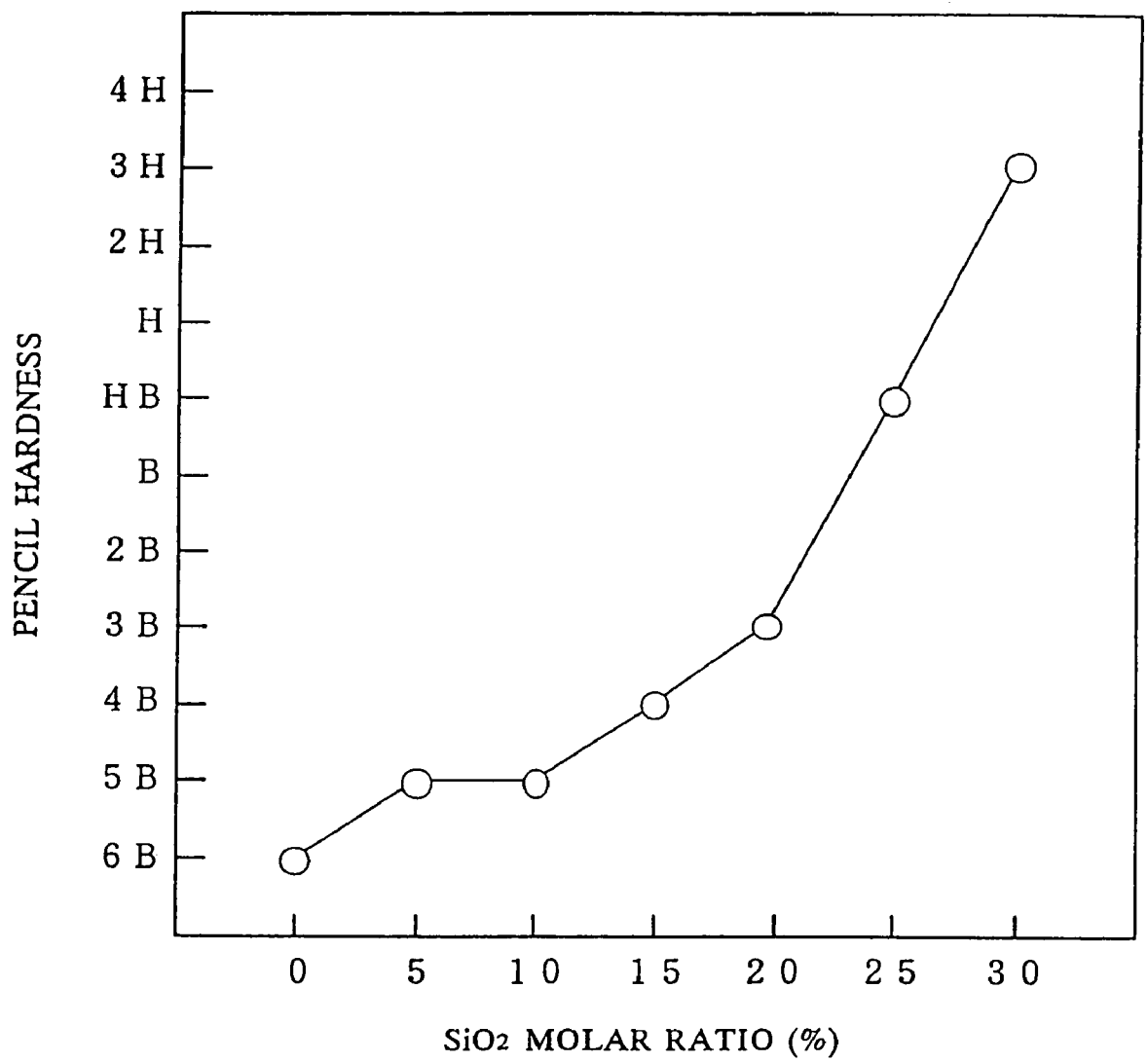

A pencil scratch test was carried out to examine the abrasion resistance of the sintered film comprised of titania and silica. The results are shown in the graph of FIG. 16. It will be understood that the abrasion resistivity is increased with increasing silica content.

Example 30

Sludge Test

A mixture of a sol of the anatase form of titania (STS-11) and a sol of colloidal silica (Snowtex 20) and having a silica content of 10% by weight in terms of solid matter was applied to a 15 cm-square glazed tile (AB02E01) in an amount of 4.5 mg in terms of solid matter and the tile was then calcined for 10 minutes at a temperature of 880° C. The specimen was then subjected to irradiation with UV light for 3 hours, at a UV intensity of 0.5 mW/cm$^2$ by using a BLB fluorescent lamp to obtain #1 specimen. The contact angle with water of the #1 specimen and the glazed tile (AB02E01) as such was 0° and 30°, respectively.

A mixture of powders of 64.3% by weight of yellow ochre, 21.4% by weight of calcined Kanto loam clay, 4.8% by weight of hydrophobic carbon black, 4.8% by weight of silica powder, and 4.7% by weight of hydrophilic carbon black was suspended in water at a concentration of 1.05 g/l to prepare a slurry.

150 ml of the thus prepared slurry was caused to flow down along the surface of the #1 specimen and the glazed tile (AB02E01) held inclined at 45°, followed by drying for 15 minutes, and 150 ml of distilled water was thereafter caused to flow down, followed by drying for 15 minutes, the cycle of the above-mentioned sequences being repeated for 25 times. A change in color difference and in glossiness after the sludge test was measured. The measurement of the glossiness was carried out according to the method laid down by the Japanese Industrial Standard (JIS) Z8741 and the variation in the glossiness was obtained by dividing the glossiness after testing by the glossiness before testing. The results are given in Table 8.

TABLE 8

|  | #1 Specimen | Tile (AB02E01) |
| --- | --- | --- |
| Contact Angle (°) | 0 | 30 |
| Color Diff. Change | 0.7 | 5.6 |
| Glossiness Change | 93.4% | 74.1% |

Example 31

Relationship between Contact Angle with Water and Self-Cleaning and Antifouling Capability Various specimens were subjected to a sludge test in a manner similar to Example 30. The tested specimens included the #1 specimen of Example 30, #2 specimen having a copper-doped titania coating, the glazed tile (AB02E01), an acrylic resin plate, an artificial marble plate (Toto Ltd., ML03) made of polyester resin matrix, and a polytetrafluoroethylene (PTFE) plate. The #2 specimen was prepared by spray coating 0.3 g of an aqueous solution of copper acetate monohydrate having a copper concentration of 50 μmol/g on the #1 specimen of Example 30 and, after drying, subjecting the specimen to irradiation with UV light for 10 minutes, at a UV intensity of 0.4 mW/cm$^2$ by a BLB fluorescent lamp to thereby subject copper acetate monohydrate to photoreduction deposition. The results of the sludge test are shown in Table 9.

TABLE 9

| Specimen | Contact Angle with Water (°) | Color Difference Change | Glossiness Change (%) |
| --- | --- | --- | --- |
| #1 Specimen | 0.0 | 0.7 | 93.8 |
| #2 Specimen | 4.0 | 2.0 | 81.5 |
| Glazed Tile | 19.4 | 4.6 | 68.3 |
| Acrylic Plate | 50.9 | 4.5 | 69.3 |
| Artif. Marble | 54.8 | 3.2 | 85.2 |
| PTFE Plate | 105.1 | 0.9 | 98.2 |

Furthermore, various specimens were subjected for a period of a month to an accelerated fouling test similar to Example 23. The specimens used included the #1 specimen of Example 30, the glazed tile (AB02E01), an acrylic resin plate, an aluminum plate covered by a base coating of silicone in a manner similar to Example 13, and a PTFE plate. The results of the accelerated tests are shown in Table 10 wherein, similar to Example 24, the change in the color difference represents that of the vertical striped area of the specimens.

TABLE 10

| Specimen | Contact Angle with Water (°) | Color Difference Change |
| --- | --- | --- |
| #1 Specimen | 0.0 | 0.9 |
| Glazed Tile | 19.4 | 1.5 |
| Acrylic Plate | 50.9 | 2.3 |
| Silicone Coated | 90.0 | 4.2 |
| PTFE Plate | 105.1 | 7.8 |

Figure 17:
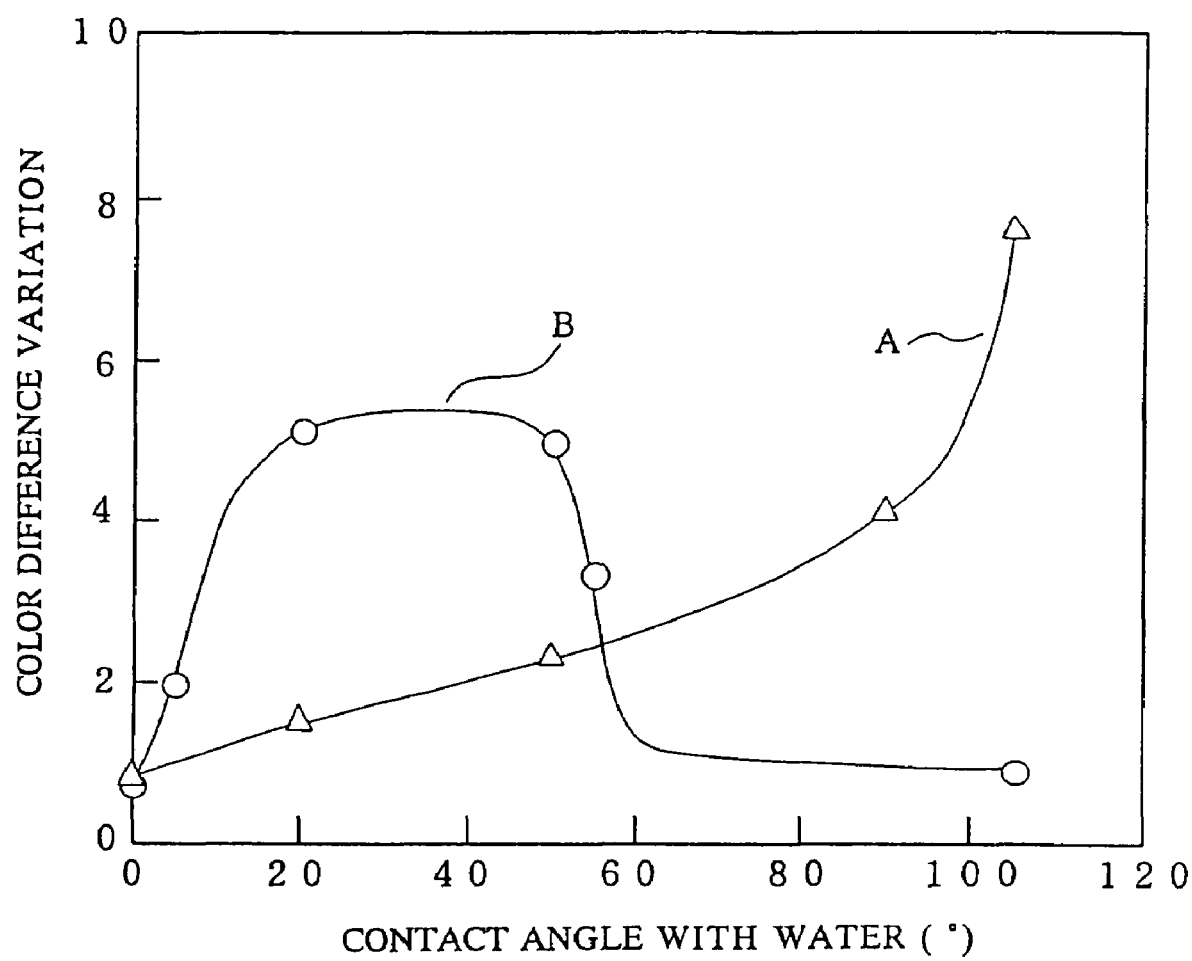
FIG. 17 is a graph showing to what degree various surfaces having different hydrophilicity are fouled by city grime and sludge.

To facilitate understanding, the contact angle with water as well as the variation in the color difference are plotted in the graph of FIG. 17. In the graph of FIG. 17, the curve A indicates the relationship between the contact angle with water and the color difference change caused by the contaminants such as airborne combustion products like carbon black and city grime as a result of the accelerated fouling test, with the curve B representing the relationship between the contact angle with water and the color difference change caused by sludge as a result of the sludge test.

Referring to the graph of FIG. 17, as the contact angle with water of the substrate increases, the dirt or stain due to combustion products and city grime becomes more conspicuous, as will be readily understood from the curve A. This is because the contaminants such as combustion products and city grime are generally hydrophobic and, hence, are apt to adhere to a hydrophobic surface.

In contrast, the curve B illustrates that the dirt or stain due to sludge peaks when the contact angle with water is in the range of 20-50°. This is because the inorganic substances such as loam and soil inherently have a hyrdophilicity on the order of 20-50° in terms of the contact angle with water so that they are apt to adhere to a surface having a similar hyrdophilicity. It will therefore be understood that, by rendering the surface hyrdophilic to the degree that the contact angle with water is less than 20° or, alternatively, by rendering the surface hyrdophobic to the degree that the contact angle with water is greater than 60°, the adherence of the inorganic substances to a surface can be prevented.

The reason why fouling by sludge is reduced as the contact angle with water is less than 20° is that, when the surface is rendered highly hydrophilic to the degree that the contact angle with water becomes less than 20°, the affinity of the surface for water exceeds the affinity for inorganic substances so that adherence of inorganic substances is blocked by water which preferentially adheres to the surface and any inorganic substances that have adhered to or are tending to adhere to the surface are readily washed away by water.

It will be noted from the foregoing that, in order to prevent both the hydrophobic and hydrophilic substances from adhering to the surface of a building and the like, or in order to ensure that dirt or smudge deposited on the surface is washed away by rain water so as to permit the surface to be self-cleaned, it is desirable to modify the surface to present a contact angle with water of less than 20°, preferably less than 10°, more preferably less than 5°.

Example 32

Coating of Sintered Titania and Tin Oxide—Glazed Tile

A sol of the anatase form of titania (STS-11) and a sol of tin oxide (Taki Chemical K.K. of Kakogawa City, Hyogo-Prefecture; mean crystallite size of 3.5 nm) were admixed at various blending ratio (percent by weight of tin oxide to the sum of titania plus tin oxide) shown in Table 11 and the mixtures were applied by spray coating on the surface of 15 cm$^{-1}$ square glazed tiles (AB02E01), followed by sintering for 10 minutes at a temperature either of 750° C. or 800° C. to obtain #1-#6 specimens. After sintering, the #2, #4, #5 and #6 specimens were further doped with silver by applying thereon an aqueous solution containing 1 weight percent of silver nitrate and by subjecting silver nitrate to photoreduction deposition. In addition, #7-#9 specimens were further prepared by applying onto the glazed tiles only a sol of tin oxide or a sol of titania and by sintering. After sintering, the #7 and #9 specimens were further doped with silver.

Each specimen was kept in the dark for a week and was thereafter subjected to irradiation with UV light for 3 days, at a UV intensity of 0.3 mW/cm$^2$ by using a BLB fluorescent lamp whereupon the contact angle with water was measured. The results are shown in Table 11.

TABLE 11

| Specimen | SnO$_2$ Ratio (wt %) | Sintering Temp. (° C.) | Ag | Contact Angle (°) |
|---|---|---|---|---|
| #1 | 1 | 800 | None | 0 |
| #2 | 5 | 800 | Added | 0 |
| #3 | 15 | 800 | None | 0 |
| #4 | 15 | 750 | Added | 0 |
| #5 | 50 | 750 | Added | 0 |
| #6 | 95 | 800 | Added | 5 |
| #7 | 100 | 750 | Added | 8 |
| #8 | 0 | 800 | None | 11 |
| #9 | 0 | 800 | Added | 14 |

As will be apparent from Table 11, in the #8 and #9 specimens which were coated only with titania, the contact angle with water exceeded 10°. This is because the alkaline network-modifier ions such as sodium ions diffused from the glaze into the titania coating during sintering whereby the photocatalytic activity of anatase was hindered. In contrast, it will be noted that, in the #1-#6 specimens wherein SnO$_2$ were blended, the surface was hydrophilified to a high degree. As shown by the #7 specimen, tin oxide which is a semiconductor photocatalyst is effective in rendering the surface hydrophilic in a manner similar to titania. Although the reason therefor is not clear, this Example illustrates that the effect of diffusion of the alkaline network-modifier ions can be overcome by adding tin oxide to titania.

Example 33

Sintered Titania Coating and Diffusion Prevention Layer—Glazed Tile

Tetraethoxysilane (marketed by Colcoat, "Ethyl 28") was applied by spray coating on the surface of a 15 cm-square glazed tile (AB02E01) which was then held at a temperature of about 150° C. for about 20 minutes to subject tetraethoxysilane to hydrolysis and dehydration polymerization whereby a coating of amorphous silica was formed on the surface of the glazed tile.

Then, a sol of the anatase form of titania (STS-11) was applied by spray coating on the surface of the tile which was then fired for an hour at a temperature of 800° C.

The thus obtained specimen, as well as the #8 specimen of Example 32 tested for the purposes of comparison, were kept in the dark for a week and were then subjected to irradiation with UV light for 1 day, at a UV intensity of 0.3 mW/cm$^2$ by using a BLB fluorescent lamp whereupon the contact angle with water was measured.

In contrast to the contact angle with water being 12° in the #8 specimen of Example 32, the specimen provided with the intervening layer of amorphous silica was hydrophilified to the degree that the contact angle with water became less than 3°. It is therefore considered that the layer of amorphous silica is effective in preventing diffusion of the alkaline network-modifier ions being present in the glaze layer.

Example 34

Amorphous Titania Calcination Coating and Diffusion Prevention Layer—Glazed Tile In a manner similar to Example 1, a thin film of amorphous silica and then a thin film of amorphous titania were formed in sequence on the surface of a 15 cm-square glazed tile (AB02E01). The tile was then calcined at a temperature of 500° C. to transform amorphous titania into the anatase form titania.

The specimen thus obtained was kept in the dark for several days and was then subjected to irradiation with UV light for 1 day, at a UV intensity of 0.5 mW/cm$^2$ by using a BLB fluorescent lamp. The contact angle with water of the resultant specimen as measured was 0°. Similar to Example 33, it is considered that the layer of amorphous silica is effective in rendering the surface of a tile highly hydrophilic.

Example 35

Glazed Tile—Cleansing Capability for Oil Stains

A quantity of oleic acid was applied on the surface of the #1 specimen of Example 30. When the specimen was then immersed in water in a cistern with the specimen surface held in a horizontal position, oleic acid became rounded to form oil droplets which were then released from the surface of the tile to ascend to the top of the water.

This Example also illustrates that a surface of pottery, such as tile and tableware, fouled by oil or fat can be readily cleansed merely by soaking the object in water or by wetting it with water, provided that the surface thereof is provided with a photocatalytic coating and provided that the photocatalyst is photoexcited by UV irradiation.

Example 36

Glass—Cleansing Capability for Oil Stains

In a manner similar to Example 1, a thin film of amorphous silica and then a thin film of amorphous titania were formed in sequence on the surface of a 10 cm-square soda-lime glass plate. The glass plate was then fired at a temperature of 500° C. to transform amorphous titania into the anatase form titania.

A quantity of oleic acid was applied on the surface of the glass plate. As the glass plate was then immersed in water in a cistern with the surface held in a horizontal position, oleic acid became rounded to form oil droplets which were then released from the surface of the glass plate and floated.

Example 37

Glass—Self-Cleaning and Antifouling Capability

The specimen of Example 36 was subjected for a month to an accelerated fouling test similar to Example 23. When inspected by the eye a month later, no smudge of a vertically striped pattern was observed.

Example 38

Glazed Tile—Antibacterial Enhancer (Ag Doping)

A coating comprised of titania and silica was formed on the surface of a 15 cm-square glazed tile (AB02E01) in a manner similar to Example 27.

Then an aqueous solution containing 1 weight percent of silver lactate was applied onto the surface of the tile which was then subjected to irradiation with UV light of a BLB fluorescent lamp to thereby subject silver lactate to photoreduction to form a silver deposit whereby a specimen coated with silver doped titania was obtained. The contact angle with water as measured was 0°.

When the tile was then tested for the antibacterial function in a manner similar to Example 19, the survival rate of colibacillus was less than 10%.

Example 39

Glazed Tile—Antibacterial Enhancer (Cu Doping)

A coating comprised of titania and silica was formed on the surface of a 15 cm-square glazed tile (AB02E01) in a manner similar to Example 27.

Then an aqueous solution containing 1 weight percent of copper acetate monohydrate was applied onto the surface of the tile which was then subjected to irradiation with UV light of a BLB fluorescent lamp to thereby subject copper acetate monohydrate to photoreduction to form a copper deposit whereby a specimen coated with copper-doped titania was obtained. The contact angle with water as measured was less than 3°.

As the tile was then tested for the antibacterial function in a manner similar to Example 19, the survival rate of colibacillus was less than 10%.

Example 40

Glazed Tile—Photo-Redox Activity Enhancer

A coating comprised of titania and silica was formed on the surface of a 15 cm-square glazed tile (AB02E01) in a manner similar to Example 27.

Then, the surface of the specimen was doped with platinum in a manner similar to Example 22. The contact angle with water as measured was 0°.

The removal rate of methyl mercaptan as measured in a manner similar to Example 20 was 98%.

Example 41

Effect of Photoexciting Wavelength

After being kept in the dark for 10 days, the #8 specimen of Example 32 and, for the purposes of comparison, the glazed tile (AB02E01) without titania coating were subjected to irradiation with UV light by using a Hg—Xe lamp under the conditions shown in Table 12 and on doing so the variation in response to time of the contact angle with water was measured.

TABLE 12

| UV Wavelength (nm) | UV Intensity (mW/cm$^2$) | Photon Density (photon/sec/cm$^2$) |
|---|---|---|
| 313 | 10.6 | $1.66 \times 10^{16}$ |
| 365 | 18 | $3.31 \times 10^{16}$ |
| 405 | 6 | $1.22 \times 10^{16}$ |

Figure 18A:
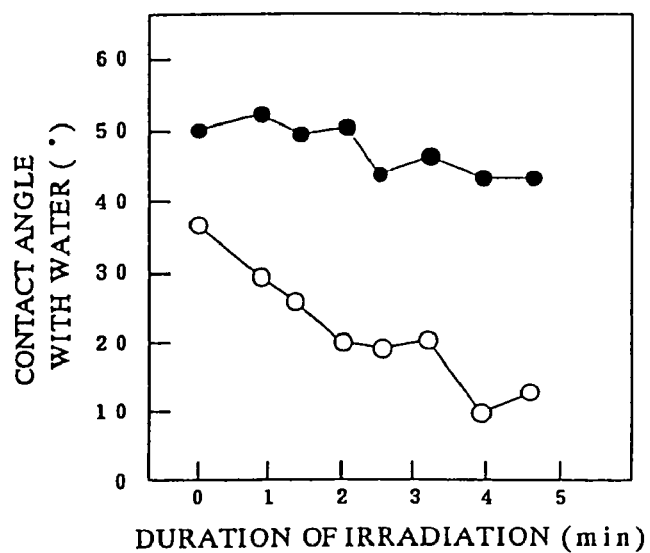
FIGS. 18A-18C are graphs showing the variation, in response to time, of the contact angle with water when ultraviolet light having different wavelengths is irradiated on the surface of the photocatalytic coating.
Figure 18B:
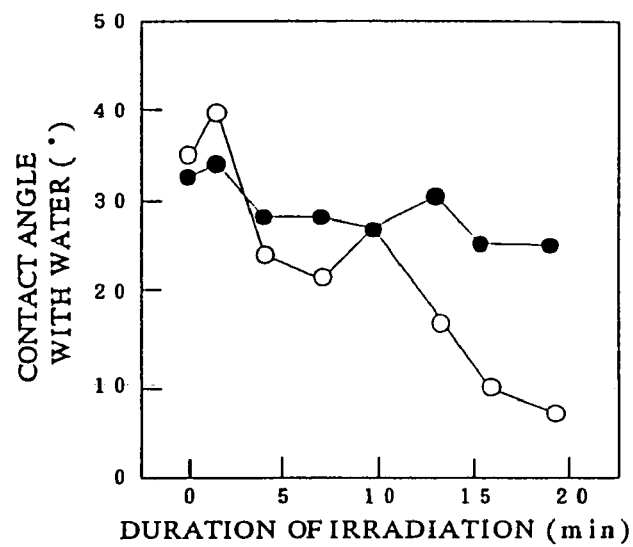
Figure 18C:
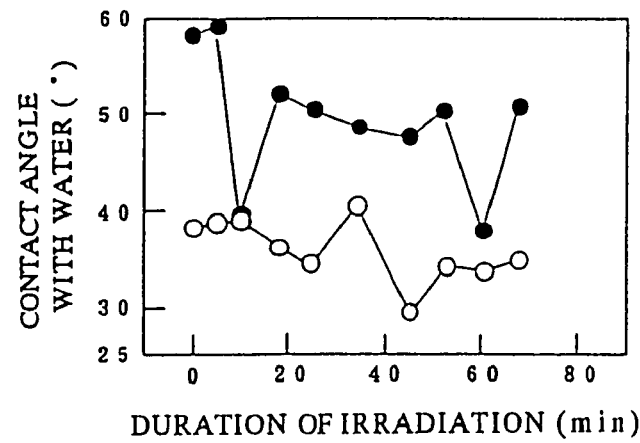

The results of measurement were shown in FIGS. 18A-18C wherein the value plotted by white dots represents the contact angle with water of the #8 specimen of Example 32 and the value plotted by black dots indicates the contact angle with water of the glazed tile which was not provided with the titania coating.

As will be understood from FIG. 18C, hydrophilification did not occur in the case that a UV light having an energy lower than that of a wavelength of 387 nm corresponding to the bandgap energy of the anatase form of titania (i.e., a UV light having a wavelength longer than 387 nm) was irradiated.

In contrast, as will be apparent from FIGS. 18A and 18B, the surface was rendered hydrophilic upon irradiation with UV light having an energy higher than the bandgap energy of anatase.

From the foregoing, it was confirmed that hydrophilification of a surface would not occur unless the photocatalyst is photoexcited and that hydrophilification of a surface results from the photocatalytic action of the photocatalyst.

Example 42

Physisorption of Water under Photocatalytic Action

Powders of the anatase form of titania (made by Nihon Aerosol, P-25) were pressed to form three specimens in the form of a disc of compacted powders. The specimens were subjected respectively to Experiments 1-3, described below, wherein the surface of the specimens was tested and inspected by the Fourier transform infrared spectroscopic analysis (FT-IR) using a Fourier transform infrared spectrometer (FTS-40A). Throughout these experiments, an ultraviolet lamp (UVL-21) having a wavelength of 366 nm was used for UV irradiation.

For the purpose of analyzing the infrared absorption spectrum, the following absorption bands are assigned, respectively, to the following information.

Sharp absorption band at wavenumber 3690 cm$^{-1}$:
stretching of OH bond of chemisorbed water.
Broad absorption band at wavenumber 3300 cm$^{-1}$:
stretching of OH bond of physisorbed water.
Sharp absorption band at wavenumber 1640 cm$^{-1}$:
bending of HOH bond of physisorbed water.
Absorption bands at wavenumbers 1700 cm$^{-1}$, 1547 cm$^{-1}$, 1475 cm$^{-1}$, 1440 cm$^{-1}$, and 1365 cm$^{-1}$:
carbonyl groups of contaminants adsorbed onto the specimen surface.

Experiment 1

First, the titania disc immediately after press forming was subjected to the infrared spectroscopic analysis. The absorption spectrum of the disc immediately after press forming is shown by the curve #1 in the graphs of FIGS. 19A and 19B.

Figure 19A:
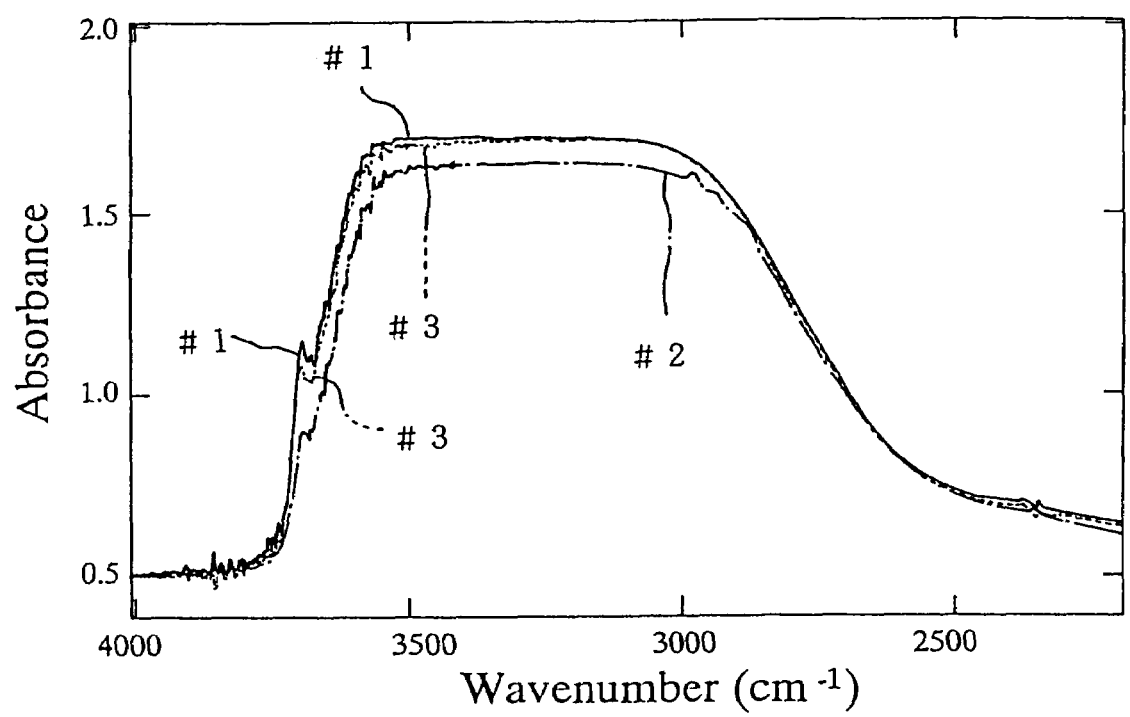
FIGS. 19A and 19B, FIGS. 20A and 20B, FIGS. 21A and 21B, FIGS. 22A and 22B, and FIGS. 23A and 23B, respectively, are graphs showing the infrared absorption spectrum of the surface of the photocatalytic coating; and, FIG. 24 is a schematic cross-sectional view in a microscopically enlarged scale of the surface of the photocatalytic coating and showing molecules of water physisorped onto the surface upon photoexcitation of the photocatalyst.
Figure 19B:
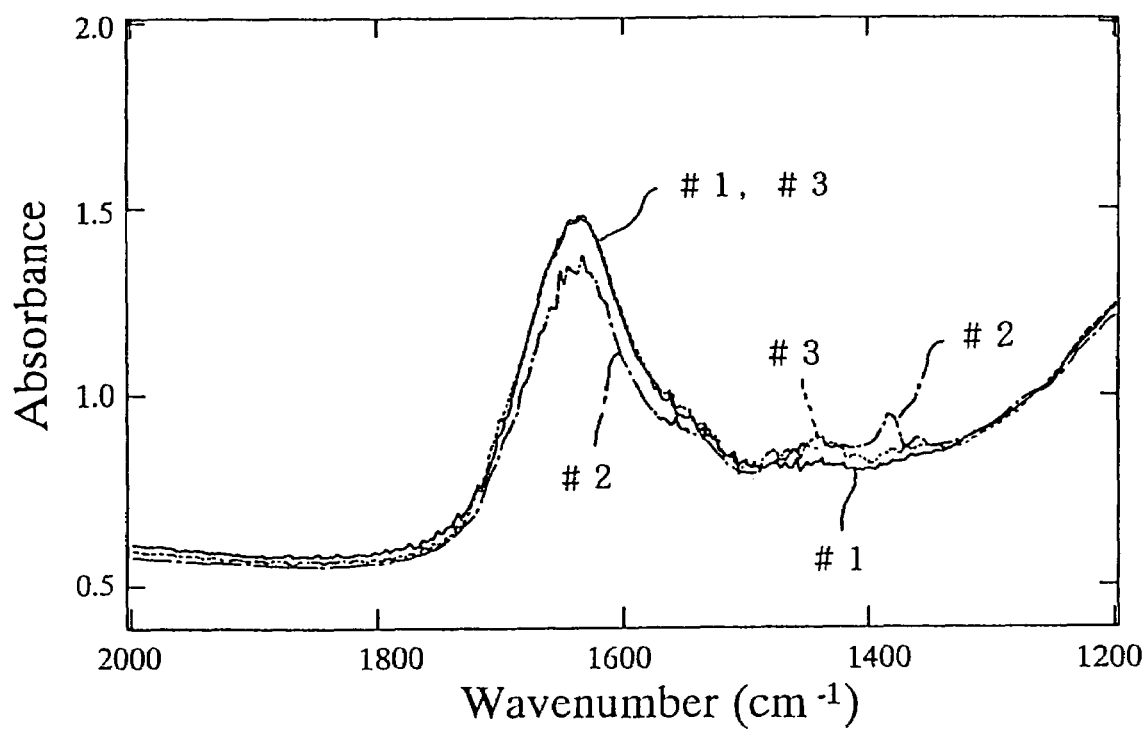

After keeping the titania disc for 17 hours in a dry box containing silica gel as a desiccant, the absorption spectrum was detected which is indicated by the curve #2 in the graphs of FIGS. 19A and 19B. As will be understood upon comparison of the #1 spectrum with the #2 spectrum, infrared absorption at the wavenumber 3690 cm$^{-1}$ was drastically decreased in the #2 spectrum, indicating that chemisorbed water has decreased. Similarly, absorption at the wavenumbers 3300 and 1640 cm$^{-1}$ was drastically decreased in the #2 spectrum, indicating that physisorbed (physically adsorbed) water has also decreased. It is therefore observed that both chemisorbed water and physisorbed water have decreased by keeping the specimen in dry air for 17 hours.

In contrast, infrared absorption at wavenumber 1300-1700 cm$^{-1}$ due to presence of the carbonyl groups was increased, suggesting that, during storage of the specimen, compounds containing carbonyl groups were adsorbed onto the specimen surface thereby contaminating the surface. It was impossible to measure the variation in the contact angle with water at the surface of the specimen because of the porous nature of surface of the disc-shaped specimen which was made by press-forming of titania powders. However, it is presumed that the contact angle with water at the surface of a specimen would be increased during storage in dry air if the specimen were made in the form of a thin film of the anatase form of titania.

Then, the titania disc in the dry box was subjected to irradiation with UV light for an hour, at a UV intensity of 0.5 mW/cm$^2$ and the absorption spectrum was detected which is shown in the graphs of FIGS. 19A and 19B by the curve #3.

As will be apparent from the #3 spectrum, absorption at wavenumber 3690 cm$^{-1}$ was almost revived. Similarly, absorption at wavenumbers 3300 and 1640 cm$^{-1}$ substantially restored the initial level. It is therefore observed that, upon UV irradiation, both the amount of chemisorbed water and the amount of physisorbed water are resumed the initial level. It is presumed that, if the specimen were made in the form of a titania thin film, the surface of the thin film would be rendered hydrophilic upon UV irradiation so that the contact angle with water would be decreased.

Thereafter, the specimen was placed for 24 hours in a dark room communicated with the ambient air and the absorption spectrum was detected. To avoid various curves being overly complicated, the detected absorption spectrum is shown in the different graphs of FIGS. 20A and 20B by the curve #4. Further, to provide a basis for comparison, the #2 spectrum is reproduced in the graphs of FIGS. 20A and 20B.

As shown by the #4 curve, a slight decrease is observed in the absorption at wavenumbers 3690 and 1640 cm$^{-1}$. Accordingly, it is concluded that the amount of chemisorbed and physisorbed water slightly decreases as the specimen after UV irradiation is placed in the dark in the presence of moisture in the ambient air. However, absorption at wavenumber 1300-1700 cm$^{-1}$ is increased, showing that carbonyl compounds were further adsorbed. It is presumed that, if the specimen were made in the form of a titania thin film, the contact angle with water would be increased in response to contamination.

Figure 20A:
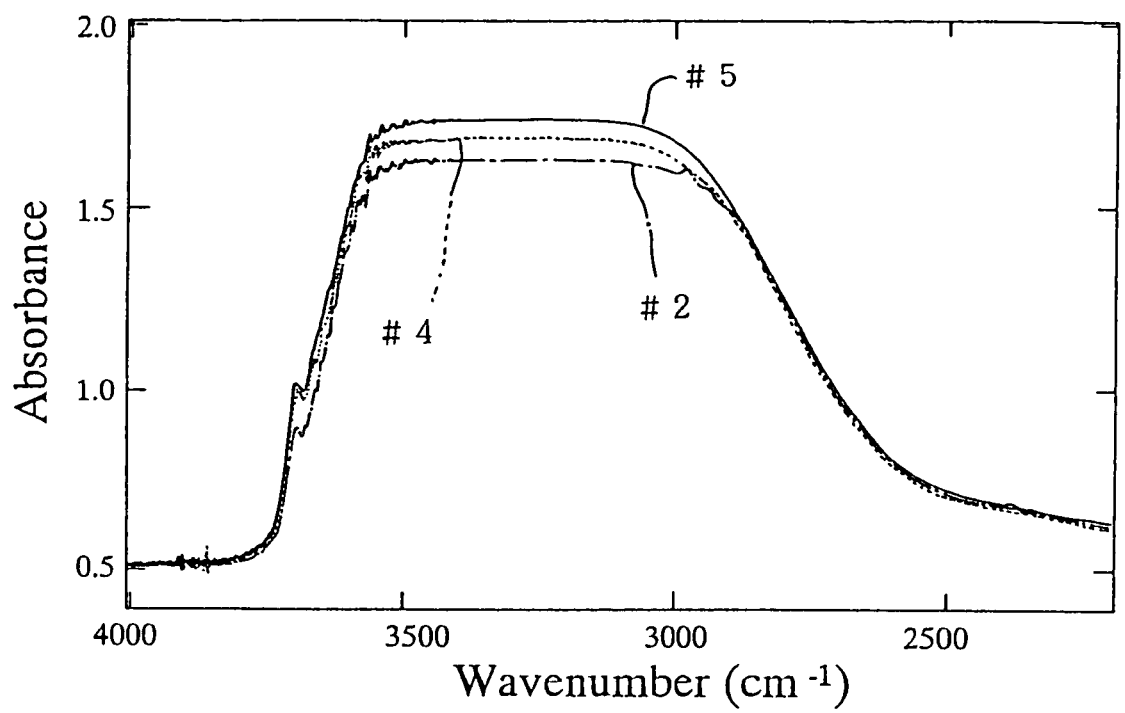
Figure 20B:
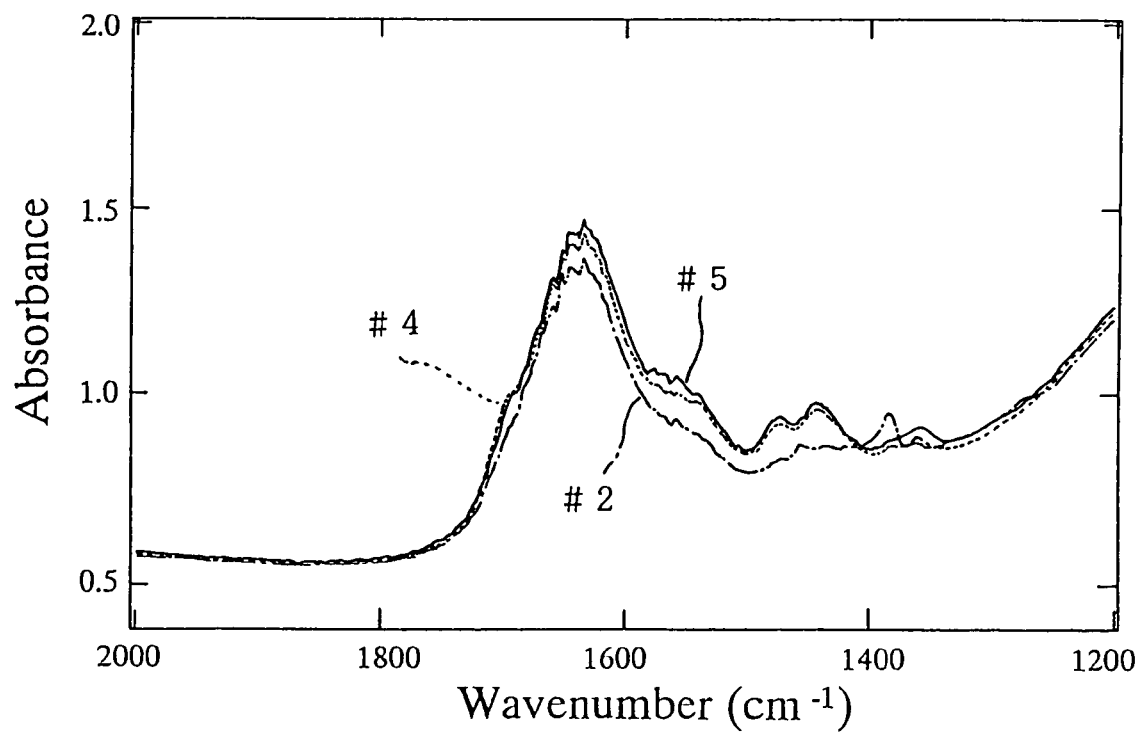

Finally, the titania disc was again subjected to irradiation with UV light in a dark room communicated with the ambient air for an hour, at a UV intensity of 0.5 mW/cm$^2$ and the absorption spectrum was detected which is shown in the graphs of FIGS. 20A and 20B by the curve #5. As shown in the graphs, no change was observed in the absorption at wavenumber 3690 cm$^{-1}$, whereas the absorption at wavenumber 3300 cm$^{-1}$ is remarkably increased, with the absorption at wavenumber 1640 cm$^{-1}$ being increased. It will therefore be noted that as a result of re-irradiation with UV light, the amount of chemisorbed water remained unchanged but the amount of water was increased. It is presumed that, if the specimen were made in the form of a titania thin film, the contact angle with water would be decreased upon UV irradiation.

Experiment 2

First, the titania disc immediately after press forming was subjected to the infrared spectroscopic analysis. The absorption spectrum detected is shown in the graphs of FIGS. 21A and 21B by the curve #1.

Figure 21A:
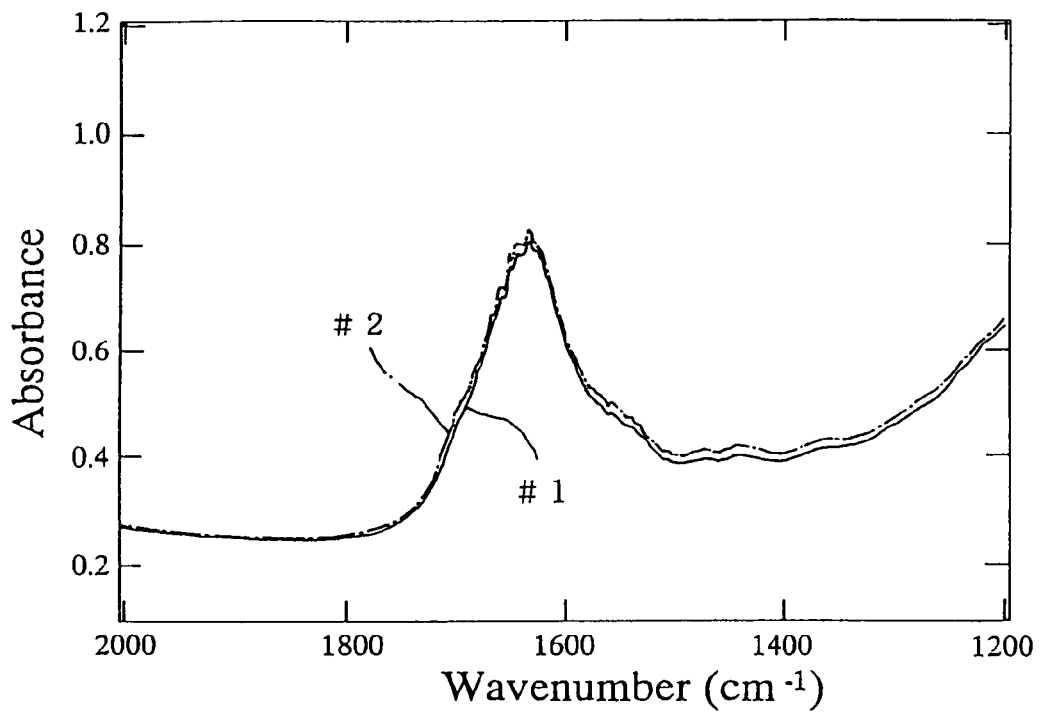
Figure 21B:
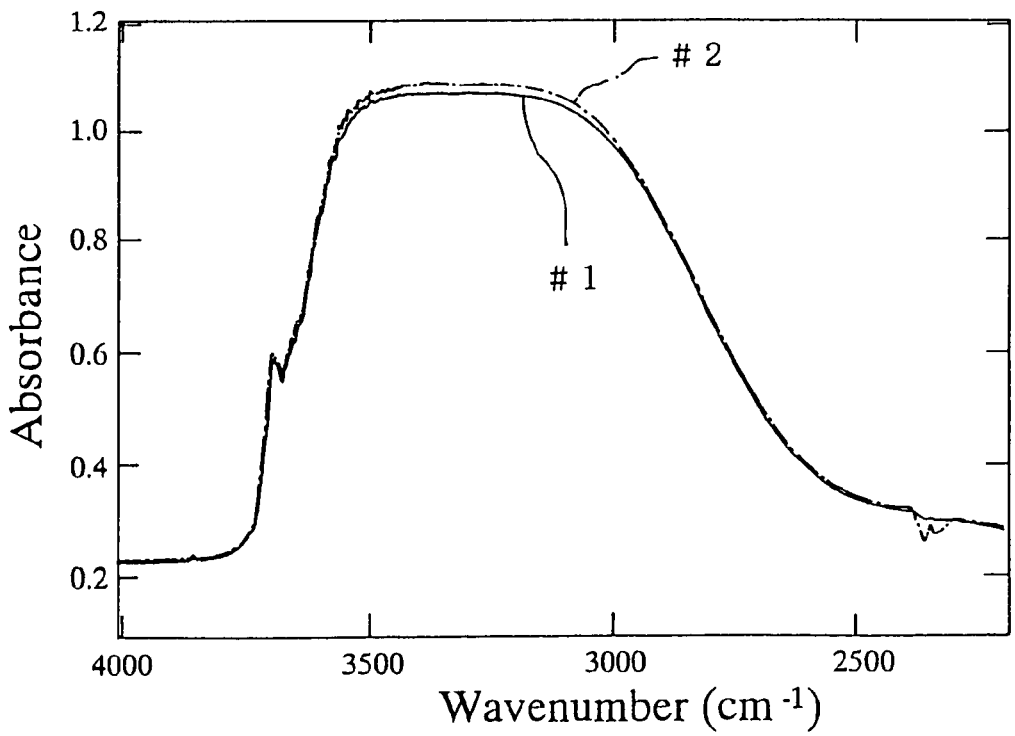

Then, the titania disc was subjected to irradiation with UV light for one hour, at a UV intensity of 0.5 mW/cm$^2$ and the absorption spectrum was detected which is shown in the graphs of FIGS. 21A and 21B by the curve #2.

Figure 22A:
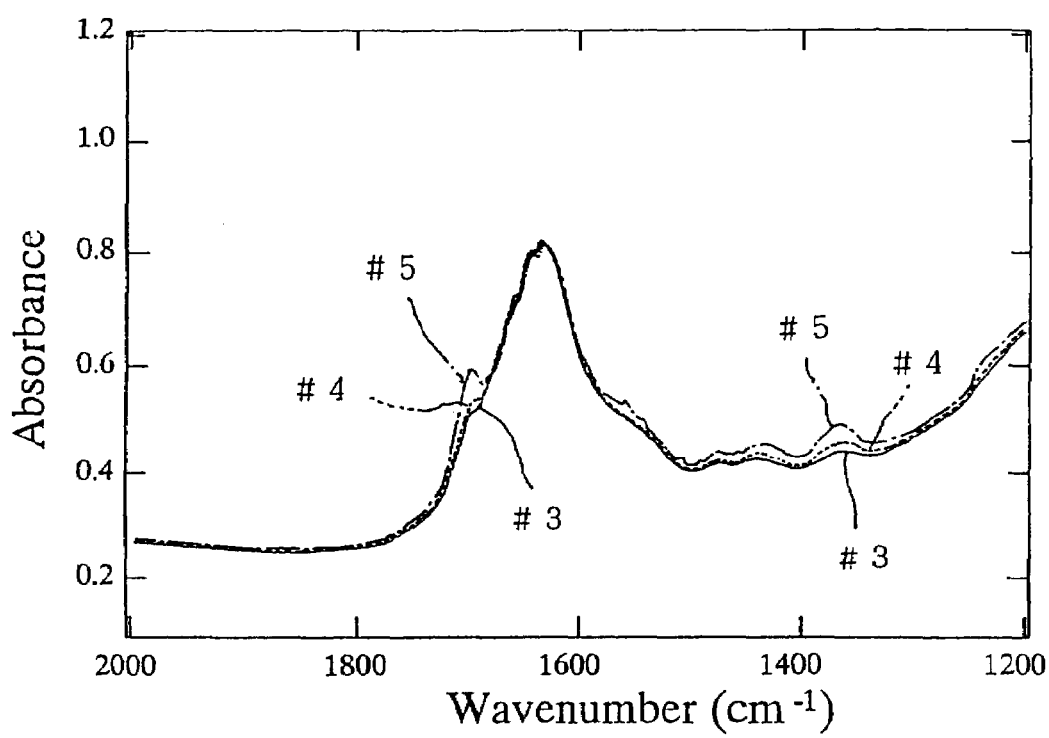
Figure 22B:
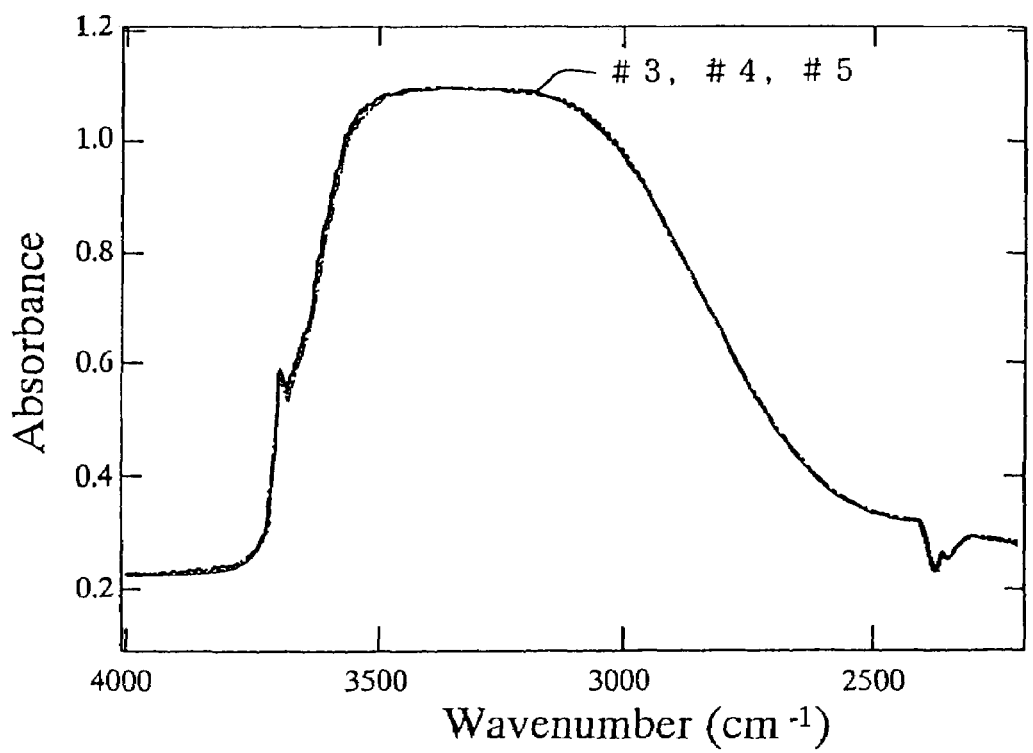

The disc was further subjected to irradiation with UV light at the same UV intensity for additional one hour (total 2 hours), further additional one hour (total 3 hours), and further additional 2 hours (total 5 hours) and the absorption spectra detected at the end of irradiation are shown in FIGS. 22A and 22B by the curve #3, #4 and #5, respectively.

As will be understood upon comparison of the #1 spectrum with the #2 spectrum, both the amount of chemisorbed water and the amount of physisorbed water were increased as the disc was subjected for the first time to UV irradiation. During the first irradiation, the amount of adherent carbonyl compounds was slightly increased. Presumably, the contact angle with water would be decreased in response to UV irradiation if the specimen were made in the form of a titania thin film.

After the disc was subjected to UV irradiation for further one hour (total 2 hours), the amount of chemisorbed water was slightly decreased but the amount of physisorbed water remained unchanged, as shown by the #2 and #3 spectra. The amount of adherent carbonyl compounds was slightly increased. It is considered that the absence of any change in the amount of physisorbed water is due to saturation of the physisorbed water. It is presumed that the contact angle with water would remain unchanged if the specimen were made in the form of a titania thin film.

As will be noted from the #4 and #5 spectra, UV irradiation for further one hour (total 3 hours) and for further 2 hours (total 5 hours) resulted in a further slight decrease in the amount of chemisorbed water, with the amount of physisorbed water remained unchanged. The amount of adhered carbonyl compounds was increased. It is considered that the contact angle with water would remain unchanged if the UV irradiation were carried out on a specimen made in the form of a titania thin film.

Experiment 3

This experiment is similar to Experiment 1 in many respects and the major difference resides in that the UV intensity was decreased.

Figure 23A:
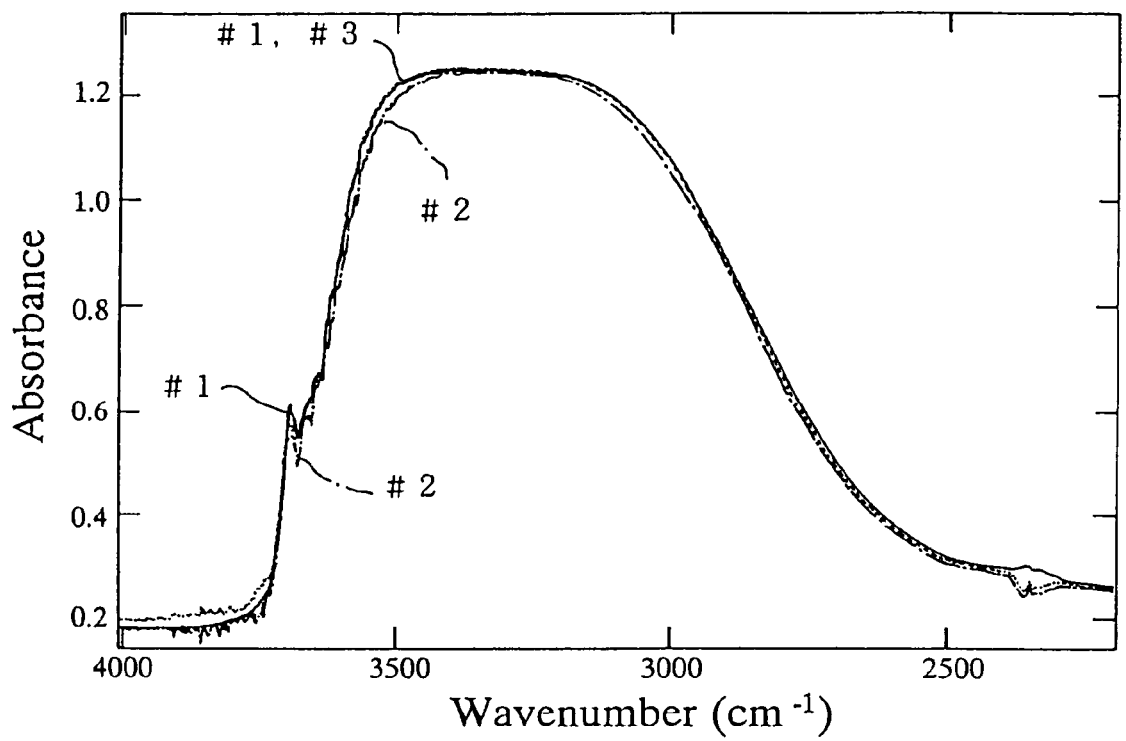
Figure 23B:
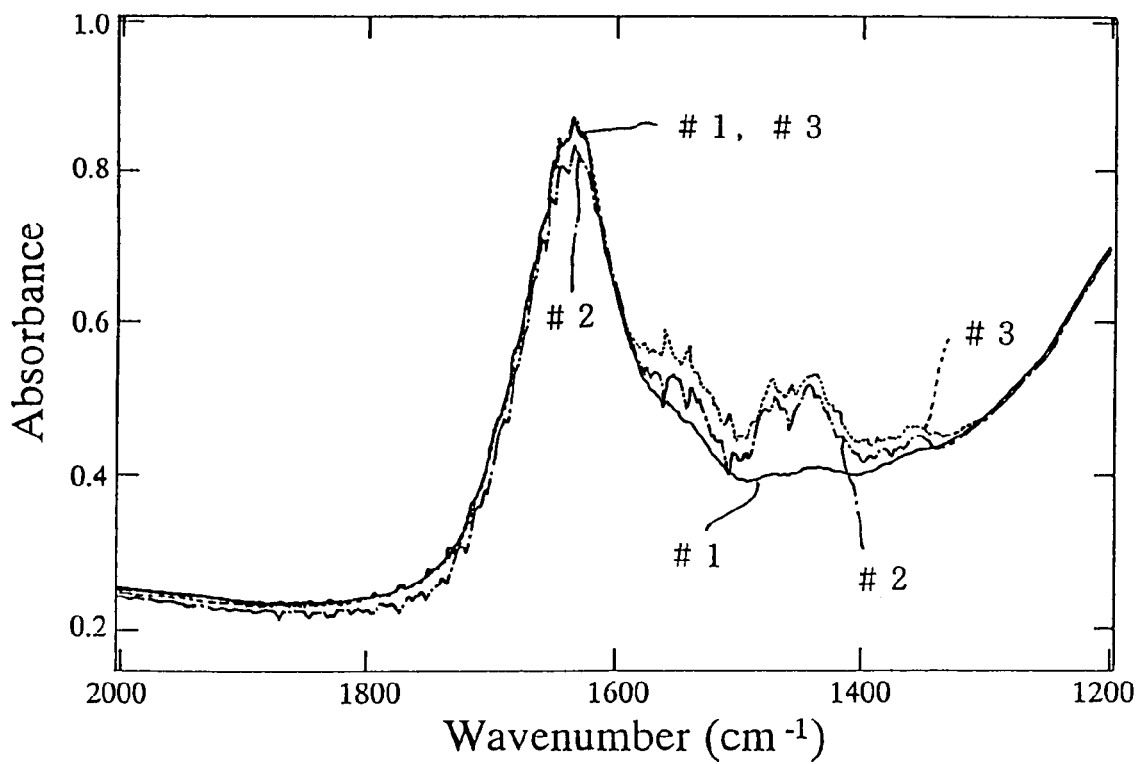

First, the titania disc immediately after press forming was subjected to the infrared spectroscopic analysis. The detected absorption spectrum is shown by the curve #1 in the graphs of FIGS. 23A and 23B. Then, the disc was placed for 34 hours in a dark room communicated with the ambient air and thereafter the absorption spectrum was detected which is shown by the curve #2 in the graphs of FIGS. 23A and 23B. Then, the titania disc placed in the same dark room was subjected to irradiation with UV light for 2 hours, at a UV intensity of 0.024 mW/cm$^2$ and the absorption spectrum was detected, the detected spectrum being indicated by the curve #3 in the graphs of FIGS. 23A and 23B.

As will be understood from the graphs, both the amount of chemisorbed water and the amount of physisorbed water were decreased as the disc was placed in a dark room in the presence of ambient moisture. As the amount of carbonyl compounds adhered to the specimen was increased, it is presumed that the contact angle with water would be increased if a specimen made in the form of a titania thin film were used.

It will be noted that in response to UV irradiation the amount of chemisorbed water was slightly increased and the amount of physisorbed water was increased to again attain to the initial level. During UV irradiation, the amount of adherent carbonyl compounds was slightly increased. It is presumed that the contact angle with water would be increased during UV irradiation if a specimen made in the form of a titania thin film were used.

Evaluation of the Test Results

To facilitate comparison, the results of Experiments 1-3 are summarized in Table 13 below.

TABLE 13

| Experiment | Contact Angle w/w | Chemisorbed Water | Physisorbed Water | Carbonyl Compound |
|---|---|---|---|---|
| Experiment 1 (0.5 mW/cm$^2$) | | | | |
| dark room dry air | increased | decreased | decreased | increased |
| UV irradiated dry air | decreased | almost restored | restored | decreased |
| dark room ambient air | increased | slightly decreased | slightly decreased | increased |
| UV irradiated ambient air | decreased | unchanged | increased | unchanged |
| Experiment 2 (0.5 mW/cm$^2$) | | | | |
| UV irradiated (1 h) | decreased | slightly increased | increased | slightly increased |
| UV irradiated (2 h) | unchanged | slightly decreased | unchanged | slightly increased |
| UV irradiated (3 h) | unchanged | slightly decreased | unchanged | increased |
| UV irradiated (5 h) | unchanged | slightly decreased | unchanged | increased |
| Experiment 3 (0.024 mW/cm$^2$) | | | | |
| dark room ambient air | increased | decreased | decreased | increased |
| UV irradiated ambient air | decreased | slightly increased | increased | increased |

As will be best understood from Table 13, the amount of physisorbed water increases in good response to UV irradiation.

Figure 24:
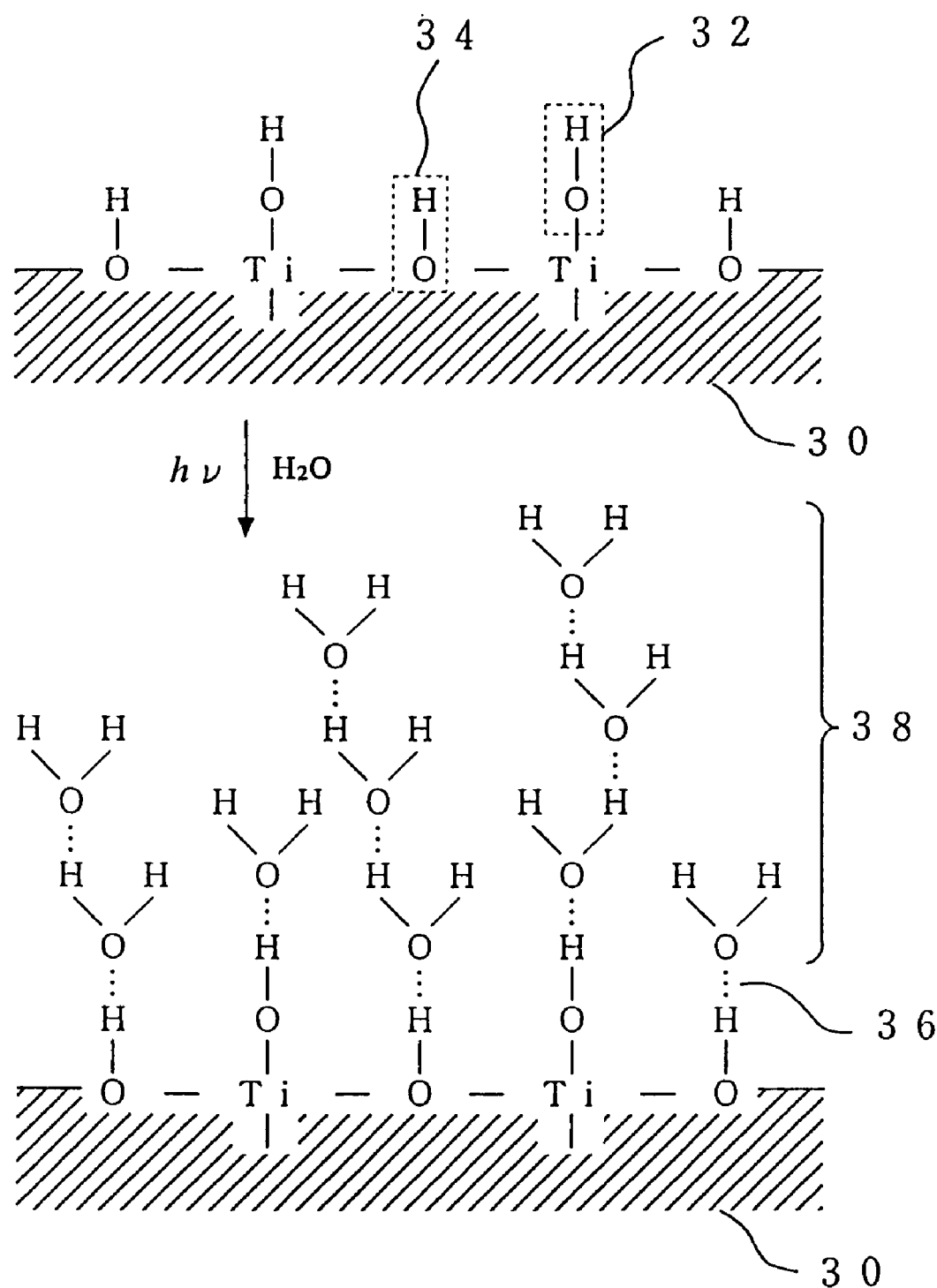

In this regard, it is considered that, as illustrated in the upper part of FIG. 24, in the crystal face of a crystal of titania forming a titania coating 30, a terminal OH group 32 is bonded to each titanium atom, with a bridging OH group 34 being bonded to a pair of adjacent titanium atoms, these OH groups 32 and 34 forming a layer of chemisorbed water. It is considered that, upon irradiation with UV light in the presence of ambient moisture, molecules of water in the ambient air are physically adsorbed by way of hydrogen bond 36 onto the hydrogen atoms of the terminal and bridging OH groups to thereby form a layer of physisorbed water 38, as illustrated in the lower part of FIG. 24.

As the amount of physisorbed water increases in good response to UV irradiation as described before, Example 42 demonstrates that formation of a layer of physisorbed water 38 is induced by the photocatalytic action of titania. It is believed that because of the presence of the layer of physisorbed water 38 the surface of titania surface is rendered hydrophilic.

In contrast, the amount of carbonyl compounds adhered to the surface appears to increase with increasing duration of contact with ambient air. It is considered that upon photoexcitation of the photocatalyst the water-wettability of the surface is increased regardless of increasing amount of adherent carbonyl compounds.

Example 43

Plastic Plate Coated by Photocatalyst-Containing Silicone

A titania-containing coating composition similar to that of Example 18 was applied on a polyethyleneterephthalate (PET) film (Fuji Xerox, monochromatic PPC film for OHP, JF-001) and was cured at a temperature of 110° C. to obtain #1 specimen coated with titania-containing silicone.

Further, an aqueous polyester paint (made by Takamatsu Resin, A-124S) was applied on another PET film (JF-001) and was cured at 110° C. to form a primer coating. A titania-containing coating composition similar to that of Example 18 was then applied on the primer coating and was cured at a temperature of 110° C. to obtain #2 specimen.

Also, a titania-containing coating composition similar to that of Example 18 was applied on a polycarbonate (PC) plate and was cured at a temperature of 110° C. to obtain #3 specimen.

Furthermore, an aqueous polyester paint (A-124S) was applied on another polycarbonate plate, followed by curing at a temperature of 110° C. to form a primer coating, and a titania-containing coating composition similar to that of Example 18 was thereafter applied thereon followed by curing at a temperature of 110° C. to obtain #4 specimen.

The #1-#4 specimens as well as the PET film (JF-001) and polycarbonate plate as such were subjected to irradiation with UV light, at a UV intensity of 0.6 mW/cm$^2$ by using a BLB fluorescent lamp and on doing so the variation in response to time of the contact angle with water of the specimen surface was measured. The results are shown in Table 14.

TABLE 14

| Specimen | Before Irradiat. | 1 day later | 2 days later | 3 days later | 10 days later |
|---|---|---|---|---|---|
| #1 | 71° | 44° | 32° | 7° | 2° |
| #2 | 73° | 35° | 16° | 3° | 2° |
| #3 | 66° | 55° | 27° | 9° | 3° |
| #4 | 65° | 53° | 36° | 18° | 2° |
| PET | 70° | 72° | 74° | 73° | 60° |
| PC | 90° | 86° | 88° | 87° | 89° |

As will be apparent from Table 14, the surface of the specimens under question was hydrophilified as UV irradiation was continued and about 3 days later the surface is rendered superhydrophilic. As described hereinbefore with reference to Example 14, it is considered that this is due to the fact that the organic groups bonded to the silicon atoms of the silicone molecules of the titania-containing silicone layer were substituted with the hydroxyl groups under the photocatalytic action caused by photoexcitation.

As is well-known, a UV intensity of 0.6 mW/cm$^2$ is roughly equal to the intensity of the UV light contained in the sunlight impinging upon the earth's surface. It will be noted, accordingly, that superhydrophilification can be achieved simply by exposing the titania-containing silicone coating to the sunlight.

Example 44

Weathering Test of Photocatalyst-Containing Silicone

The #1 specimen (aluminum substrate coated with silicone) and the #2 specimen (aluminum substrate coated with titania-containing silicone) of Example 13 were subjected to a weathering test by using a weathering testing machine (made by Suga Testing Instruments, Model "WEL-SUN-HC") while irradiating a light from a carbon arc lamp and spraying rain for 12 minutes per hour and at a temperature of 40° C. The weather resistivity was assessed by the glossiness retention rate (percentage of the glossiness after testing to the initial glossiness). The results are shown in Table 15.

TABLE 15

| Specimen | 500 hrs | 1000 hrs | 3000 hrs |
|----------|---------|----------|----------|
| #1 | 91 | 95 | 90 |
| #2 | 99 | 100 | 98 |

As will be apparent from Table 15, the glossiness retention rate remained roughly the same regardless of the presence or absence of titania. This indicates that the siloxane bonds forming the main chain of the silicone molecule were not broken by the photocatalytic action of titania. It is therefore considered that the weather resistivity of silicone is not affected even after the organic groups bonded to the silicon atoms of the silicone molecules are substituted with the hydroxyl groups.

While the present invention has been described herein with reference to the specific embodiments thereof, it is contemplated that the invention is not limited thereby and various modifications and alterations may be made therein without departing from the scope of the invention. Furthermore, the present invention may be applied for various purposes and fields other than the aforesaid. For example, a superhydrophilified surface may be utilized to prevent air bubbles from adhering to an underwater surface. Also, the superhydrophilified surface may be used to form and maintain a uniform film of water. Moreover, in view of an excellent affinity for vital tissues and organs, the superhydrophilic photocatalytic coating may be utilized in the medical fields such as contact lens, artificial organs, catheters, and anti-thrombotic materials.

The invention claimed is:

1. A method of preventing or reducing fogging of a surface of a composite when subjected to humid conditions, comprising:
  providing a composite with a surface, said composite comprising a substrate and a photocatalytic surface layer, said photocatalytic surface layer comprising a photocatalyst;
  subjecting the photocatalyst to photoexcitation by exposing the composite to light from an indoor illumination lamp having a UV intensity from about 0.001 to about 1 mW/cm$^2$, to render the surface of the composite hydrophilic, wherein, after said photoexcitation, the surface of the composite has a water wettability of less than 10° in terms of the contact angle with water; and
  subjecting the composite to humidity that is sufficient to induce fogging of said substrate if said photocatalytic surface layer were absent.

2. The method of claim 1, wherein, after said photoexcitation, the surface of the composite has a water wettability of less than 5° in terms of the contact angle with water.

3. The method of claim 1, wherein, after said photoexcitation, the surface of the composite has a water wettability of about 0° in terms of the contact angle with water.

4. The method of claim 1, wherein said photocatalyst is selected from the group consisting of $TiO_2$, ZnO, $SnO_2$, $SrTiO_3$, $WO_3$, $Bi_2O_3$ and $Fe_2O_3$.

5. The method of claim 4, wherein said photocatalytic surface layer further comprises a metal selected from the group consisting of Ag, Cu and Zn.

6. The method of claim 4, wherein said photocatalytic surface layer further comprises a metal selected from the group consisting of Pt, Pd, Rh, Ru, Os and Ir.

7. The method of claim 1, wherein said substrate comprises glass.

8. The method of claim 1, wherein, said substrate comprises glass containing alkaline network modifier ions, and wherein said composite further comprises a film disposed between said substrate and said photocatalytic surface layer, said film preventing ions from diffusing from said substrate into said photocatalytic surface layer.

9. The method of claim 8, wherein said film comprises silica.

10. The method of claim 1, wherein said photocatalytic surface layer further comprises silica or silicone.

11. The method of claim 1, wherein said photocatalytic surface layer consists essentially of said photocatalyst.

12. A method for maintaining a surface of a composite in a clean state when subjected to dirt in air and precipitation, comprising:
  providing a composite with a surface, said composite comprising a substrate and a photocatalytic surface layer, said photocatalytic surface layer comprising a photocatalyst;
  subjecting the photocatalyst to photoexcitation by exposing the composite to light from an indoor illumination lamp having a UV intensity from about 0.001 to about 1 mW/cm2, to render the surface of the composite hydrophilic, wherein, after said photoexcitation, the surface of the composite has a water wettability of less than about 20° in terms of the contact angle with water;
  subjecting said composite to dirt in air or precipitation; and
  washing away the dirt on the surface of the composite by occasional contact with water.

13. The method of claim 12, wherein, after said photoexcitation, the surface of the composite has a water wetrability of less than 10° in terms of the contact angle with water.

14. The method of claim 12, wherein, after said photoexcitation, the surface of the composite has a water wettability of less than 5° in terms of the contact angle with water.

15. The method of claim 12, wherein, after said photoexcitation, the surface of the composite has a water wettability of about 0° in terms of the contact angle with water.

16. The method of claim 12, wherein said photocatalyst is selected from the group consisting of $TiO_2$, ZnO, $SnO_2$, $SrTiO_3$, $WO_3$, $Bi_2O_3$ and $Fe_2O_3$.

17. The method of claim 16, wherein said photocatalytic surface layer further comprises a metal selected from group consisting of Ag, Cu and Zn.

18. The method of claim 16, wherein said photocatalytic surface layer further comprises a metal selected from the group consisting of Pt, Pd, Rh, Ru, Os and Ir.

19. The method of claim 12, wherein said substrate comprises glass containing alkaline network modifier ions, and wherein said composite further comprises a film disposed between said substrate and said photocatalytic surface layer, said film preventing ions from diffusing from said substrate and photocatalytic surface layer.

20. The method of claim 19, wherein said film comprises silica.

21. The method of claim 12, wherein said substrate is a tile, a portion of the body of a motor vehicle, an inner panel of a building, or an outer panel of a building.

22. The method of claim 12, wherein said photocatalytic surface layer further comprises silica.

23. The method of claim 12, wherein said photocatalytic surface layer consists essentially of said photocatalyst.

* * * * *